(12) United States Patent
Loy

(10) Patent No.: US 6,325,586 B1
(45) Date of Patent: Dec. 4, 2001

(54) AUTOMATED STORAGE AND RETRIEVAL SYSTEM

(75) Inventor: David H. Loy, York, PA (US)

(73) Assignee: protoSight, Inc., York, PA (US)

( * ) Notice: Subject to any disclaimer, the term of this patent is extended or adjusted under 35 U.S.C. 154(b) by 0 days.

(21) Appl. No.: 09/456,903

(22) Filed: Dec. 8, 1999

(51) Int. Cl.⁷ .................................................... B65G 1/10
(52) U.S. Cl. ..................... 414/281; 414/282; 414/331.07; 414/283
(58) Field of Search ................................ 414/281, 282, 414/283, 331.07

(56) References Cited

U.S. PATENT DOCUMENTS

| | | | |
|---|---|---|---|
| Re. 27,283 | 2/1972 | Bajulaz | 198/156 |
| 2,014,351 | 9/1935 | Becker | 214/16.1 |
| 2,624,470 * | 1/1953 | Geist | 414/281 X |
| 2,647,647 | 8/1953 | Alimanestiano | 214/16.1 |
| 2,752,051 | 6/1956 | Strahm et al. | 214/16.1 |
| 2,840,248 | 6/1958 | Grove et al. | 214/16.1 |
| 2,890,802 | 6/1959 | Alimanestiano | 214/16.1 |
| 2,923,421 | 2/1960 | De Roumefort | 214/16.1 |
| 2,945,604 | 7/1960 | Kroll et al. | 214/16.1 |
| 3,016,154 | 1/1962 | Ugolini et al. | 214/16.1 |
| 3,161,303 | 12/1964 | Burrows | 214/16.1 |
| 3,537,602 | 11/1970 | Cotton et al. | 214/16.4 |
| 3,554,390 | 1/1971 | Saul | 214/16.4 |
| 3,567,055 * | 3/1971 | Preto | 414/668 |
| 3,581,915 | 6/1971 | Saul | 214/16.4 A |
| 3,618,793 | 11/1971 | Coursey | 214/16.1 CD |
| 3,737,056 | 6/1973 | Hathcock, Jr. | 214/16.4 A |
| 3,802,580 | 4/1974 | Castaldi | 214/16.4 A |
| 3,896,955 | 7/1975 | Collins et al. | 214/16.1 CB |
| 4,016,987 * | 4/1977 | Stolzer | 414/282 |
| 4,093,086 | 6/1978 | Lucas et al. | 214/16.4 A |
| 4,194,864 * | 3/1980 | Yamauchi et al. | 414/283 |
| 4,219,296 | 8/1980 | Fujii et al. | 414/273 |
| 4,268,207 | 5/1981 | Pipes | 414/277 |
| 4,307,988 | 12/1981 | Page et al. | 414/276 |
| 4,372,724 | 2/1983 | Stolzer | 414/281 |
| 4,406,570 | 9/1983 | Duncan et al. | 414/282 |
| 4,466,765 | 8/1984 | Mautino | 414/277 |
| 4,492,504 | 1/1985 | Hainsworth | 414/273 |
| 4,679,149 | 7/1987 | Merz | 364/478 |
| 4,708,566 | 11/1987 | Stolzer et al. | 414/276 |
| 4,773,807 | 9/1988 | Kroll et al. | 414/282 |
| 4,778,325 | 10/1988 | Stolzer et al. | 414/276 |
| 4,786,229 | 11/1988 | Henderson | 414/786 |
| 4,787,804 | 11/1988 | Edenäs | 414/281 |
| 4,792,273 | 12/1988 | Specht | 414/786 |

(List continued on next page.)

FOREIGN PATENT DOCUMENTS

| | | | |
|---|---|---|---|
| 237671 * | 7/1960 | (AU) | 414/281 |
| 1092871 * | 4/1955 | (FR) | 414/281 |
| 248315 * | 2/1990 | (JP) | 414/281 |
| 85/01493 * | 4/1985 | (WO) | 414/283 |

*Primary Examiner*—Steven A. Bratlie
(74) *Attorney, Agent, or Firm*—Thomas Hooker, P.C.

(57) ABSTRACT

Case handling magazines and robot end effector for an automated storage and retrieval system in a warehouse include comb shelves for holding individual cases of goods. The case handling magazines are transported by conventional automated pallet handling stacker cranes and transfer cars. The magazine comb shelves and robot end effector have load carrying teeth spaced apart along the length of the shelves. The magazines include storage magazines for holding cases in conventional storage bays and transfer magazines for transferring cases to and from the storage magazines. The comb shelves of the storage magazines and transfer magazines are complementary with one another and enable the teeth of the comb shelves to intermesh with each other for transferring cases from a loaded comb shelf to an empty comb shelf. The robot end effector and some magazines include movable comb shelf segments that enable the selective transfer of all or less than all the cases on the loaded comb shelf to the unloaded comb shelf.

29 Claims, 35 Drawing Sheets

U.S. PATENT DOCUMENTS

| | | | |
|---|---|---|---|
| 4,846,620 | 7/1989 | Mims | 414/273 |
| 5,002,449 | 3/1991 | Kita et al. | 414/273 |
| 5,116,182 | 5/1992 | Lin | 414/254 |
| 5,174,454 | 12/1992 | Parkander | 209/3.3 |
| 5,211,523 | 5/1993 | Andranada Galan et al. | 414/282 |
| 5,285,928 | 2/1994 | Stingel, Jr. et al. | 221/75 |
| 5,330,305 | 7/1994 | Go | 414/254 |
| 5,340,262 | 8/1994 | Tsujimoto et al. | 414/273 |
| 5,363,310 | 11/1994 | Haj-Ali-Ahmadi et al. | 364/478 |
| 5,366,335 | 11/1994 | Tokiwa | 414/282 |
| 5,395,206 | 3/1995 | Cerny, Jr. | 414/786 |
| 5,425,612 | 6/1995 | Ebstein | 414/254 |
| 5,468,110 | 11/1995 | McDonald et al. | 414/273 |
| 5,564,879 | 10/1996 | Noguchi | 414/268 |
| 5,582,497 | 12/1996 | Noguchi | 414/281 |
| 5,615,992 | 4/1997 | Proske et al. | 414/786 |
| 5,718,551 | 2/1998 | Ebstein | 414/254 |
| 5,779,094 | 7/1998 | Stingel, Jr. | 221/75 |
| 5,903,464 | 5/1999 | Stingel, Jr. et al. | 364/478.03 |
| 5,915,907 | 6/1999 | Yatou et al. | 414/254 |

\* cited by examiner

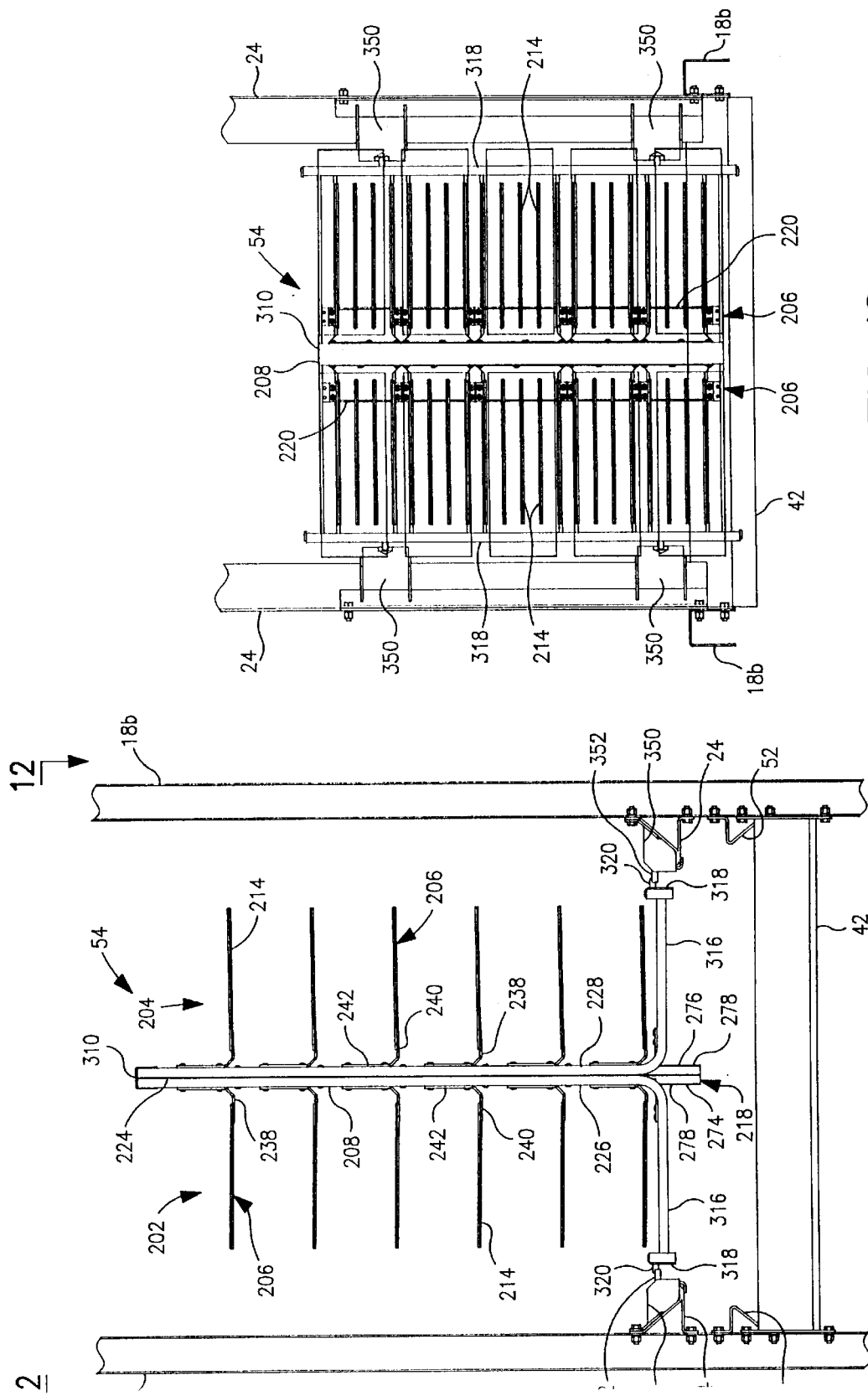

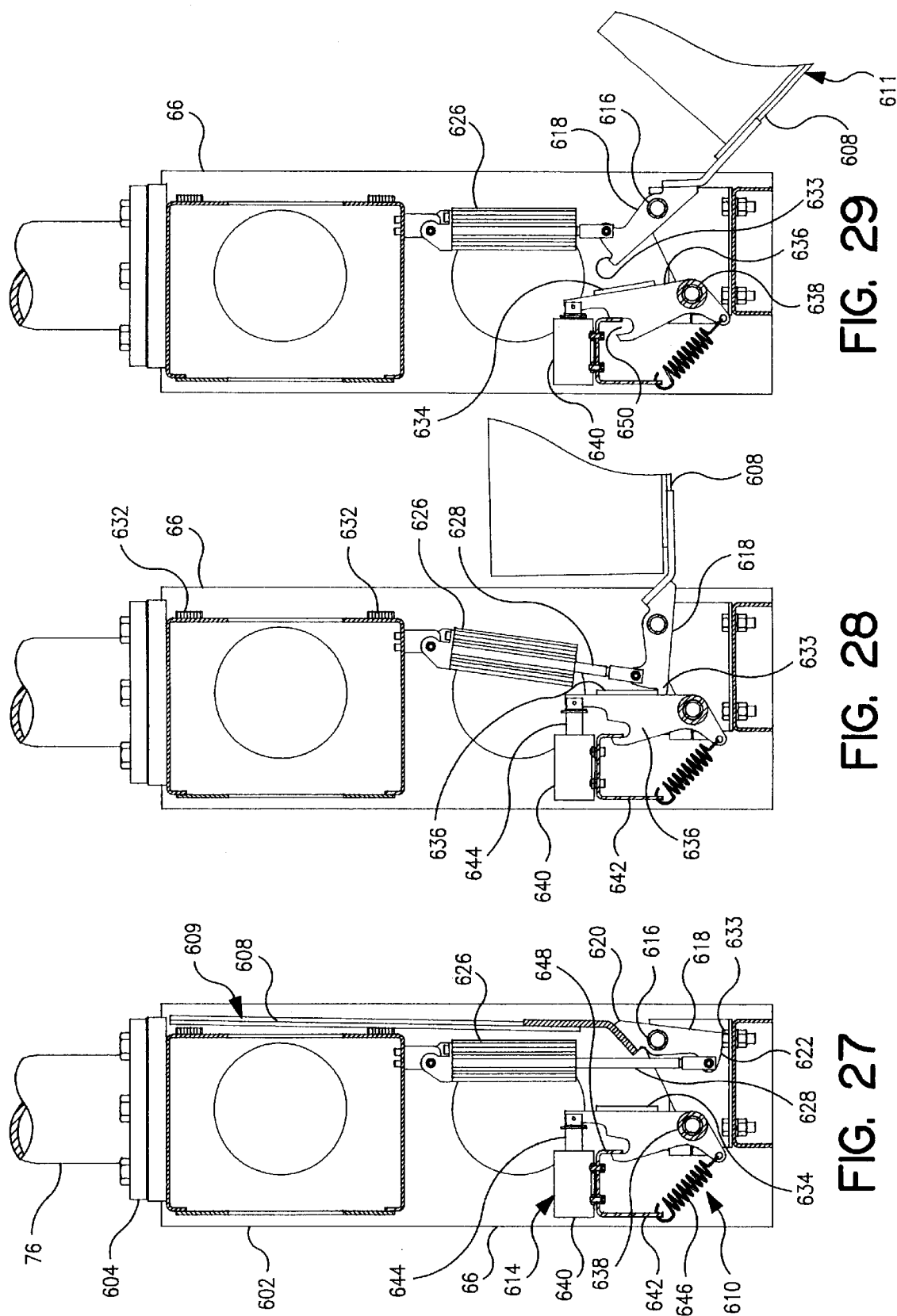

though by the use of automated vehicles and auxiliary transfer vehicles to transfer pallets within the warehouse has increased the efficiency of known storage and retrieval systems.

AUTOMATED STORAGE AND RETRIEVAL SYSTEM

FIELD OF THE INVENTION

The invention relates to an automated storage and retrieval system for goods within a warehouse.

BACKGROUND OF THE INVENTION

Automated storage and retrieval systems are used to store and retrieve goods within a warehouse. The systems conventionally handles cases of goods loaded onto pallets. The loaded pallets are each stored and retrieved as single unit. Typical users of automated storage and retrieval systems include retailers storing inventory in a distribution center and manufacturers storing materials at a manufacturing plant.

The storage and retrieval system divides the warehouse into an induction area, a storage area and a discharge area. Loaded pallets are received or made up in the induction area and are then placed in the storage area for storage. Pallets are retrieved from the storage area and transported to the discharge area when the goods are needed.

The storage area includes a number of vertical storage racks spaced apart by vertical aisles. The storage racks have vertically spaced horizontal tiers with each tier having a number of storage bays spaced along the tier. Loaded pallets are placed in the storage bays for storage. The aisles are used to transport loaded pallets into and from the storage racks.

Automated vehicles traverse the aisles between storage racks. The vehicles transport loaded pallets from the induction area to the storage bays and from the storage bays to the discharge area. The pallets are carried on pallet supports. The vehicles also carry an auxiliary transfer vehicle that transfers pallets between the transport vehicle and designated storage bays. When the auxiliary transfer vehicle leaves the transport vehicle, it runs on tracks in the storage bays. The auxiliary transfer vehicle has a movable lift table that carries the pallet and can be raised or lowered to transfer pallets to and from a transfer vehicle or storage bay. The use of automated vehicles and auxiliary transfer vehicles to transfer pallets within the warehouse has increased the efficiency of known storage and retrieval systems.

In the simplest construction, a conventional storage area includes four parallel, spaced apart storage racks. The outermost racks are adjacent induction and discharge areas of the warehouse. Pallet elevators are located in the aisles adjacent the outermost racks. The elevators may access all bays in the tiers of the adjacent storage racks. Rails extend along each tier of aisles between the inner racks. Transfer cars run on the rails.

The movement of pallets into and from the storage area is controlled by an electronic inventory control system. The inventory control system tracks and maintains the locations of the pallets throughout the warehouse. The automated vehicles are directed by the inventory control system to store and retrieve pallets in specified storage bays. The movement of the automated vehicles and the storage and retrieval of pallets on the vehicles are directed by the inventory control system in conjunction with the sensors and control systems of the automated vehicles themselves. The inventory control system enables the storage and retrieval of pallets to be performed in accordance with known storage and retrieval algorithms or strategies, including, for example, first in-first out (FIFO) or last-in-first out (LIFO).

Conventional storage and retrieval systems are designed to store and retrieve large inventories of like goods. The goods normally are carried by a standard-size pallet having a footprint of 40 inches by 48 inches. The goods placed on a pallet typically are made up of a number of separate cases or boxes stacked to a maximum height of about 60 inches. The typical range in common case sizes will create pallet loads ranging from 4 cases per pallet for the largest cases to 96 cases per pallet for the smallest cases. The stack of cases is commonly wrapped with a plastic stretch wrap to hold the cases on the pallet and allow the loaded pallet to be handled as a single unitized load. A typical loaded pallet weighs between 1,000 pounds and 4,000 pounds. The storage racks and automated vehicles are designed to store and retrieve goods at the "pallet level", that is, to store and retrieve entire unitized pallets of goods.

Today's global marketplace has placed new demands on storage and retrieval systems. Businesses demand a more fluid supply chain to reduce cost. Modern business methods such as "just-in-time" purchasing practices have been developed to reduce transportation time and storage costs. These changes require warehouse orders of individual cases or limited numbers of cases. The growth of catalog shopping and electronic commerce has increased individual case shipments of customer orders from a centralized warehouse directly to the consumer, and decreased bulk shipments to retail stores or regional warehouses.

As a result, warehouses are shipping fewer goods at the pallet level and more goods at the case level. The amount of inventory kept on-hand is being reduced because there is less need to handle and store full pallet loads of identical goods. More goods are now being shipped in mixed pallets, that is, pallets containing cases of different articles within the same pallet load, or are being shipped in less-than-full pallet loads. For even smaller shipments, goods may be delivered in a number of separate, unbundled cases. Relatively small individual orders of assorted goods must be made up and shipped directly from the warehouse.

Conventional pallet storage and retrieval systems are unable to accommodate reduced inventories and individual order handling. These systems operate at the pallet level and cannot store and retrieve non-unitized cases of goods. Mixed pallets or unbundled deliveries of cases must be manually separated and loaded onto pallets before being stored in the warehouse. Individual orders of mixed cases must be manually made up from entire pallets of various cases retrieved from the storage racks. Mixed pallet orders also require manual makeup from retrieved pallets of the individual cases.

Consequently, users of conventional pallet storage and retrieval systems have been forced to add expensive manual labor or automated case handling systems to handle mixed pallets at both the receiving and discharge ends of the warehouse or to make up individual orders of various goods in the discharge area. Occasionally, conventional automated storage and retrieval systems have been abandoned altogether because of their inability to store and retrieve goods at "less-than-pallet" level.

Thus, there is a need for an improved storage and retrieval system for storing and retrieving goods in a warehouse. The improved system should be capable of handling both conventional palletized loads and separate cases of goods. The improved system should automatically store individual cases of goods received at an induction area and deliver selected individual cases of goods to a discharge area. The improved system should store the cases in conventional storage racks and deliver made up orders made of different cases of goods from the storage racks to the discharge area using conventional automated vehicles. The improved system should eliminate the need to invest in additional automated transport and handling equipment specifically designed to handle only smaller case-sized articles.

SUMMARY OF THE INVENTION

The present invention is directed to a general-purpose automated storage and retrieval system capable of storing and retrieving both unitized and non-unitized cases of goods in a warehouse having conventional storage racks and automated vehicles. The term "cases" includes articles of goods and, if necessary, the bags, totes, cans, bins, open or closed boxes, trays and the like used to contain and store the articles in the warehouse.

In the invention, storage magazines are removably deposited in the bays in the storage racks. The magazines include a number of comb shelves which support individual cases of goods. Case transfer magazines move between bays and remove selected cases of goods from the storage magazines during the makeup of predetermined orders requiring different types of cases. Typically, the storage magazines are each filled with cases of like goods. The transfer magazines remove the required numbers of cases from selected storage magazines and load them on other storage magazines. The loaded storage magazines are moved to the discharge area of the warehouse where the picked, assorted cases are made up into orders. The transfer magazines also restock cases in storage magazines from which cases have been exhausted during order makeup. Transfer magazines pick up like cases from fixed magazines loaded in the induction area of the warehouse, transport the cases to the storage area and then place the cases in storage magazines in bays in the racks. The storage magazines are transportable and may be moved to and from the bays as required.

All of the case handling devices have one or more horizontal load-supporting comb shelves attached to a frame. A comb shelf has a number of cantilevered beams or teeth spaced along and extending perpendicular to the length of the shelf, similar to the teeth of a comb. The gaps between adjacent teeth permit the teeth of like combs to be moved past each other. The comb shelf supports a number of cases spaced along the length of the shelf, each case being located at a predetermined location on the shelf. The teeth may include features that resist unwanted movement of cases on the comb shelf.

The comb shelves of the storage magazines and the case transfer magazines are complementary and have like tooth spacing to enable the transfer of cases from one comb shelf to another comb shelf. To transfer cases held on a loaded comb shelf to an unloaded comb shelf, the unloaded comb shelf is positioned below the loaded comb shelf. The comb shelves overlap one another in a transfer position with the shelves horizontally offset from each other by half a tooth spacing so that the teeth of one shelf are vertically aligned in the gaps between teeth of the other shelf. The empty shelf is raised towards the loaded comb shelf or the loaded comb shelf is lowered so that the teeth of the two combs intermesh and pass each other to transfer the cases from the loaded comb shelf to the unloaded comb shelf.

The raising or lowering of the comb shelf may be accomplished by supporting the frame to which the comb shelf is attached on a lift table of a shuttle vehicle. The lift table raises or lowers the frame to effectuate transfer of cases. The frame may carry a number of comb shelves for simultaneous transfer of cases to other comb shelves. Drive linkages may be attached between the frame and the comb shelves to lift or lower the comb shelves.

Case transfer magazines may have comb shelves that are divided into a number of comb shelf segments. Each comb shelf segment includes at least one shelf location and is formed from a subset of teeth of the comb shelf. The comb shelf segments are movably mounted to the frame. A segment of a comb shelf may be moved from the comb prior to transfer to prevent the transfer of a case from a loaded comb shelf. The segment may be rotated or vertically translated on the frame. By selectively actuating the comb shelf segments, selected cases on a loaded comb shelf can be retained on the comb shelf while other cases on the shelf are transferred to another comb shelf.

The improved automated storage and retrieval system of the present invention enables conventional storage racks and automated vehicles to store and retrieve goods at both the pallet level and the case level. Individual cases of goods are stored and retrieved automatically. The system enables the inventory control system to selectively store and retrieve individual cases of goods. Individual orders made up of assorted cases may be stored in the storage racks or made up and retrieved from the storage racks. The inventory control system can implement storage and retrieval algorithms at the case level, increasing the efficiency of the warehouse in storing and retrieving the individual cases of goods.

Other objects and features of the invention will become apparent as the description proceeds, especially when taken in conjunction with the accompanying drawings illustrating the invention, of which there are 34 sheets.

BRIEF DESCRIPTION OF THE DRAWINGS

FIG. 11 is a front view of the mobile transfer magazine taken generally along line 11—11 of FIG. 10;

FIG. 12 is a top view of the mobile transfer magazine taken generally along line 12—12 of FIG. 11;

FIG. 27 is a sectional side view of the end effector taken generally along line 27—27 of FIG. 25 with the comb shelf teeth in the retracted position;

FIG. 28 is similar to FIG. 27 but shows the teeth in the extended position;

FIG. 29 is similar to FIG. 28 but shows the teeth in the discharge position;

DESCRIPTION OF THE PREFERRED EMBODIMENTS

Figure 1:
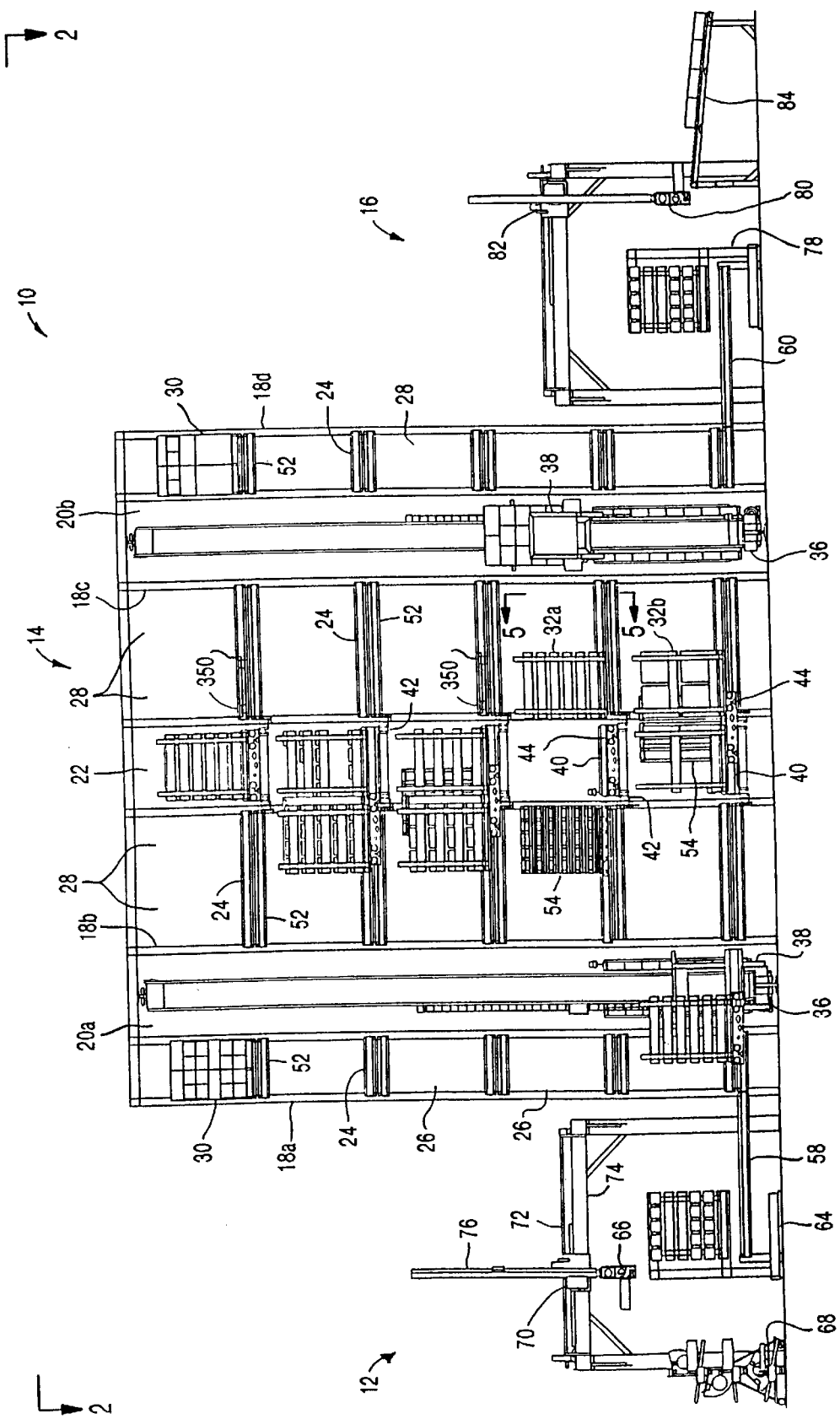
FIG. 1 is a side view of a warehouse employing the improved case handling system of the present invention.
Figure 2:
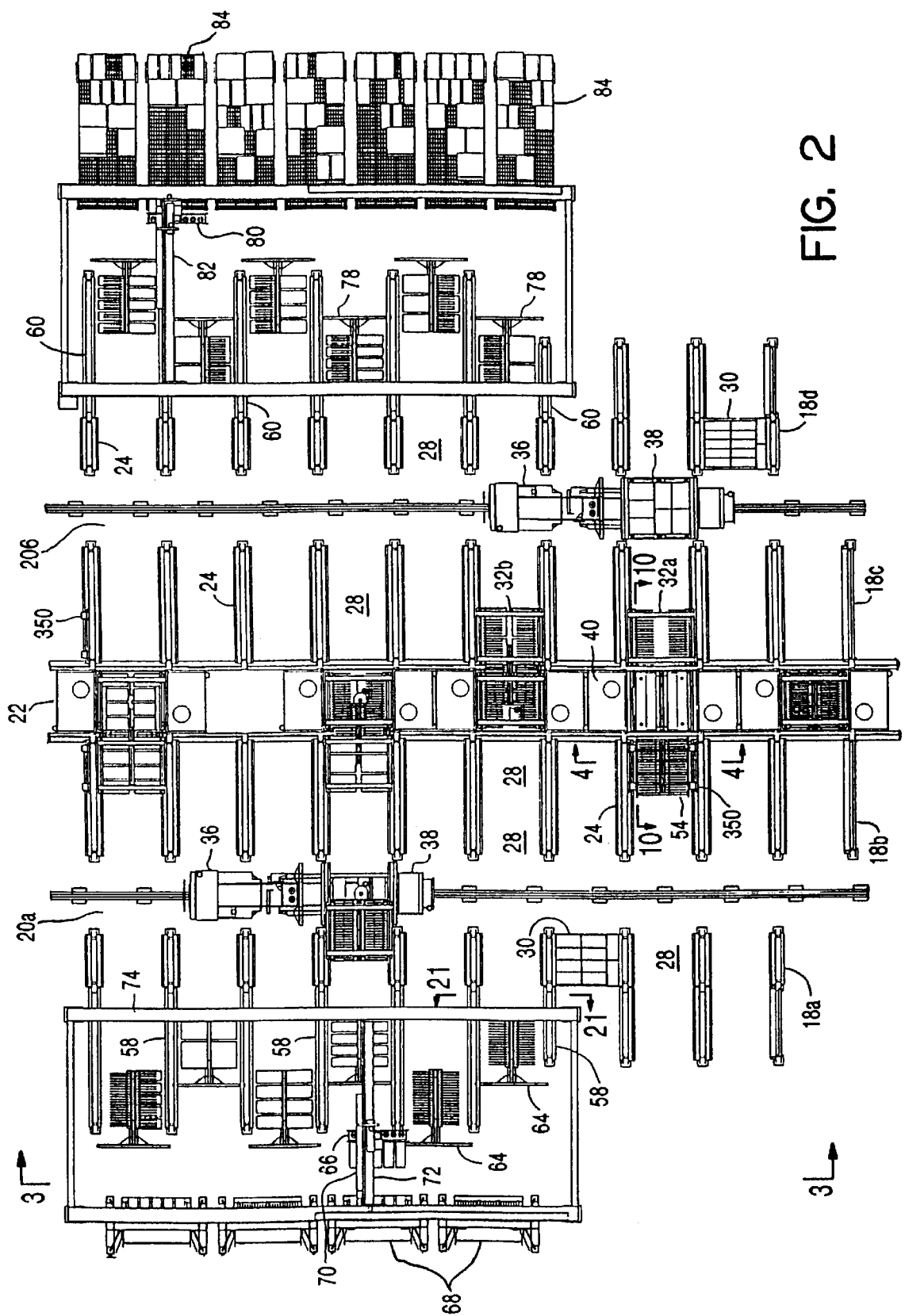
FIG. 2 is a top view of the warehouse taken generally along line 2—2 of FIG. 1.
Figure 3:
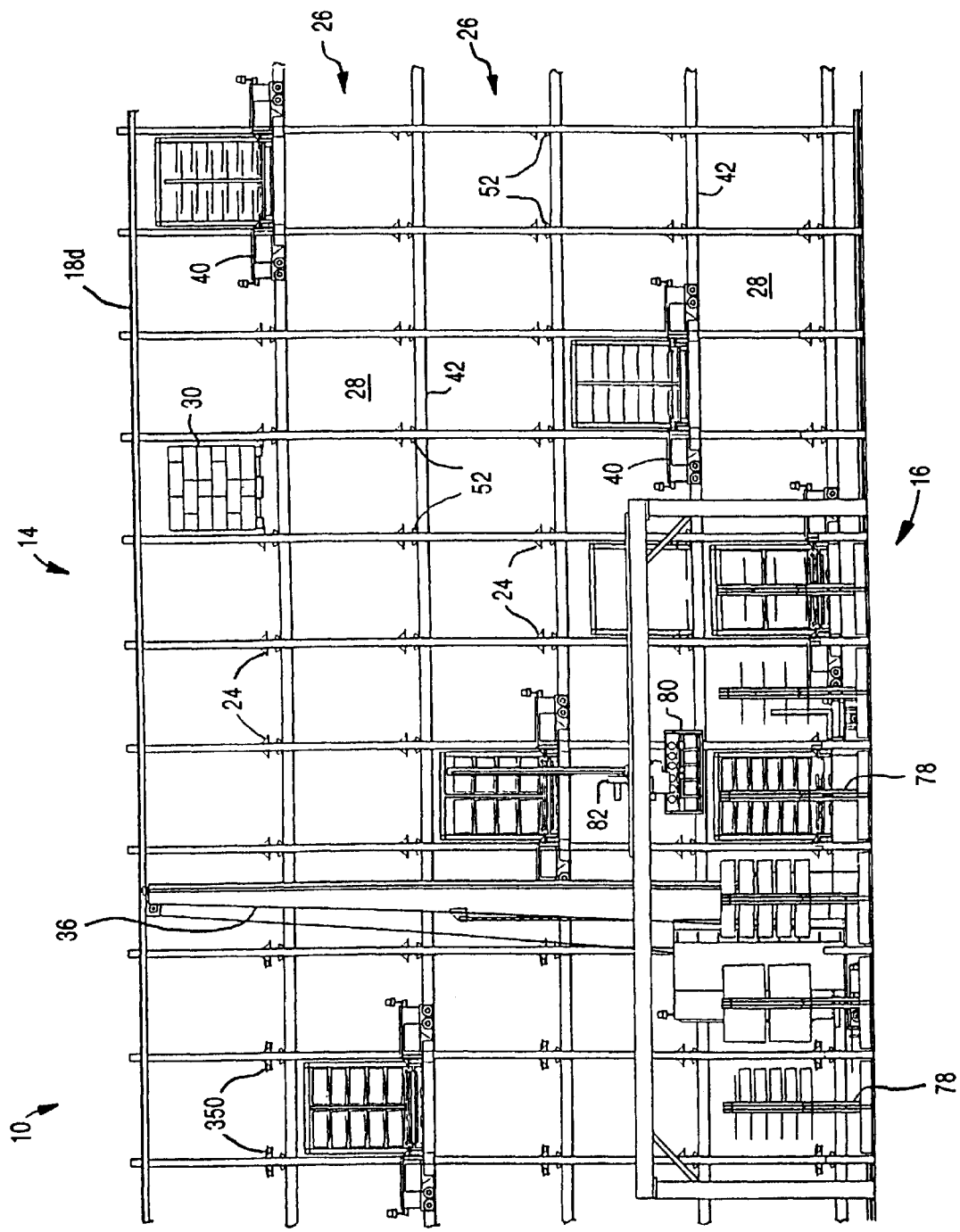
FIG. 3 is a front view of the warehouse taken generally along line 3—3 of FIG. 2.

FIGS. 1–3 illustrate a warehouse 10 in accordance with the present invention. The warehouse 10 includes an induction area 12, a storage area 14 and a discharge area 16.

The storage area 14 has a set of four conventional vertical storage racks 18a, 18b, 18c and 18d that are parallel to one another and extend the length of the warehouse 10. Storage racks 18a and 18b, and 18c and 18d are spaced apart by outer transport aisles 20a and 20b. The inner racks 18b and 18c are spaced apart 1–5 ; by an inner transport aisle 22. Additional racks and aisles may be provided in the warehouse, if desired.

Vertically spaced rows of horizontal support beams or shelf supports 24 extend across storage racks 18 and divide the storage racks 18 into a number of vertically spaced horizontal tiers 26. The racks include vertical beams 27. Supports 24 and beams 27 to form rectangular bays 28 extending along both sides of each tier.

The tiers of inner racks 18b and 18c include double-deep rows of storage bays 28 spaced across the rack. The tiers of the outer storage racks 18a and 18b include single-deep rows of storage bays 28. The storage bays 28 are shown holding storage magazines 32a, 32b. If desired, conventional loaded pallets 30 may be stored in the bays.

Figure 4:
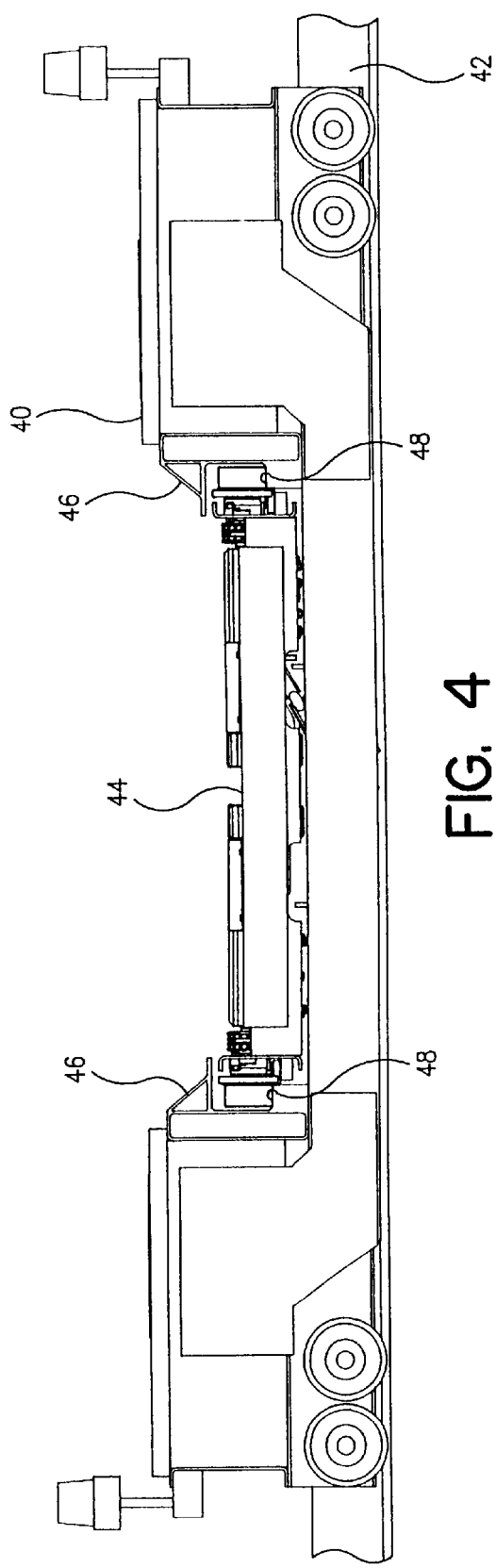
FIG. 4 is a front view of a shuttle car robot carried on a transfer car taken generally along line 4—4 of FIG. 2.

An automated transfer car 40 operates in each tier of the transport aisle 22. Stacker cranes 36 operate in transport aisles 20a and 20b. The cars and cranes carry storage magazines 32 to and from bays in the storage racks. The stacker cranes are conventional and have lift platforms 38 that travel the length and height of the aisles to access any bay of the adjacent storage racks 18a and 18b, and 18c and 18d. Transfer cars 40 are conventional and travel on rails 42 extending along each tier of aisle 22. The transfer cars 40 access any bay in adjacent storage racks 18b and 18c. The stacker cranes 36 and transfer cars 40 transport shuttle car robots 44. One shuttle car robot is dedicated to each transfer car and each stacker crane FIG. 4 illustrates a shuttle car robot 44 carried on a transfer car 40. The transfer car 40 includes pallet supports 46 and shuttle rails 48 below the pallet supports. The supports 46 and rails 48 extend perpendicularly across the transfer car.

The shuttle car robots 44 carry storage magazines 32 between the transfer cars and stacking cranes and the storage bays 28. The shuttle car robots 44 leave the transfer cars and stacker cranes and travel on shuttle rails 52 into storage bays 28. Rails 52 extend parallel to the shelf supports 24 across the width of the storage racks 18. The shuttle rails 52 in the bays are spaced below the shelf supports 24 to provide clearance for a shuttle car robot entering or passing through a storage bay 28 holding a pallet or storage magazine. The shuttle rails 52 enable the shuttle car robots 44 to access any storage bay 28 from either side of a transport aisle and to pass through a single-deep or double-deep bay. The shuttle car robots 44 also carry mobile transfer magazines 54 between storage magazines 32 deposited in storage bays and like storage magazines in other bays.

Storage area 14 is connected to the induction and discharge areas 12, 16 by sets of short shuttle rails 58 and 60 that extend outwardly from racks 18a and 18d. Shuttle car robots 44 travel on the shuttle rails between the outer storage racks and the adjacent induction area 12 or discharge area 16 and transport loaded pallets and storage magazines to and from the storage racks. Other transport vehicles, including conventional automated ground vehicles (not shown) travel on the warehouse floor and are used to transport shuttle car robots 44 between the induction and discharge areas 12, 16 and the storage racks 18.

The induction area 12 receives cases to be stored in the racks 18 and places the cases in empty storage magazines 32. A number of case induction carts 68 are spaced along the side of the induction area facing away from the racks. Shuttle rails (not illustrated) lead to pallet discharge stations near the case induction carts to permit transport of pallet loads of cases to the carts. Individual cases are manually picked from the pallet and then loaded on the induction carts. An end effector 66 is mounted on the lower end of a conventional gantry robot 70. The end effector has a single segmented comb shelf. The gantry robot 70 includes a vertical z-axis drive 76 mounted on a transverse y-axis drive 72 with longitudinal x-axis drives on the ends supported on elevated tracks 74. The y-axis cross beam is movable along the x-axis tracks. The vertical z-axis shaft 76 can move vertically as desired and has a θ-drive at the bottom end that can rotate 360 degrees in the horizontal plane. The end effector 66 picks up cases from induction carts 68 and places the cases in fixed transfer magazines 64 mounted to the warehouse floor for subsequent placement in storage magazines 32. The storage magazines are then deposited in bays in the storage racks. The fixed transfer magazines 64 are located at the ends of the shuttle rails 58.

Discharge area 16 includes a number of fixed transfer magazines 78 located at the ends of shuttle rails 60. The transfer magazines 78 receive cases unloaded from storage magazines retrieved from the storage racks 18. An end effector 80, like end effector 66, is mounted on a conventional gantry robot 82, like gantry robot 70, and transfers cases from the transfer magazines 78 to discharge gravity roller conveyors 84.

FIGS. 5–8 illustrate a storage magazine 32a deposited in a storage bay 28. The storage magazine 32a is sized to fit within bay 28 and rests on the storage bay shelf supports 24.

The storage magazine 32a has a number of vertically spaced horizontal comb shelves 102. The number and vertical spacing of comb shelves may vary, typically in one inch increments, among storage magazines to accommodate different groups of case sizes. For example, the storage magazine 32a has twelve comb shelves and holds a maximum of 60 cases from a standard 96-case pallet load. The storage magazine 32b shown in FIG. 1 has four comb shelves and holds a maximum of 8 larger sized cases from a standard 8-case pallet load.

The comb shelves 102 of the storage magazine 32a are arranged in two vertical columns 104, 105 each having six comb shelves. The comb shelves 102 are mounted on a hollow rectangular frame 106, with each column of comb shelves mounted on opposed sides 108, 110 of the frame 106. The comb shelves on one side 108 are horizontally aligned with the comb shelves on the other side 110. The columns of comb shelves 102 are spaced apart from each other and are separated by a vertical gap or space 116 between the columns. The opposed ends 118, 120 of the comb shelves lie in common vertical planes at the open end of the storage magazine 32a.

Figure 6:
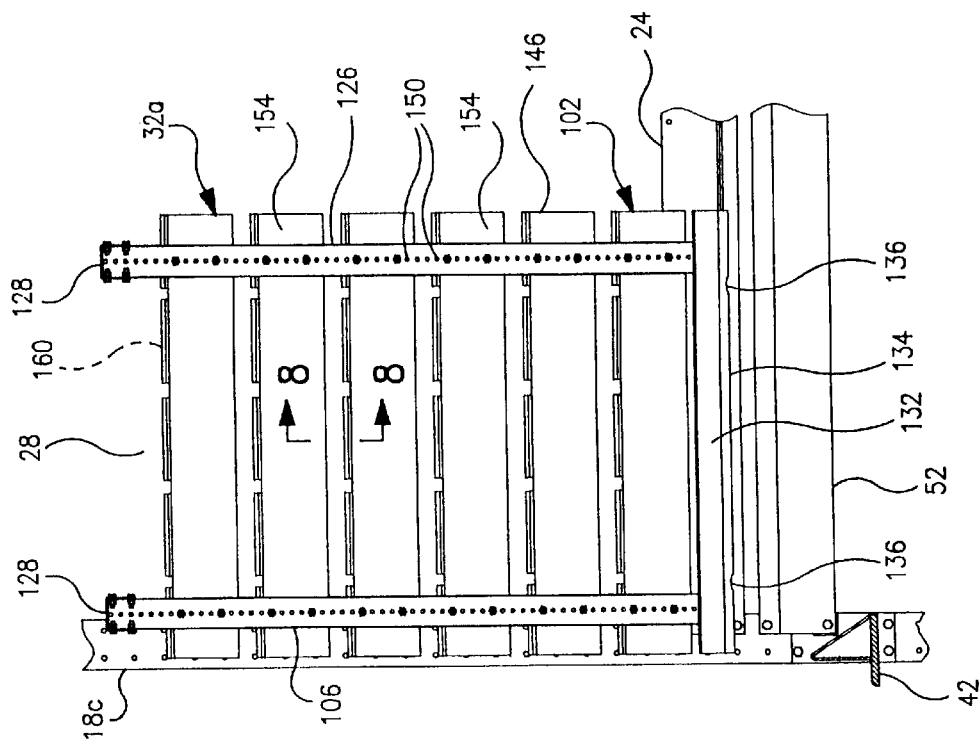
FIG. 6 is a side view of the storage magazine taken generally along line 6—6 of FIG. 5.
Figure 5:
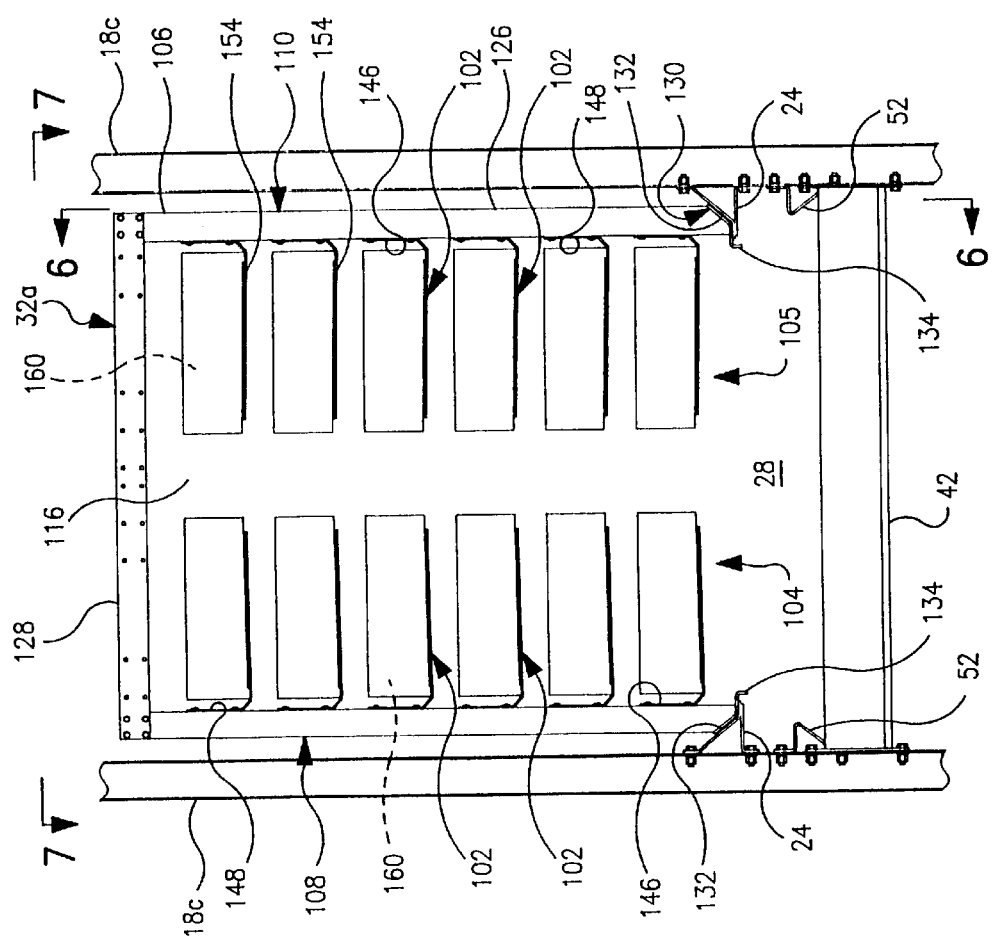
FIG. 5 is a front view of a storage magazine of the present invention deposited in a storage bay taken generally along line 5—5 of FIG. 1.
Figure 8:
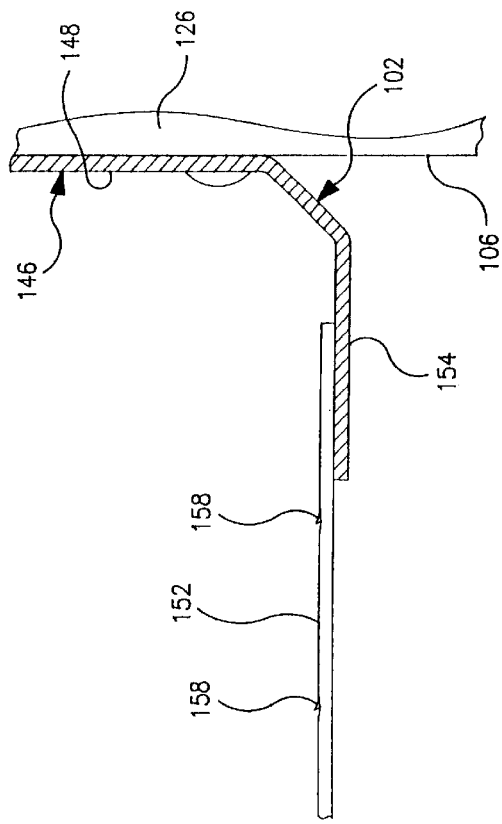
FIG. 8 is a partial side sectional view of the storage magazine taken generally along line 8—8 of FIG. 6.
Figure 7:
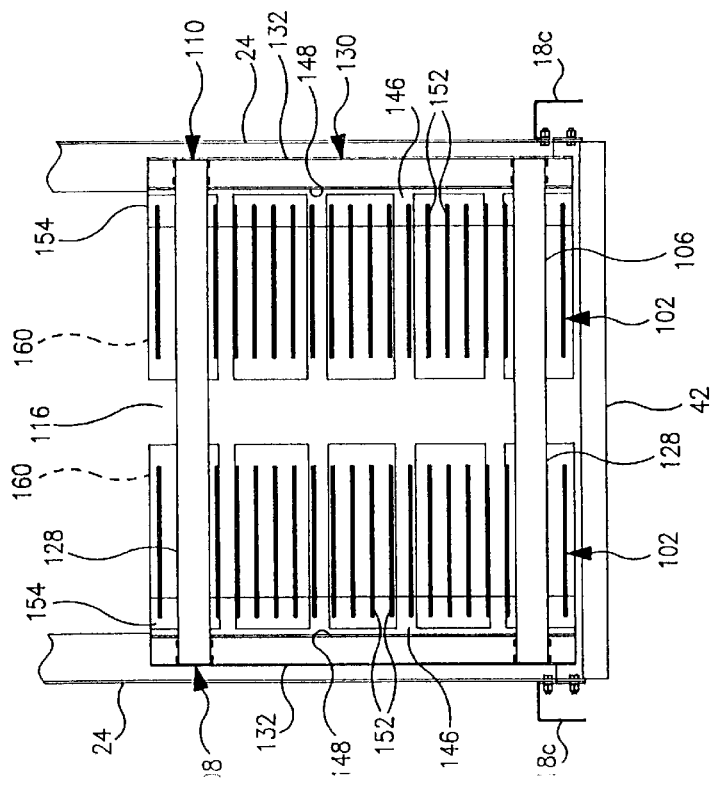
FIG. 7 is a top view of the storage magazine taken generally along line 7—7 of FIG. 5.

Pairs of horizontally spaced vertical posts 124, 126 at the sides 108, 110 of frame 106 mount the outer sides of the comb shelves 102. The support posts 124, 126 extend perpendicularly to the outer sides of the comb shelves and are spaced inwardly from the ends of the comb shelves, as shown in FIG. 6. Horizontal cross members 128 connect the upper ends of pairs of support posts 124, 126. The lower ends of the two support posts 124, 126 are connected by base members 130 having inwardly extending horizontal legs 132 between pairs of support posts 124, 126. The cross section of each leg 132 conforms to a storage rack shelf support 24 which supports the storage magazine. Flanges 134 extend down from the inner edge of each leg 132 and include a pair of spaced downwardly facing recesses or notches 136. See FIG. 6. The notches enable a shuttle car robot to carry a storage magazine 32, as explained in further detail below.

Each comb shelf 102 is fixedly mounted to the inner sides of the support posts 124, 126 by an L-shaped mounting bracket 146 extending along the outer side of the comb shelf. The mounting bracket 146 spans support posts 124 or 126. The vertical leg 148 of the mounting bracket 146 is bolted to the support posts. The support posts 124, 126 each include a set of vertically spaced bolt holes 150 that enable the number and spacing of comb shelves fastened to the frame 106 to be changed as desired.

The teeth 152 of each comb shelf 102 are cantilever-mounted on the horizontal leg 154 of the mounting bracket 146. The teeth 152 are uniformly sized and spaced rods extending along and perpendicularly away from the bracket. The comb shelves extend upwardly at a shallow angle of about 5 degrees so that the inner ends of rods 152 are above the outer ends of the rods. The upwardly angled shelves help prevent movement of cases into the gap 116 between the shelves. The upper sides of the rods include a number of spaced barbs 158 that engage a case resting on the comb shelf to resist undesirable movement of the case while on the comb shelf. See FIG. 8. Cases 160 are shown in outline on comb shelves 102 in FIG. 7.

Figure 9:
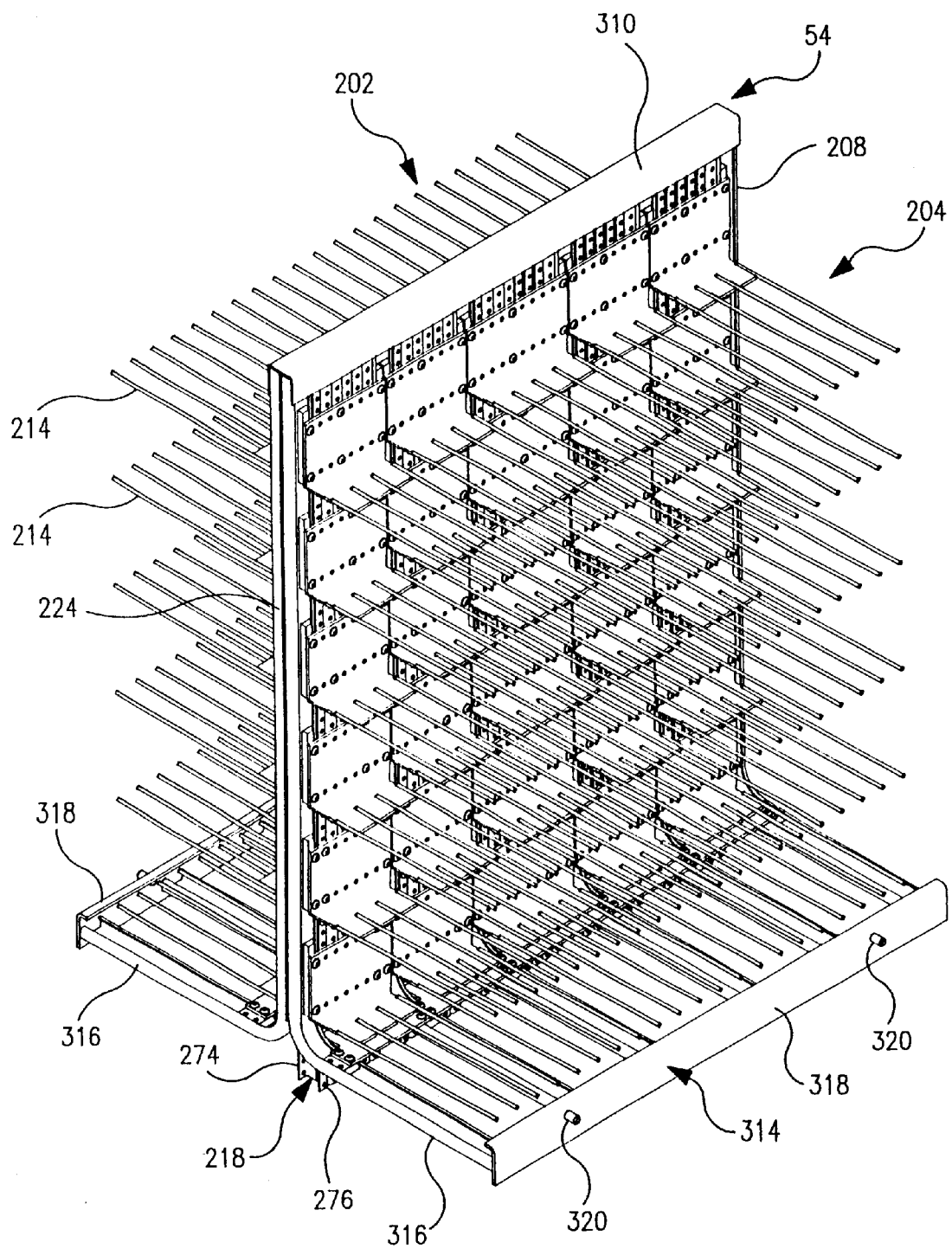
FIG. 9 is a perspective view of a mobile transfer magazine of the present invention.
Figure 10:
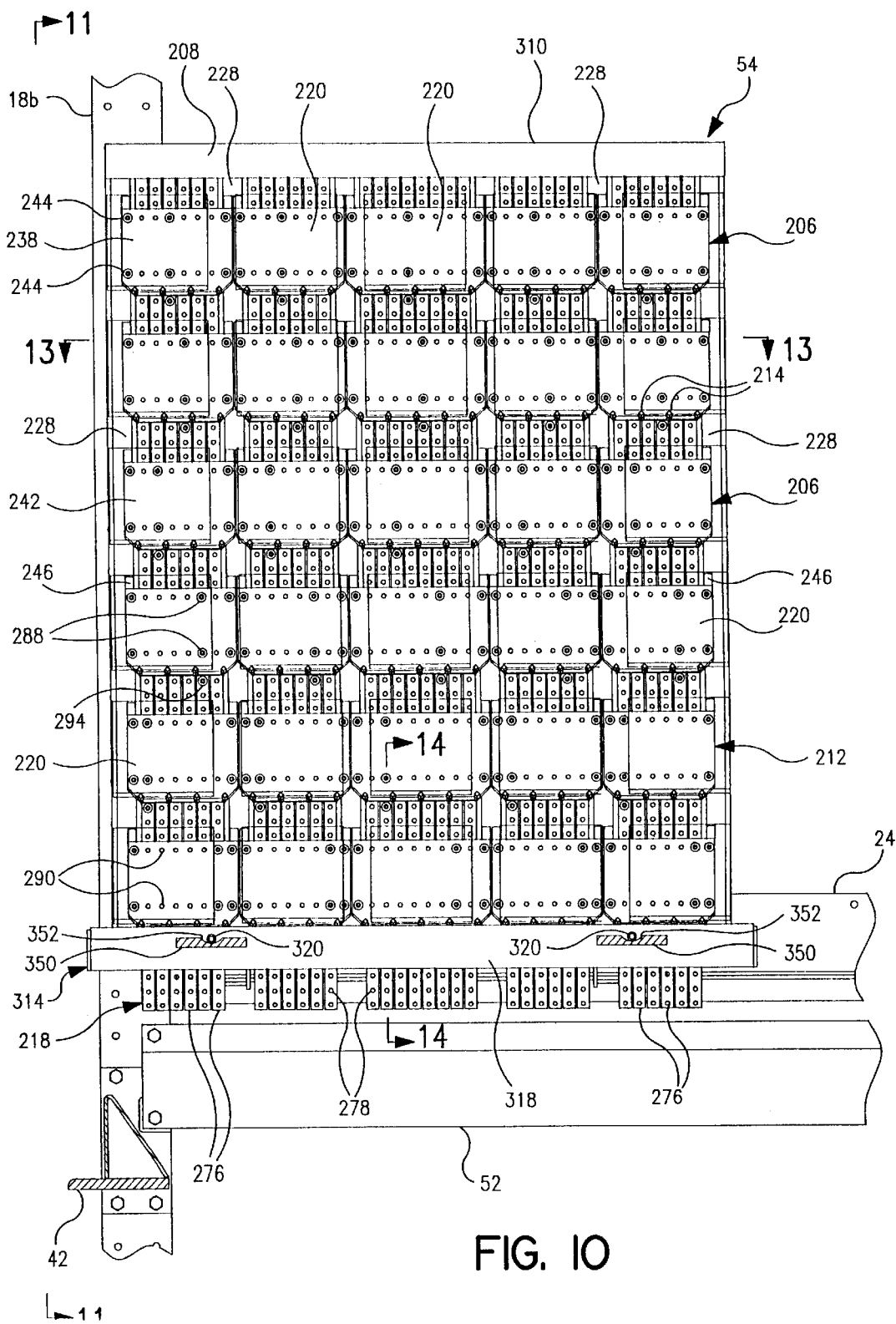
FIG. 10 is a side view of a mobile transfer magazine of the present invention deposited in a storage bay taken generally along line 10—10 of FIG. 2.
Figure 13:
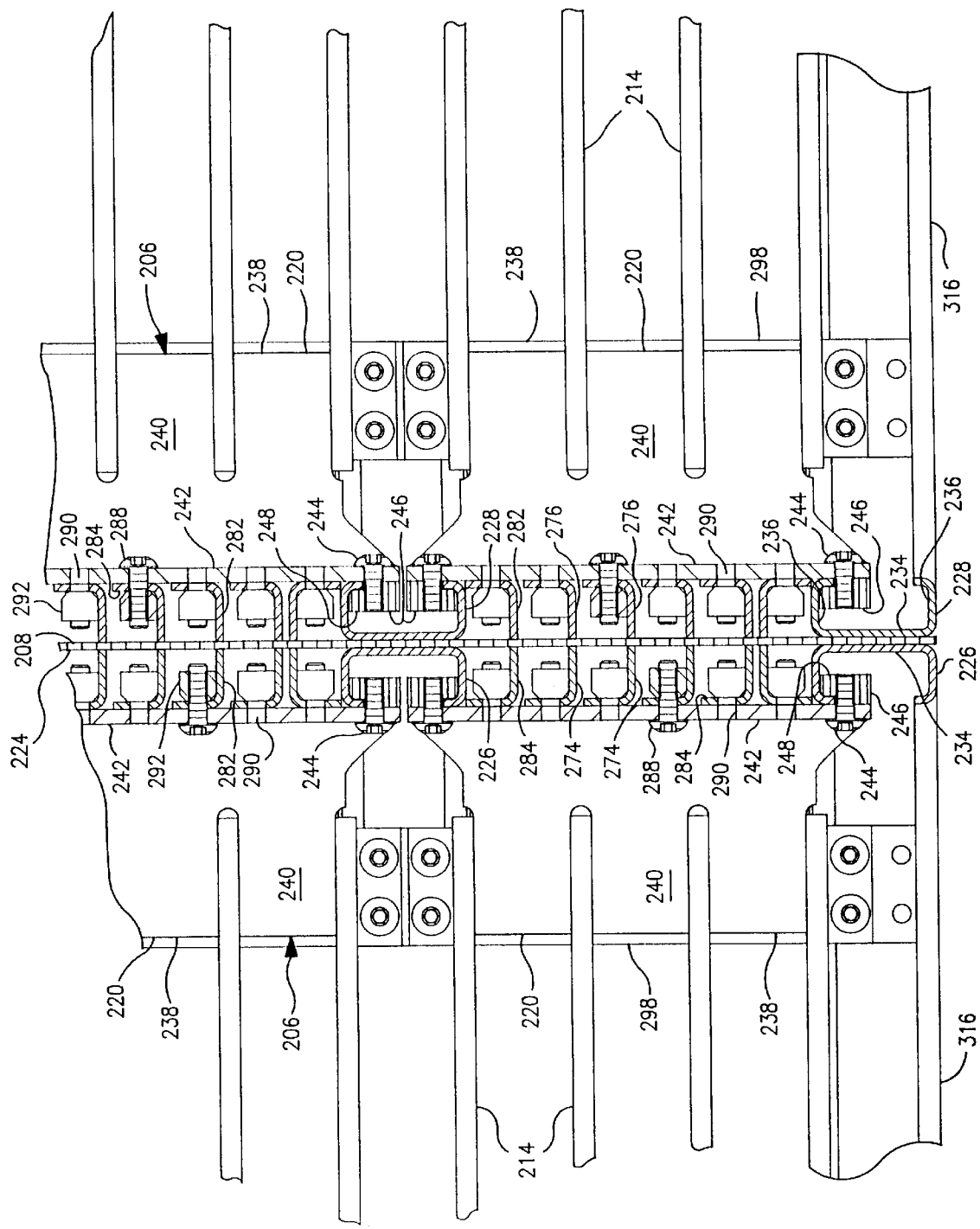
FIG. 13 is a partial top sectional view of the mobile transfer magazine taken generally along line 13—13 of FIG. 10.

FIG. 9 is a perspective view of transfer magazine 54. FIGS. 10–14 illustrate the mobile transfer magazine 54 when deposited in a storage bay 28. A mobile transfer magazine has comb shelves corresponding in number and vertical spacing to the comb shelves of storage magazines the mobile transfer magazine is to transfer cases to or from. For example, mobile transfer magazine 54 transfers cases to and from like 60-case storage magazines 32 and has twelve comb shelves corresponding to and complementary with the comb shelves 102 of the storage magazine 32.

Mobile transfer magazine 54 includes two columns 202, 204 of vertically spaced, horizontal comb shelves 206 extending from opposite sides of a central vertical frame 208. The opposed ends 210, 212 of the comb shelves lie in common vertical planes and define the ends of the mobile transfer magazine 54.

The comb shelves 206 are complementary with the corresponding comb shelves 102 of the storage magazine 32. Each comb shelf 206 includes cantilevered teeth 214 formed from a number of like rods spaced along the length of the comb shelf. The teeth 214 are sized and spaced the same as the teeth 152 of the storage magazine 32 and enable the teeth of the comb shelves 102, 206 to be moved through each other. The teeth extend upwardly at about a 5 degree angle to the horizontal to free ends and include barbs (not shown) like barbs 158 on the teeth 152.

Each comb shelf 206 is movably mounted to the frame 208 for vertical movement along the frame. The comb shelves 202 are biased to move downwardly along the frame 208 and are attached to a lift assembly 218 that selectively raises or lowers the comb shelves with respect to the frame 208. The comb shelves 206 are each subdivided into five side-by-side comb shelf segments 220 corresponding to case storage locations along the shelf. Each comb shelf segment 220 is individually movably mounted to the frame 208 and attached to the lift assembly 218. The comb shelf segments 220 form vertical columns of comb shelf segments and enable the mobile transfer magazine 54 to selectively transfer all or less than all of the cases on a comb shelf of one storage magazine to a comb shelf of another storage magazine.

The frame 208 includes a flat, rectangular central panel 224 and a number of directly opposed pairs of vertical support posts 226, 228 on opposite sides of the panel. The pairs of support posts 226 and 228 are spaced across the width of panel 224 and are attached to opposed sides of the panel 224. U-shaped upper frame beam 310 joins the upper ends of the posts. The inner sides of the comb shelves 206 extend along support posts 226 or 228 with the opposed end portions 230, 232 of the comb shelf segments slideably mounted on the posts.

The support posts 226, 228 are each C-shaped in cross section with a flat web 234 on panel 224 and spaced apart arms 236 extending away from the panel 224. See FIG. 13. Each comb shelf segment 220 includes a mounting bracket 238 located on the inner side of the comb shelf segment and extending the full length of the comb shelf segment. The mounting brackets 238 are L-shaped with a horizontal leg 240 carrying a number of teeth 214 and a vertical leg 242 facing the support posts. Threaded fasteners 244 attach the portions 230, 232 of the vertical legs to a pair of short slide members 246. The slide members 246 are located in the support post arms 236 and extend along the support posts.

Each slide member 246 includes a projection 248 that extends inwardly and slidingly engages the inner side of an arm 236. Each comb shelf segment is attached to a separate pair of slide members which permit vertical movement of the segment on the lift assembly independent of the other comb shelf segments.

The lift assembly 218 includes two sets of vertical push rods 274, 276 mounted on opposite sides of the panel 224. Each set of push rods 274, 276 is located between the panel 224 and a column 202, 204 of comb shelves. The push rods 274, 276 extend along the entire height of the column and face all the comb shelves of the column. The lower end portions 278 of the push rods extend substantially below the panel 224.

The push rods 274, 276 are arranged in groups with each group located in a space between adjacent support posts 226 and 228. There is one push rod 274 or 276 in each group for each comb shelf 206 on the respective side of the lift assembly. Each comb shelf segment 220 is attached to a different push rod 274 or 276 for conjoint vertical movement of the comb shelf segment and the attached push rod. In the embodiment shown the mobile transfer magazine has 60 push rods. A comb shelf segment may be attached to more than one push rod for mobile transfer magazine configurations requiring less than 60 total comb shelf segments.

The push rods 274, 276 are L-shaped in cross section with a spacer leg 282 adjacent to and extending away from the panel 224 and a mounting leg 284 facing a vertical leg 242 of a comb shelf mounting bracket 238. The mounting leg 284 includes vertically spaced mounting holes 286. Each push rod 274, 276 is attached to an associated mounting bracket 238 and held parallel to the support posts by a pair of threaded fasteners 288 that extend through a pair of vertically spaced mounting holes 290 in the vertical leg 242 and two of the mounting holes 286. The ends of the fasteners 288 are screwed into a backing plate 292 extending along the inner side of the push rod from the mounting bracket 238. The backing plate 292 preferably extends below the mounting bracket 238 to receive an additional threaded fastener 294 attaching the backing plate 292 to the push rod. See FIG. 14.

The comb shelf segments 220 and attached push rods 272, 274 are movable along the support posts 226, 228 between raised and lowered positions. The weight of the comb shelf segments 220 and push rods 274, 276 bias the comb shelf segments to slide downwardly along the posts. To establish the lowered position of the comb shelf segments 220, horizontal stop plates 298 are attached to the frame 208 beneath the comb shelves in each column and immediately adjacent the mounting legs 284 of the push rods 274, 276. A stop member 300 attached to leg 284 of each push rod between the comb shelves and stop plate 298 engages the upper surface of the stop plate 298 to establish the lowered position of the comb shelf segments 220.

Figure 14:
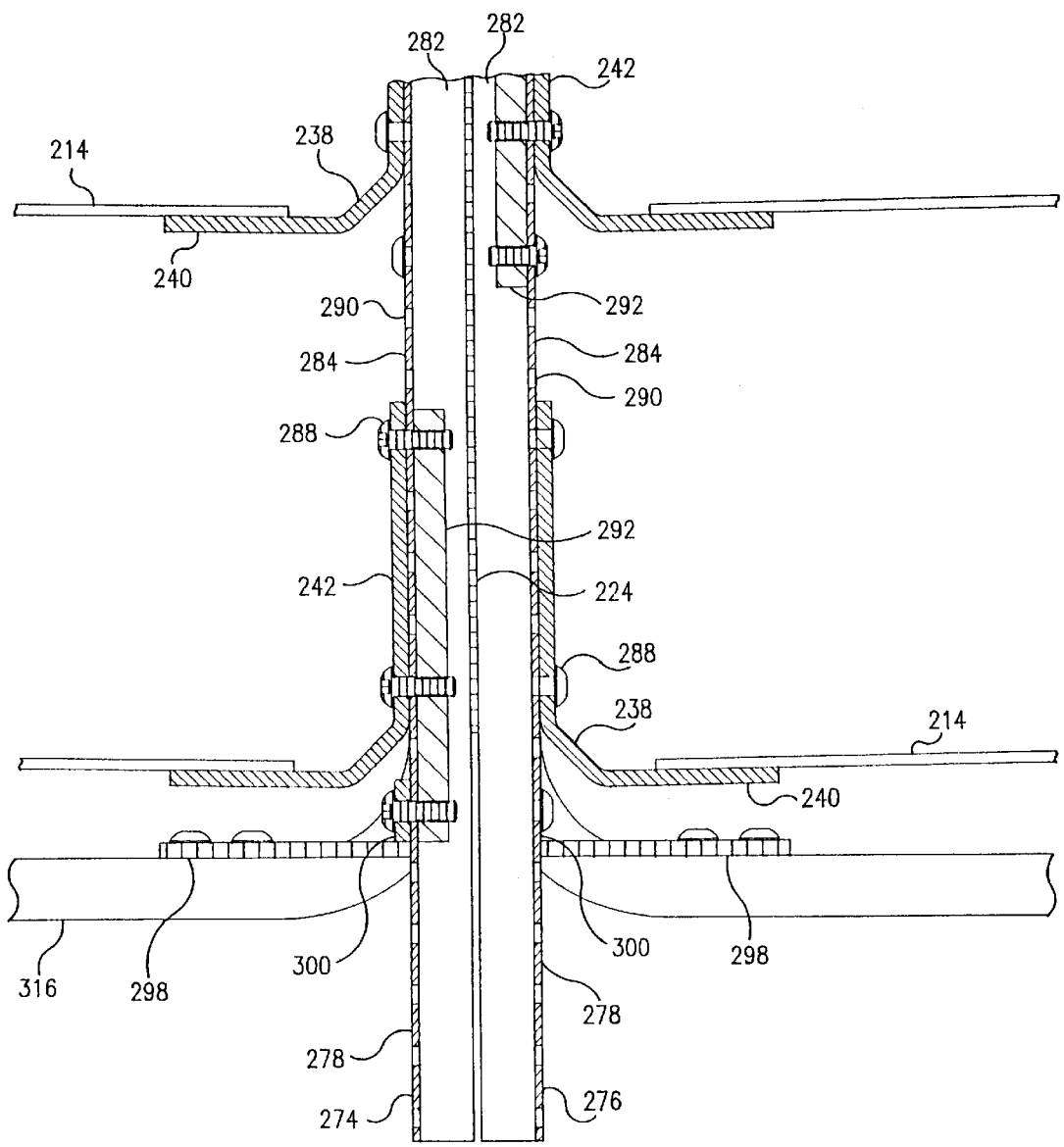
FIG. 14 is a partial side sectional view of the mobile transfer magazine taken along line 14—14 of FIG. 10.

The comb shelf segments 220 normally rest in their lowered positions shown in FIG. 14, with the comb shelve segments 220 along each comb shelf 206 horizontally aligned with one another and the upper and lower ends of the push rods located in common horizontal planes. The upper ends of the push rods are held in channel shaped upper cross beam 310 extending between the outer support posts 226, 228. The beam 310 is in the path of upward movement of the push rods 274, 276 and limits upward movement of the comb shelf segments 220 and push rods 274, 276.

The transfer magazines 54 may be parked in storage bays 28. The transfer magazines rest on magazine supports 350 that extend into the storage bay 28 from the shelf supports 24. The frame 208 includes a base 314 having horizontal legs 316 extending away from each side of the end posts 226 and 228 and cross members 318 joining the free ends of the legs 316. The cross members 318 are spaced apart a distance less than the distance between the outer edges of the comb shelves. Pairs of outer support pins 320 extend outwardly from each cross member 318. When the mobile transfer magazine 54 is parked in the storage bay, the support pins 320 rest in upwardly facing grooves 352 formed on the upper sides of the magazine supports 350. See FIGS. 10 and 11. Because the magazine supports 350 obstruct the upper surface of the shelf supports 24, pallets and storage magazines cannot be stored in storage bays having magazine supports for receiving transfer magazines. Such storage bays are used solely for parking mobile transfer magazines.

Figure 15:
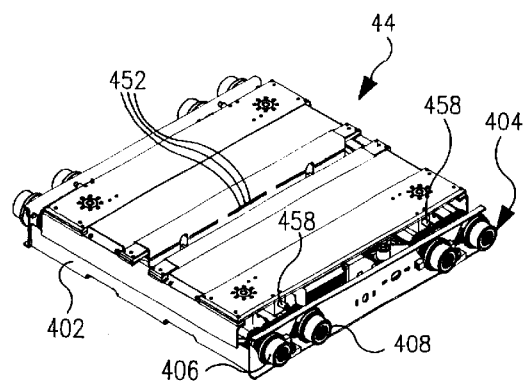
FIG. 15 is a perspective view of the shuttle car robot shown in FIG. 4.
Figure 16:
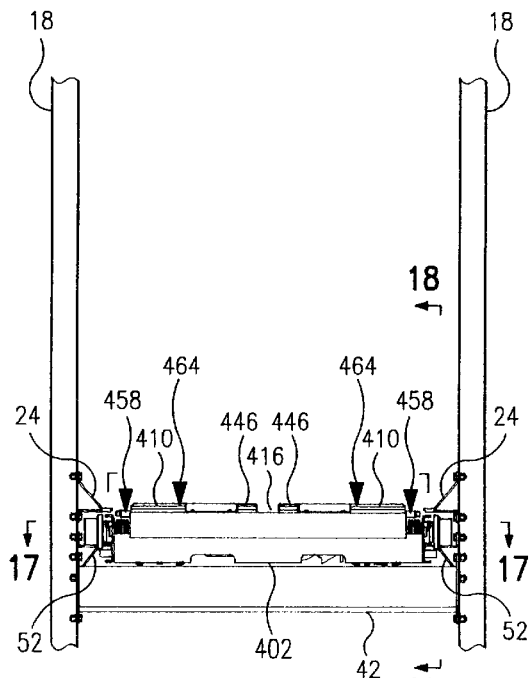
FIG. 16 is a front view of the shuttle car robot shown in FIG. 15 traveling on shuttle rails in a storage rack of the warehouse shown in FIG. 1.
Figure 18:
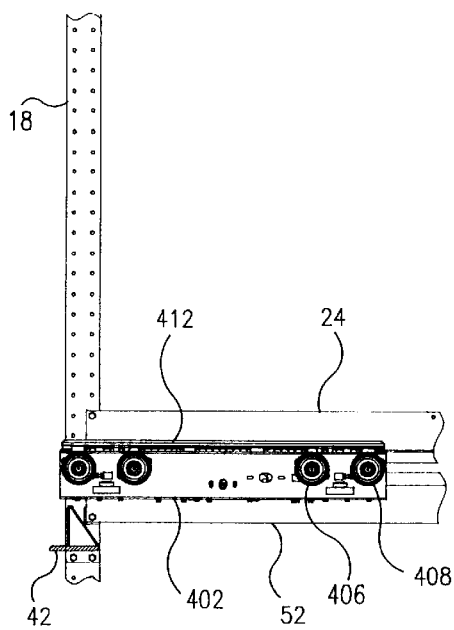
FIG. 18 is a side view of the shuttle car robot taken generally along line 18—18 shown in FIG. 16.
Figure 19:
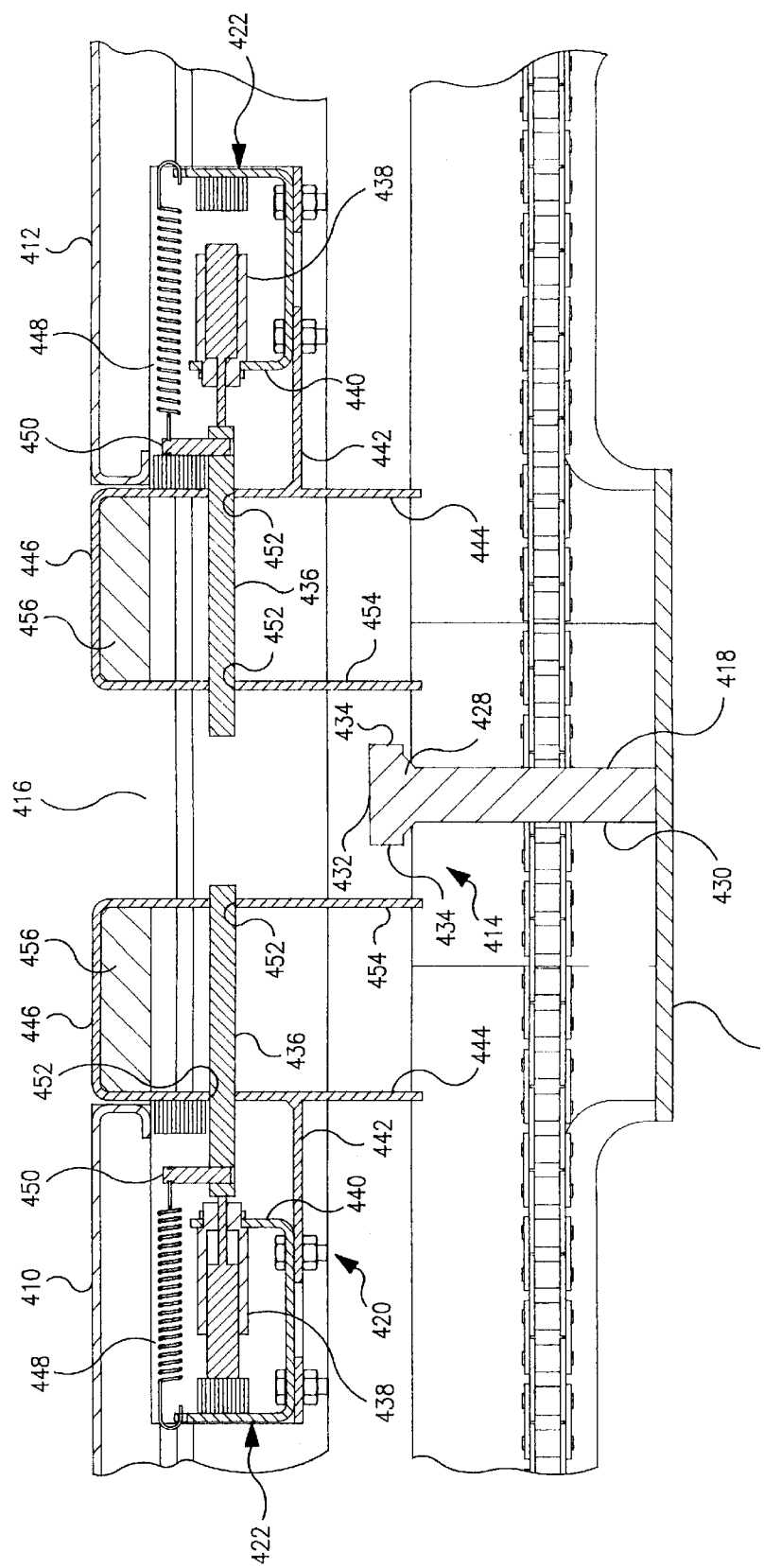
FIG. 19 is a partial front sectional view taken generally along line 19—19 of FIG. 17.

FIG. 15 is a perspective view of a shuttle car robot 44. FIGS. 16–20 illustrate the shuttle car robot 44 on shuttle rails 52 in the storage racks 18.

The shuttle car robot 44 includes a vehicle chassis 402 mounted on sets of drive wheels 404 located at the corners of the chassis. Each wheel set 404 includes a pair of spaced apart wheels 406, 408 that enable the shuttle car robot 44 to bridge gaps between the shuttle rails on a transfer car 40 or stacker crane 36 and the shuttle rails 52 in the storage racks 18 when leaving or entering a transfer car or stacker crane. A conventional wheel drive (not shown) powers the wheels. Lift table 410 is mounted to the chassis 402 and has a flat upper side 412 which carries a pallet or a mobile transfer magazine. The lift table 410 may be raised or lowered from the chassis 402 by a conventional lift drive. The robot shuttle car 44 also includes conventional controls, sensors and auxiliary equipment (not shown) needed for automated operation. The shuttle car robot 44 includes a selector device 414 that enables the shuttle car robot to actuate the lift assembly 218 of a mobile transfer magazine carried on the lift table 410. The selector device 414 includes an open, central recess 416 that extends across the lift table 410 between the wheels and a lift support beam 418 mounted to the chassis 402 below the recess. An actuator assembly 420 mounted to and moveable with the lift table has a number of actuators 422 spaced along each side of the recess 416 with a separate actuator for each push rod 274, 276 supporting a comb shelf segment. The actuators 422 face the lift support beam 418 when the lift table 410 is in its lowest position.

The lift support beam 418 extends along the centerline of the recess 416 and includes a rectangular upper support portion 428 centered on a rectangular spacer portion 430. The spacer portion 430 positions the upper side 432 of the support portion 428 below the upper side 412 of the lift table 410 when the lift table 410 is in its lowest position.

The actuator assembly 420 is located below lift table 410. The actuators 422 face the vertical sides 434 of the support portion 428 when the lift table is lowered. Each actuator 422 moves a selector pin 436 between a normal retracted position (shown on the left in FIG. 19) away from the support portion 428 and an extended position (shown on the right in FIG. 19) in which the pin 436 extends into the recess 416 to be adjacent to side 434 of the support portion 428 of beam 418. Each pin 436 is associated with a different push rod of the lift assembly of a mobile transfer magazine as will be explained in greater detail below.

The selector pins 436 are connected to solenoids 438 that drive the pins 436 between retracted and extended positions. The solenoids 438 are carried on brackets 440 spaced along horizontal mounting plates 442 extending from the outer legs 444 of a pair of inverted "U" shaped channels 446 that extend along both sides of the recess 416. A tension spring 448 connected between each bracket 440 and a member 450 mounted on the selector pin 436. The spring biases the pin 436 towards the retracted position. The selector pins 436 extend through pairs of horizontally aligned holes 452 in the outer and inner legs 444, 454 of the channels 446. The channels 446 are fastened to inner lift table beams 456 at the upper ends of the recess 416.

The lift table 410 includes four pin assemblies 458 which support the storage magazine on the shuttle car robot 44. The capability of the assemblies 458 does not affect the ability of the vehicle to store and retrieve loaded pallets in the conventional manner. The width of the lift table 410 is preferably less than the distance between the legs 136 of the storage magazine 32 so that the lift table 410 can be raised between the legs of the storage magazine.

Two pin assemblies 458 are located on each side of the lift table 410. See FIGS. 15 and 20. The pin assemblies 458 include movable horizontal pins 460 that, when extended, engage the legs of a storage magazine when the storage magazine is carried on the shuttle car robot. Lift pins 460 extend and retract from both sides of the lift table 410. The lift pins 460 are journaled in outer lift table beams 464 and are driven between extended and retracted positions by lift pin actuators 466. When extended the lift pins 460 extend outwardly beyond the lift table 410 and when retracted are within the lift table 410. The lift pins 460 are extended and fit in notches 136 on the legs of a storage magazine carried by a robot 44.

Each lift pin actuator 466 includes a pneumatic cylinder 468 having a piston rod 470 attached to a pin 460 to extend and retract the lift pin in the shuttle car robot. See FIG. 20.

Figure 17:
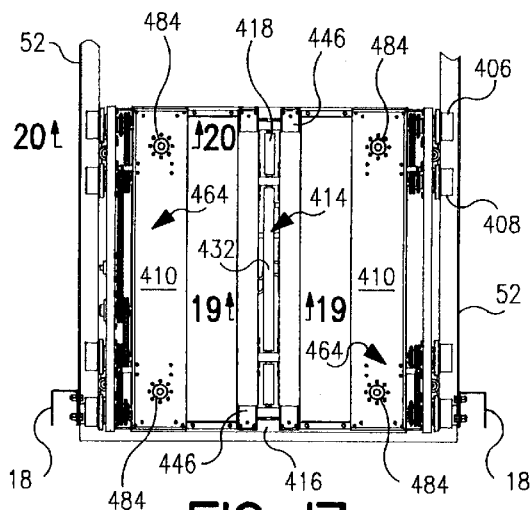
FIG. 17 is a top view of the shuttle car robot taken generally along line 17—17 of FIG. 16.
Figure 20:
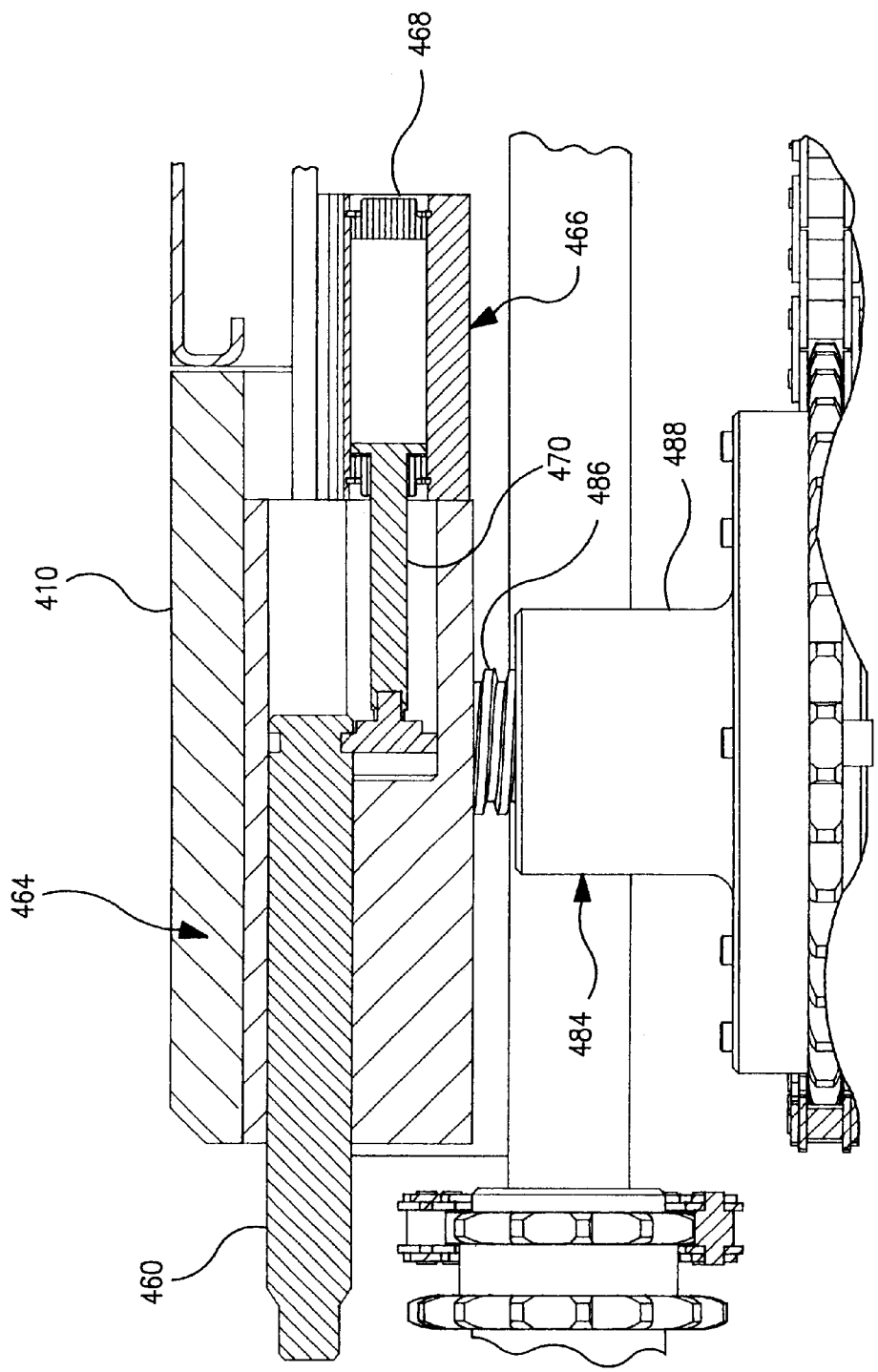
FIG. 20 is a partial front sectional view taken generally along line 20—20 of FIG. 17.

Lift table 410 is raised and lowered by four lift assemblies 484 shown in FIGS. 17 and 20. Each lift assembly includes a threaded post 486 mounted on one corner of the lift table and a hub 488 threadably mounted on the post. The hub bears on the bottom of the shuttle car robot 44. Simultaneous rotation of the four hubs 488 raises and lowers the lift table. The hubs are simultaneously rotated by a chain drive and are conventional.

Figure 23:
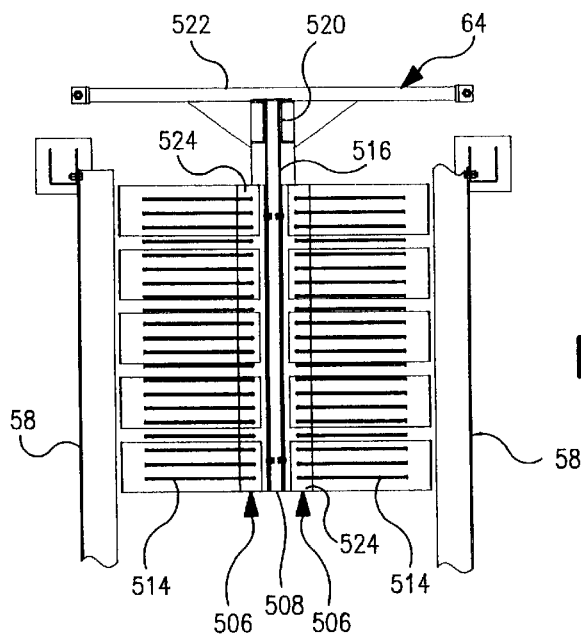
FIG. 23 is a top view of the fixed transfer magazine taken generally along line 23—23 of FIG. 22.
Figure 21:
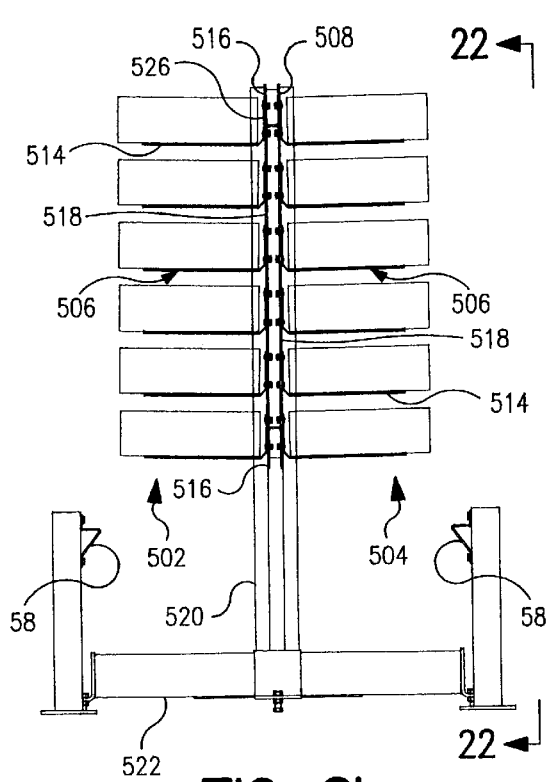
FIG. 21 is a front view of a fixed transfer magazine of the present invention taken generally along line 21—21 of FIG. 2.
Figure 22:
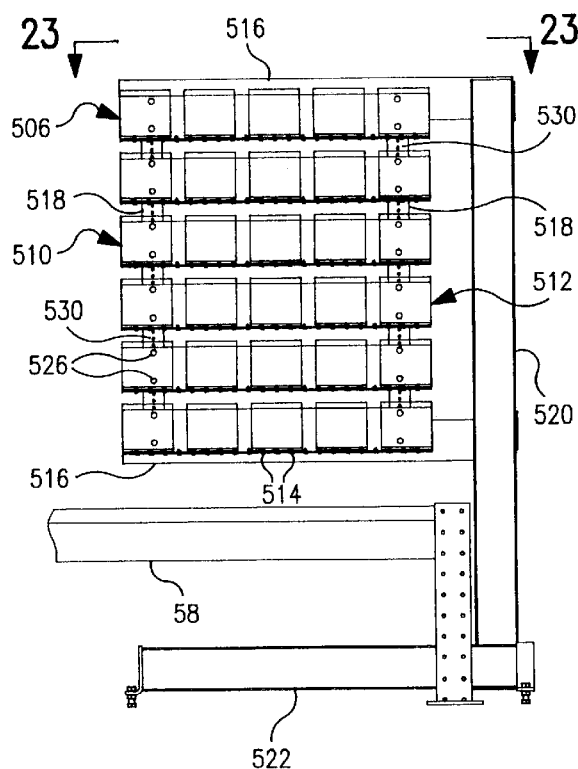
FIG. 22 is a side view of the fixed transfer magazine taken generally along line 22—22 of FIG. 21.
Figure 24:
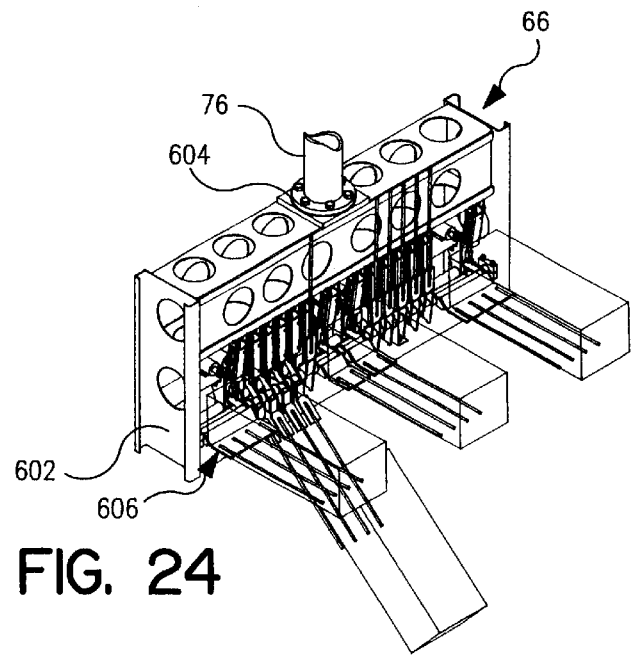
FIG. 24 is a perspective view of an end effector of the present invention in the induction area of the warehouse shown in FIG. 1.
Figure 26:
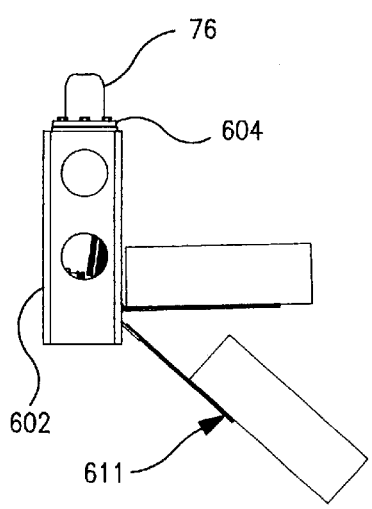
FIG. 26 is a side view of the end effector taken generally along line 26—26 of FIG. 25.
Figure 25:
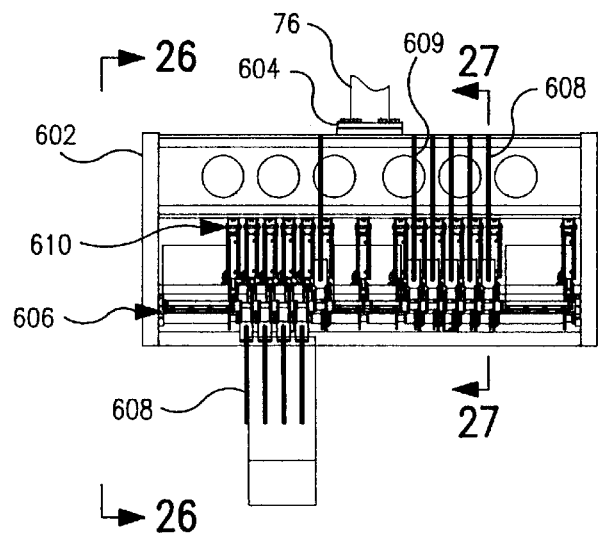
FIG. 25 is a front view of the end effector shown in FIG. 24 taken generally along line 25—25 of FIG. 1.

FIGS. 21–23 illustrate a fixed transfer magazine 64. Fixed transfer magazines are used to load and unload storage magazines in the induction area and discharge area respectively. A fixed transfer magazine may be used in either the induction area or discharge area.

Fixed transfer magazine 64 has two columns 502, 504 of vertically spaced horizontal comb shelves 506 extending from opposite sides of a central frame 508 mounted on the floor of the warehouse. The comb shelves on one side of the frame are horizontally aligned with the comb shelves on the other side of the frame. The opposed ends 510, 512 of the comb shelves 506 are in common vertical planes with the one end 510 of the comb shelves defining the front end of the fixed transfer magazine facing the shuttle rails 58.

Each comb shelf 506 is complementary with a corresponding comb shelf of the storage magazine to facilitate transfer cases between them. The width and spacing of the teeth 514 of each comb shelf 506 is the same as the width and spacing of the teeth 152 of the storage magazines 32 and enable the comb shelves 102, 506 to intermesh and pass each other.

The frame 508 is centered between shuttle rails 58 and includes upper and lower horizontal beams 516 that extend along the length of the comb shelves. The beams 516 are joined by pairs of spaced flat vertical channels 518 that support the inner sides of the comb shelves 506. Beams 516 are joined to vertical support post 520 which extends down from the beams 516 to a T-shaped base 522 attached to the warehouse floor.

Each comb shelf 506 is fixedly attached to the central frame 508 and includes a single elongate L-shaped mounting bracket 524 that extends between the channels 518. Bolts 526 mount the vertical leg of the bracket to the plates. Each channel 518 includes a number of vertically spaced bolt holes 530 that enable the number and vertical spacing of the comb shelves mounted on the frame to be changed as necessary. The teeth 514 of the comb shelves 506 are mounted to the horizontal leg of the mounting bracket 524.

FIGS. 24–29 illustrate induction area end effector 66, which is identical to discharge area end effector 80. End effector 66 has a generally rectangular frame 602 mounted to the gantry robot vertical and rotating drive shaft 76 by a mounting flange 604. One side of a comb shelf 606 is pivotally mounted to the frame 602 to rotate about a horizontal axis. The shelf has a number of cantilevered, parallel teeth 608 uniformly spaced along one side of the frame 602. The teeth 608 are complementary with the teeth 516 of the fixed transfer magazine 64 to enable the comb shelves 506, 606 to intermesh with each other.

The comb shelf 606 is normally held in a horizontal load support position. The comb shelf 606 includes individual segments 608 that rotate up from the support position towards the frame to a retracted vertical position 609 shown in FIG. 26. Each segment may have one or more teeth on the segment. The segments may be rotated down from the support position to discharge position 611 where the teeth slope downwardly at about 45 degrees to enable cases to slide off the segment.

A comb shelf drive 610 pivots each comb shelf segment 608 between the retracted, extended and discharge positions. The drive 610 is mounted in frame 602 and includes an actuator for each comb shelf segment 608. See FIGS. 27–29.

Each comb shelf segment 608 is mounted to a common horizontal shaft 616 held in the frame 602 and includes a pivot plate 618 journaled on the shaft 616. The pivot plate 618 has opposed ends 620, 622 spaced away from the pivot shaft 616, with teeth 608 attached to the end 620 of the pivot plate 618. The longitudinal axes of the segment teeth extend through the horizontal axis of the shaft 616. A pneumatic cylinder 626 is pivotally fastened to the frame 602 and has a piston rod 628 pivotally fastened to the other end 622 of the pivot plate 618. Extension and retraction of piston 626 rotates the pivot plate 618 about the shaft 616. When the cylinder is fully extended, segment 608 is positioned in the vertical, retracted position with teeth 608 engaging spaced stop strips 632 on the frame 602. When the cylinder is fully retracted, the segment 608 is in the discharge position. In the discharge position the segment may also engage a stop member.

Each actuator includes a stop assembly 614 that establishes the horizontal extended position of the segment. The stop assembly 614 includes pivot plate projection 633 on plate 618. Projection 633 extends radially away from the shaft 616. A stop member 634 is mounted on a side of a stop plate 636 facing the pivot plate 618. The stop plate 636 is journaled on a second common horizontal shaft 638 attached to the frame 602 parallel to the pivot shaft 616. Solenoid 640 is mounted on a common U-shaped channel 642 attached to the frame 602 parallel to the horizontal shaft 638. Solenoid plunger 644 is pivotally mounted to an end of the stop plate 636 adjacent the stop member 634. Extension of the plunger 644 rotates the stop plate 636 about shaft 638 and moves the stop member 634 into the path of movement of the pivot plate projection 633. A tension spring 646 mounted between the frame 602 and the stop plate 636 biases the stop member 634 into the path of movement of the pivot plate projection 633.

When the stop member 636 is in the path of the pivot plate projection 633 as the segment 609 pivots from its retracted position the pivot plate projection 633 engages the stop member 636 to establish the extended position of the segment. Retraction of the solenoid plunger 644 disengages the stop member 636 from the pivot plate projection 633 and enables the segment to move to the discharge position. Leg 648 of the channel 642 extends into an opening 650 formed in the outer edge of stop plate 636 and engages the spaced apart sides of the opening 650 to limit rotation of the plate and establish the extended and retracted positions of the solenoid plunger 644.

A number of case induction carts 68 are spaced across the induction area 12 as illustrated in FIG. 2. Individual cases are placed in shelves in the induction carts, for pick up by end effector 66 and placement in a transfer magazine 64, as described below. Each case induction cart includes a vertical column of three comb shelves. See FIG. 30. Each comb shelf 702 is complementary with the comb shelf 606 of the end effector 66. The spacing of the teeth 704 of the comb shelves 702 is the same as the spacing of the teeth 608 of comb shelf 606 and enable the comb shelves 702, 606 to intermesh with one another. A number of gravity discharge roller conveyors 84 are spaced across the discharge area 16 as shown in FIG. 2. The conveyors 84 are used in making up individual orders of diverse cases picked from cases stored in the bays in racks 18. The selected cases are delivered to conveyors 84 by end effector 80.

Operation of the automated storage and retrieval system will now be described. The system can store and retrieve conventional pallets of unitized goods as well as separate cases of goods. The storage and retrieval of pallets is conventional and need not be described.

Warehouse 10 can store and retrieve different size cases. For example, the warehouse receives smaller cases sized to make up a 96-case pallet load and larger cases sized to make up a 4-case pallet load. The system uses differently configured storage magazines and mobile transfer magazines for groups of size cases stored in the warehouse. Case induction carts and fixed transfer magazines are located in the warehouse induction area for each case size and fixed transfer magazines are located in the warehouse discharge area for each case size group.

Cases are stored and retrieved using the appropriate storage magazines, transfer magazines and case induction carts for the case size group. For purposes of illustration the storage and retrieval of cases from a 96-case pallet load will be described, it being understood that the same methods are used to store and retrieve different size cases.

Cases are received in the warehouse induction area 12, typically on pallets. The cases are separated if necessary and manually loaded onto case induction carts 68.

All subsequent case transfers throughout the system are automated and controlled by the inventory control system. The inventory control system tracks and maintains the identity and location of individual cases from the case induction cart and throughout the storage, retrieval and discharge of cases from the warehouse.

The inventory control system tracks the location of each case from input to discharge. An operator normally loads cases onto a comb shelf 702 of the case induction carts 68. The operator inputs the identity and the location of the cases on the shelf to the inventory control system. The operator then signals the inventory control system that end effector 66 should transfer cases from the case induction cart comb shelf to a comb shelf of the fixed transfer magazine 64. The inventory control system determines which cases are to be transferred from the case induction cart 68 to the fixed transfer magazine 64. For example, if the fixed transfer magazine is being loaded with cases of just one particular good, then only such cases of goods would be transferred to the fixed transfer magazine.

The induction area gantry robot 70 transports the end effector 66 to the case induction cart 68. The comb shelves 702 of the case induction cart 68 are located beneath the gantry robot 704 with the teeth 704 extending towards the storage racks 18. The gantry robot positions the end effector comb shelf adjacent the comb shelf of the case induction cart. If all of the cases on the induction cart comb shelf are to be transferred to the fixed transfer magazine, all the teeth of the end effector comb shelf are extended. If less than all of the cases are to be transferred, the appropriate teeth of the end effector comb shelf are extended and the others retracted, with the retracted teeth facing shelf locations on the induction cart comb shelf that will not participate in the case transfer.

The inventory control system extends or retracts the teeth of the end effector comb shelf 606 so that the comb shelf 606 is divided into comb shelf segments compatible with the size and location of the cases being transferred. The ability to divide the end effector comb shelf into variably sized shelf segments enables the induction end effector to be used with any case induction cart or fixed transfer magazine, regardless of case size. Normally like cases are loaded on each induction cart comb shelf and all segments of the effector comb shelf are extended during the induction process.

The ability to selectively transfer any case from a case induction cart to a fixed transfer magazine may not be needed and the segments of the induction end effector comb shelf may be fixedly attached in the extended position and the comb shelf drive eliminated.

Figure 30:
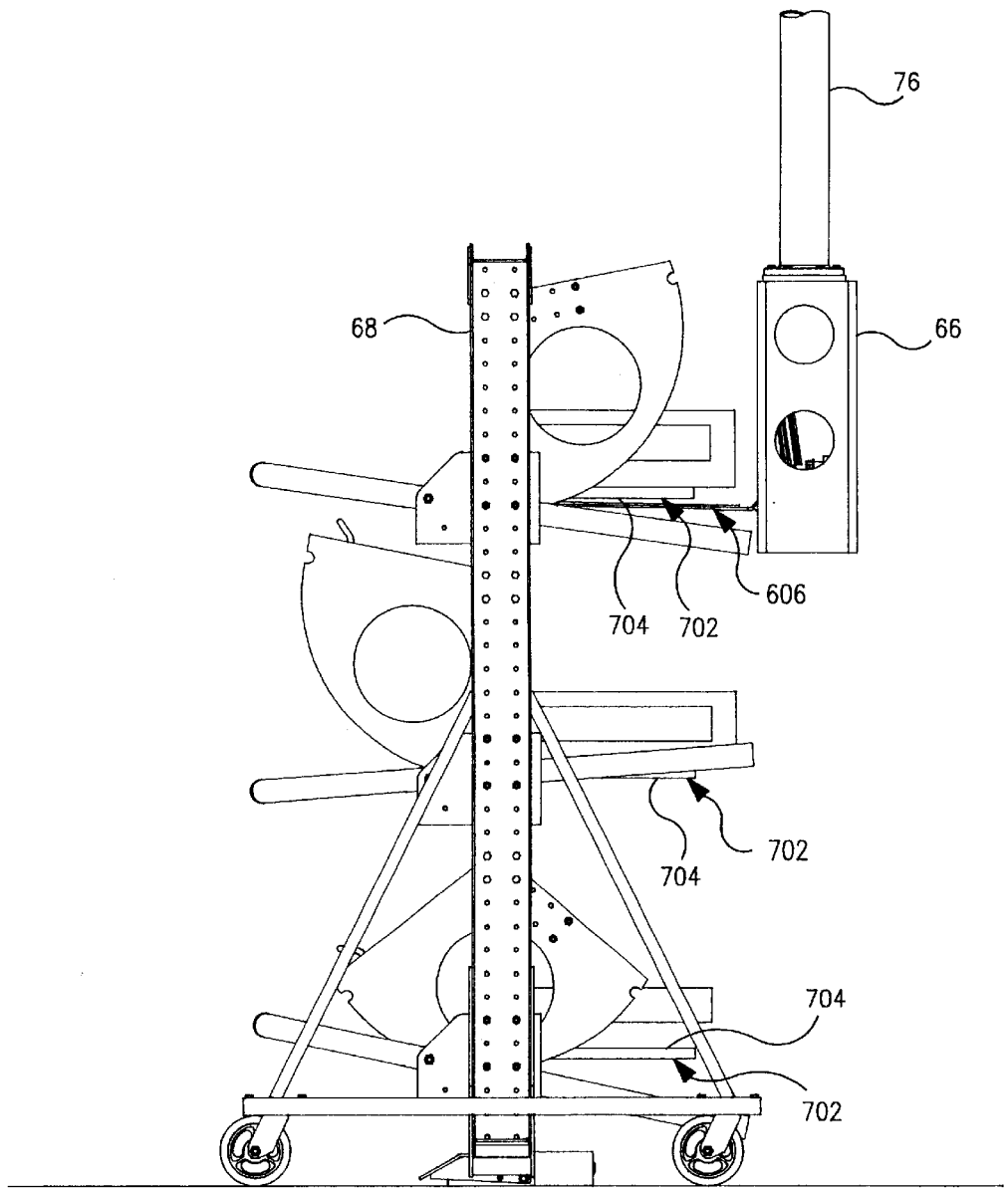
FIG. 30 is a side view of the case induction cart shown in FIG. 1 and the end effector shown in FIG. 25 in the transfer position prior to the transfer of a case from the case induction cart to the end effector.

As illustrated in FIG. 30, gantry robot 70 moves the comb shelf 606 of the end effector 66 to a transfer position adjacent the loaded induction cart comb shelf 702. In FIG. 30, cases 706 are to be transferred from the uppermost induction cart comb shelf 702. In the transfer position the teeth of the two comb shelves 606, 702 are horizontally offset from each other with the comb shelf 606 below the induction cart comb shelf 702.

The gantry robot 70 then raises the end effector 66 so that the extended teeth of the end effector comb shelf 606 pass the teeth of the induction cart comb shelf 702 and pick up the cases from the induction cart comb shelf 606. Any cases facing the retracted teeth remain on the cart shelf and are not transferred to the end effector. The gantry robot then withdraws the end effector and its loaded comb shelf from the case induction cart.

The gantry robot 70 carries the loaded end effector 66 to a fixed transfer magazine 64 and transfers the cases from the end effector to a comb shelf 506 in the fixed transfer magazine 64. The inventory control system determines which comb shelf of the fixed transfer magazine is to receive the cases from the end effector. For example, if the transfer magazine will carry only cases of identical goods, the inventory control system may simply select the nearest empty comb shelf. If the transfer magazine is to carry mixed cases of goods, each comb shelf may carry like cases different from the cases on other comb shelves.

Figure 31:
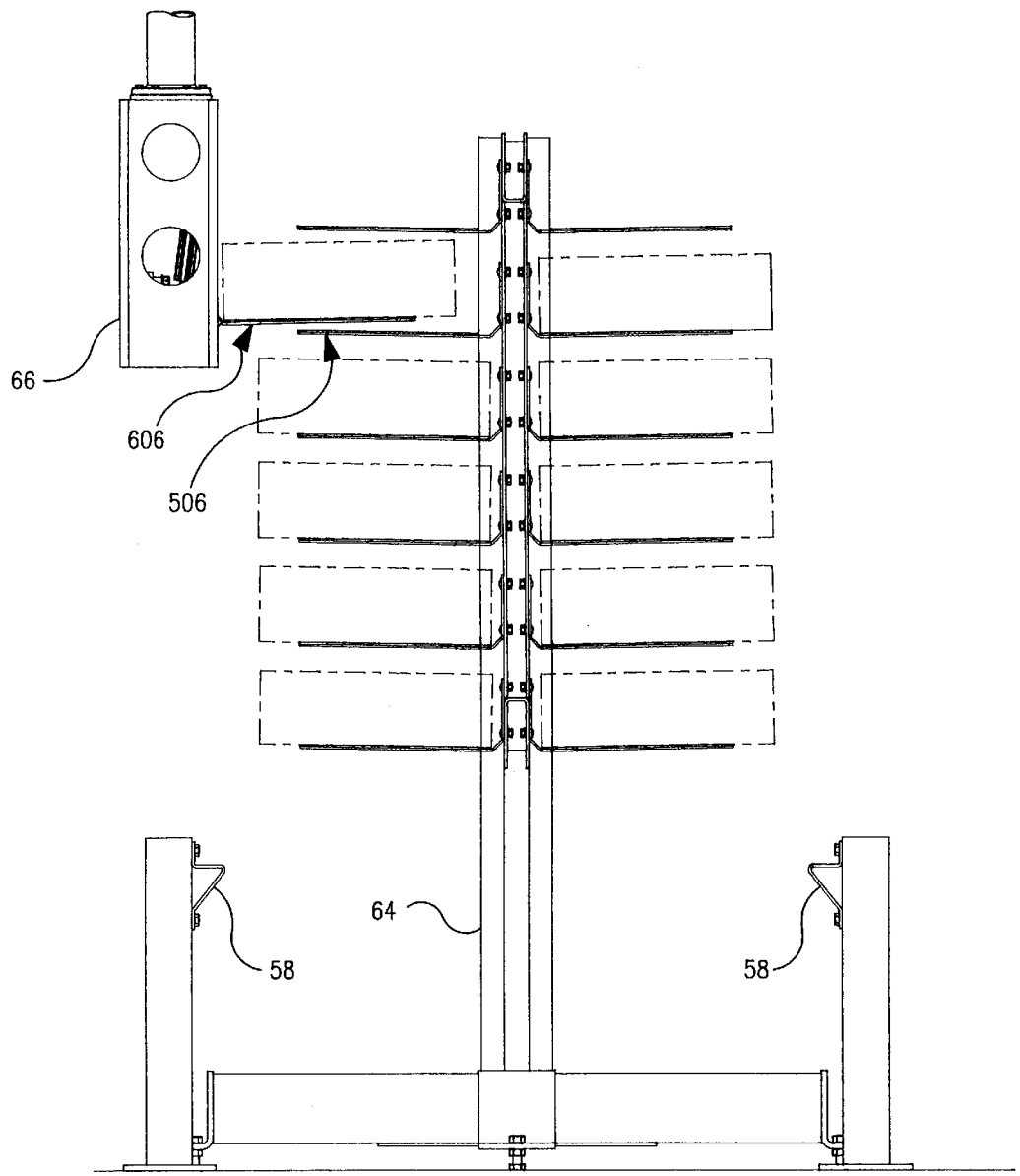
FIG. 31 is a side view of the end effector shown in FIG. 30 and the fixed transfer magazine shown in FIG. 21 in the transfer position prior to a transfer of the case from the end effector to the fixed transfer magazine.

As illustrated in FIG. 31, the gantry robot positions comb shelf 606 in a transfer position above the designated comb shelf 506 of the fixed transfer magazine 64 with the teeth of the two comb shelves horizontally offset from each other. The gantry robot then lowers the end effector so that the extended teeth of the end effector comb shelf 606 intermesh with and pass the teeth of the fixed transfer magazine comb shelf 506, transferring the cases from the end effector to the fixed transfer magazine. When fully loaded, the fixed transfer magazine will hold 60 cases from a 96-case pallet load.

As illustrated in FIG. 2, the fixed transfer magazines 64 are mounted on the warehouse floor with the support posts 520 located adjacent the induction carts 68 and away from the storage racks 18. Mounting of the fixed transfer magazines in this position permits shuttle car robots 44 carrying storage magazines 32a to travel from a stacker crane along shuttle rails 58 and move the storage magazines into transfer relationships with transfer magazines loaded with cases.

Figure 32:
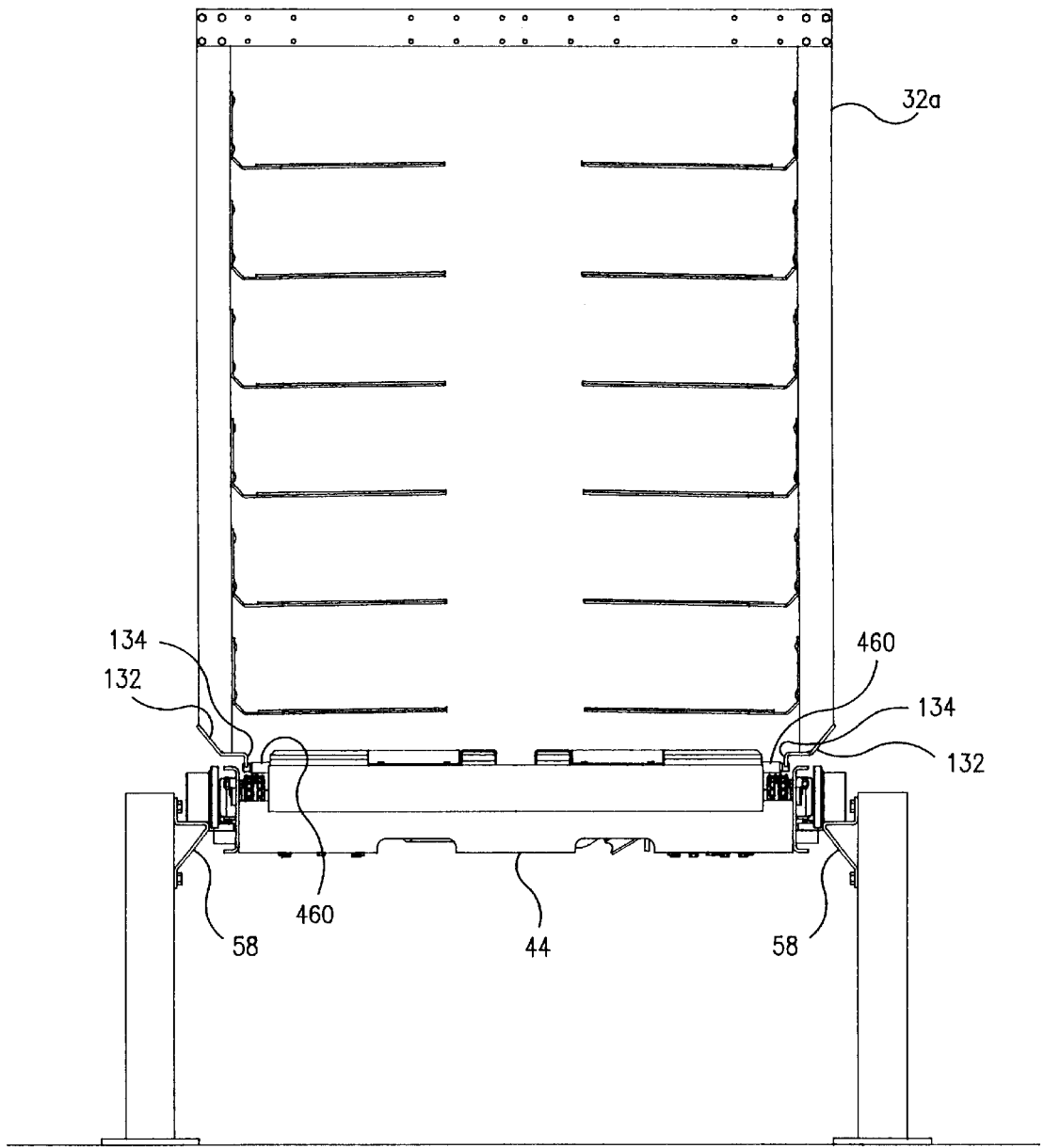
FIG. 32 is a view of the shuttle car robot transporting an empty storage magazine to the fixed transfer magazine shown in FIG. 21 along shuttle rails in the induction area of the warehouse.

After the comb shelves of the fixed transfer magazine 64 are loaded, the cases are transferred from the fixed transfer magazine 64 to an empty storage magazine 32a. FIG. 32 illustrates an empty storage magazine 32a carried on a shuttle car robot 44. The robot 44 has transported the storage magazine from the stacker crane 36 in aisle 20a onto rails 58. The storage magazine 32a is supported on the extended lift pins 460 of the shuttle car robot lift table with each lift pin 460 received in one of the notches 136 formed on the bottom of the legs 132 of the storage magazine. The lift table 410 is in its lowered position.

The shuttle car robot 44 moves along the shuttle rails 58 to the fixed transfer magazine 64. The shuttle rails 58 extend into the front end 510 of the fixed transfer magazine from the storage rack 18a.

Figure 33:
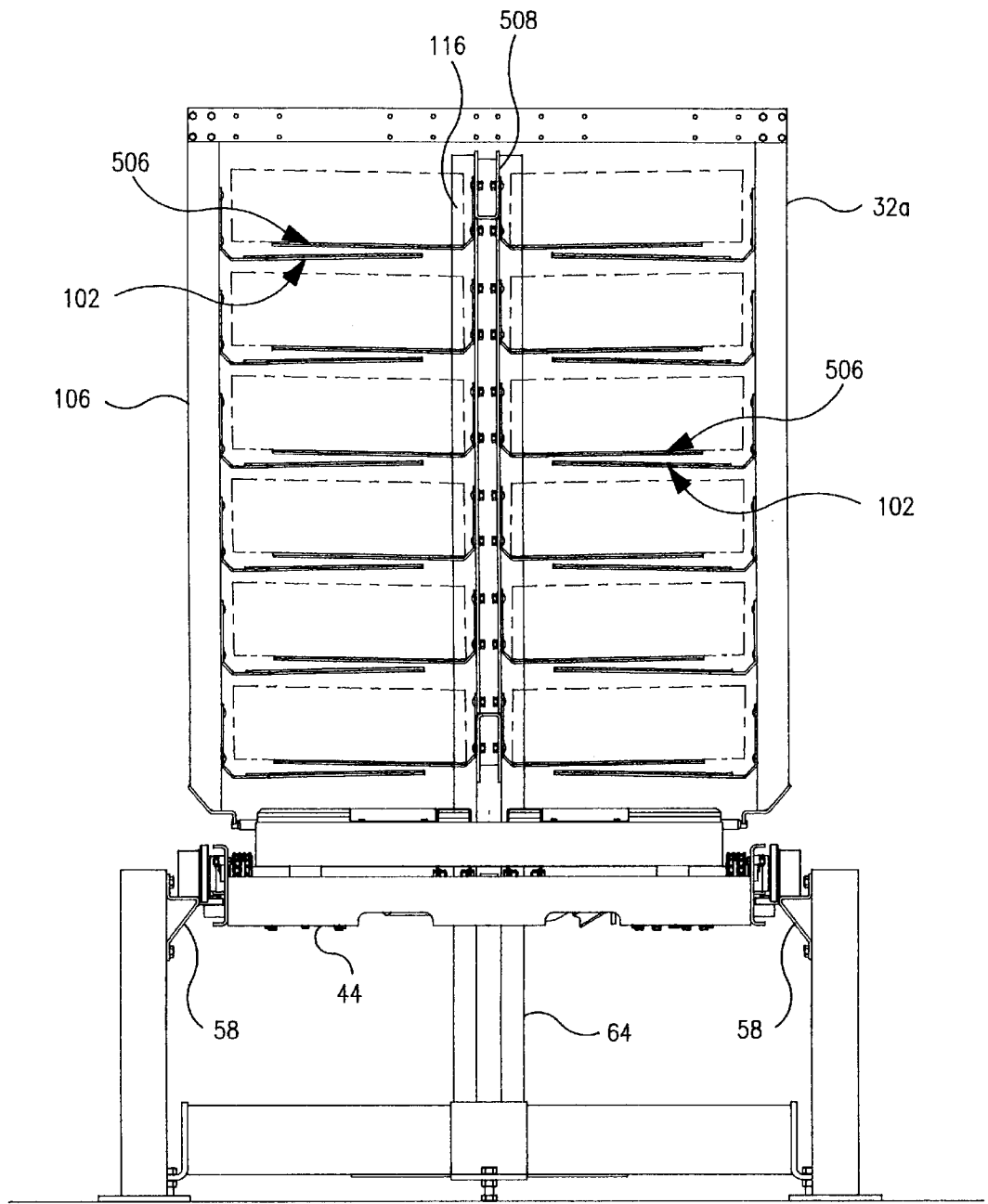
FIG. 33 is a view of the shuttle car robot after placing the storage magazine shown in FIG. 32 in the transfer position with the loaded fixed transfer magazine shown in FIG. 21 prior to a transfer of cases from the fixed transfer magazine to the storage magazine.

The shuttle car robot moves magazine 32a into the fixed transfer magazine 64 as shown in FIG. 33. The comb shelves 102 of the storage magazine 32a are located below the complementary comb shelves 506 of the fixed transfer magazine 64.

The shuttle car robot 44 stops when the storage magazine 32a reaches the transfer position with respect to the fixed transfer magazine 64, with the teeth of the storage magazine comb shelves 102 horizontally offset from and below the teeth of the fixed transfer magazine comb shelves 506. The outer frame of the storage magazine 32a surrounds the fixed transfer magazine 64 and the frame of the fixed transfer magazine is received in the gap 116 between the columns of comb shelves of the storage magazine 32a.

Figure 34:
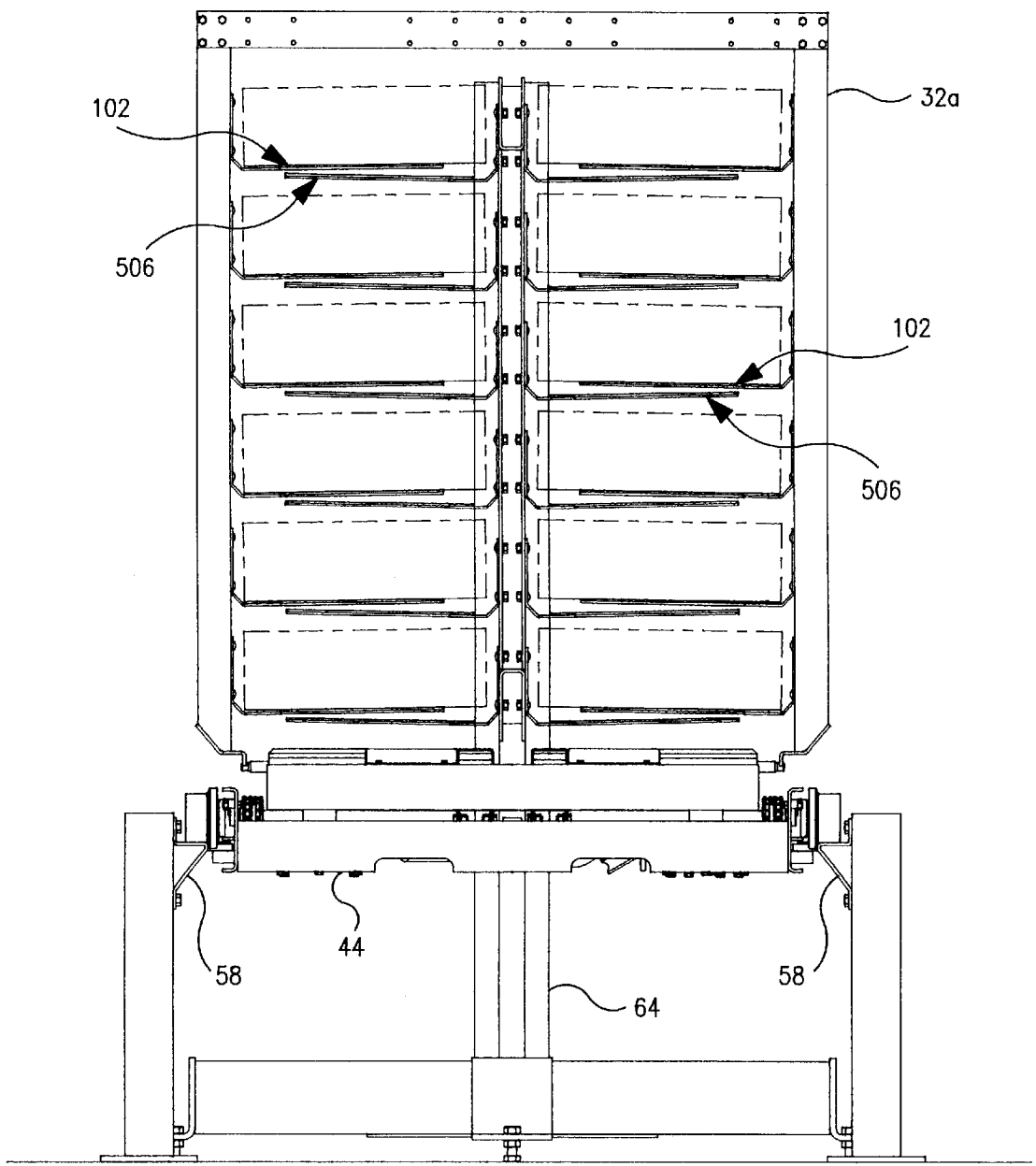
FIG. 34 is similar to FIG. 33 but after the transfer of cases from the fixed transfer magazine to the storage magazine.

The shuttle car robot lift table 410 is then raised to its maximum height and raises the storage magazine 32a. The comb shelves 102 of the storage magazine 32a simultaneously intermesh with and pass the corresponding comb shelves 506 of the fixed transfer magazine 64 to transfer the cases from the comb shelves of the fixed transfer magazine 64 to the storage magazine 32a. See FIG. 34.

After the transfer is completed, the shuttle car robot withdraws the storage magazine 32a from the fixed transfer magazine 64. The lift table 410 remains raised as the now loaded storage magazine 32a is withdrawn from the now empty fixed transfer magazine 64. After the storage magazine 32a is completely withdrawn from the fixed transfer magazine, the robot lift table 410 lowers for transport of the storage magazine 32a to the stacker crane 36 located in aisle 20a.

Figure 35:
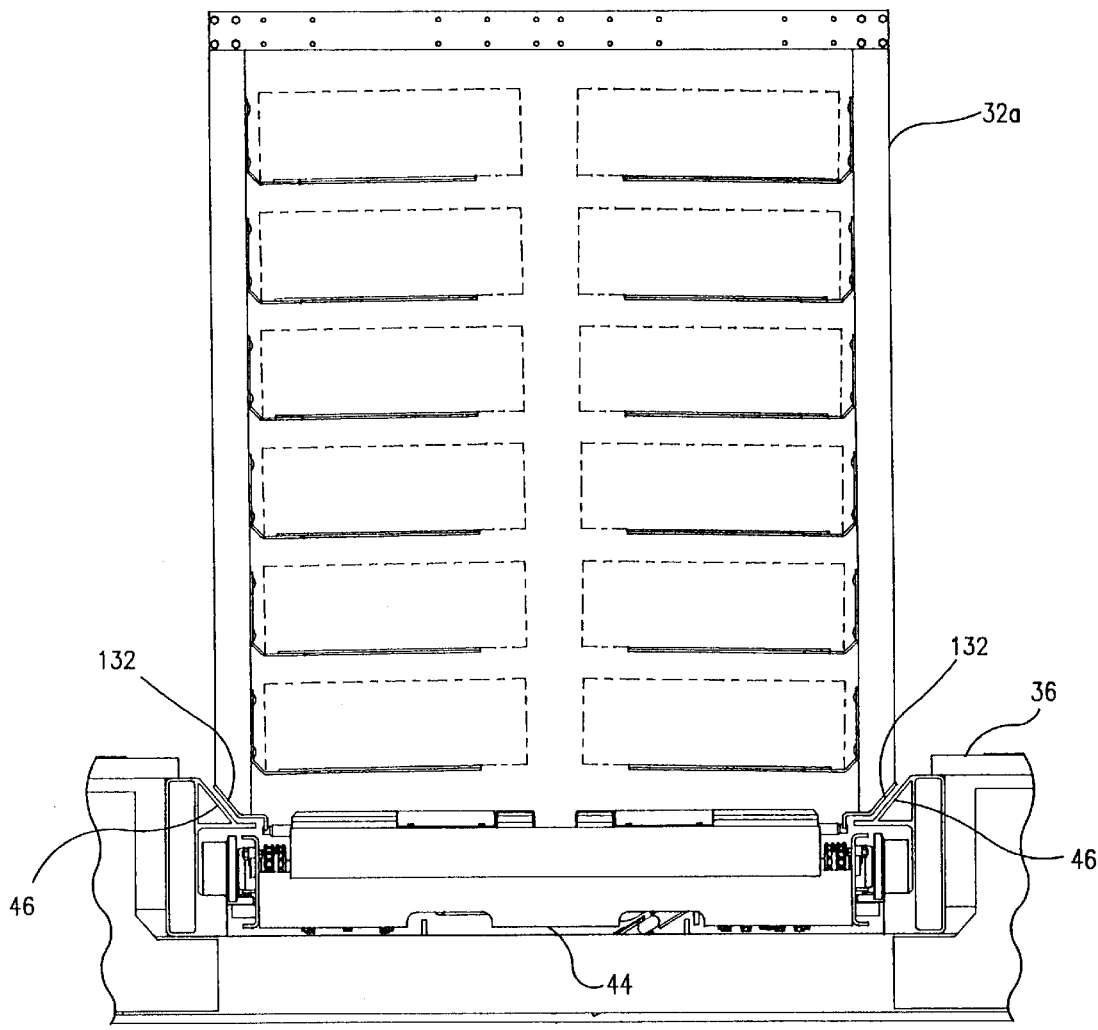
FIG. 35 is a front view of the shuttle car robot and storage magazine shown in FIG. 34 on the stacker crane lift platform in the outer transport aisle adjacent the induction area of the warehouse.
Figure 36:
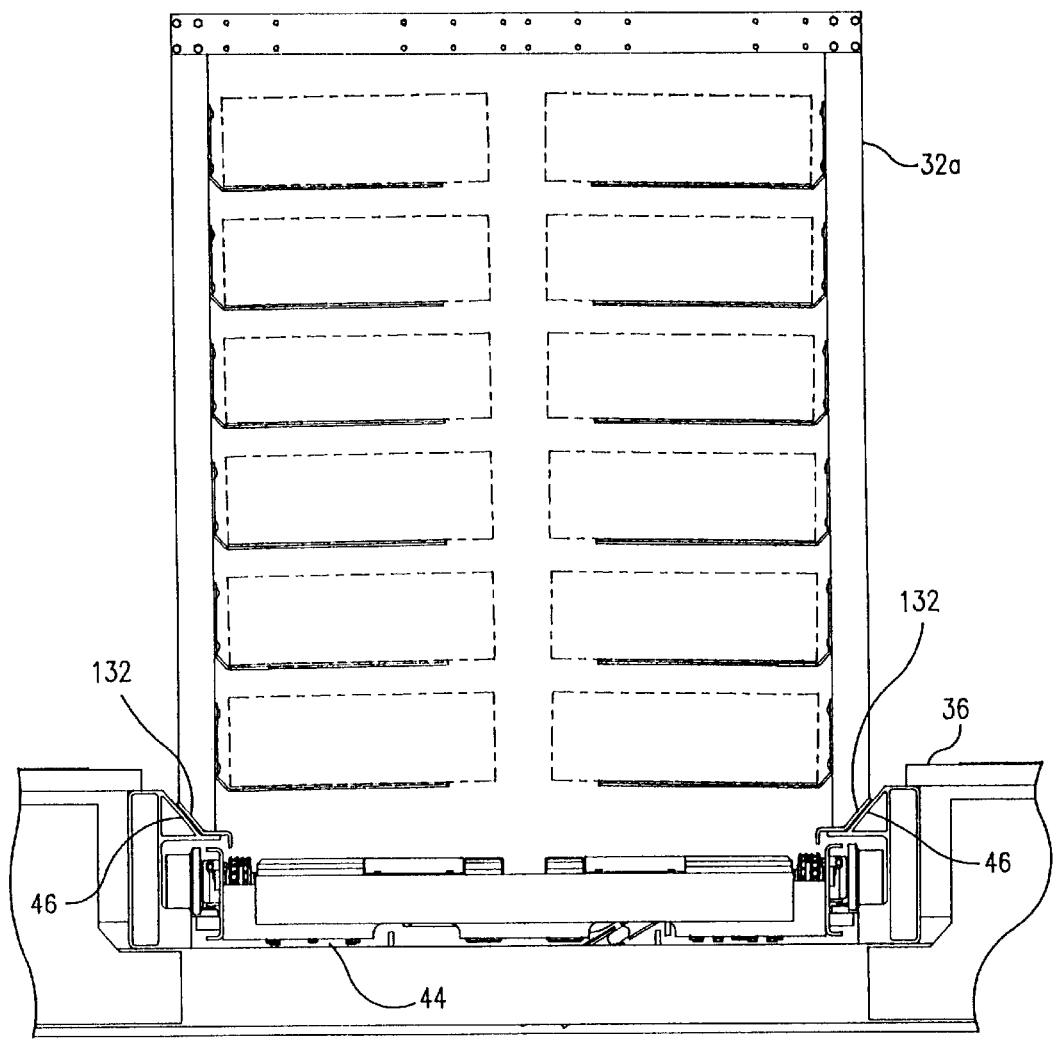
FIG. 36 is similar to FIG. 35 but shows the storage magazine deposited on the pallet supports of the lift platform by the shuttle car robot.

The stacker crane 36 previously positioned lift platform 38 adjacent the first tier bay connected to shuttle rails 58 to receive the returning shuttle car robot 44 and the loaded storage magazine 32*a*. During the case transfer from the fixed transfer magazine to the storage magazine, the lift table 410 of the shuttle car robot was raised so that the legs 132 of the storage magazine 32*a* will clear the pallet supports 46 on the stacker crane lift platform before entering the crane. FIG. 35 illustrates the robot shuttle car 44 on the stacker crane 36. The legs 132 of the storage magazine 32*a* are positioned above the pallet supports 46 enabling the shuttle car robot to move onto the crane. The lift table 410 is then lowered to transfer the storage magazine 32*a* onto the pallet supports 46, with the legs of the storage magazine 32*a* resting on the pallet supports 46. See FIG. 36.

Figure 37:
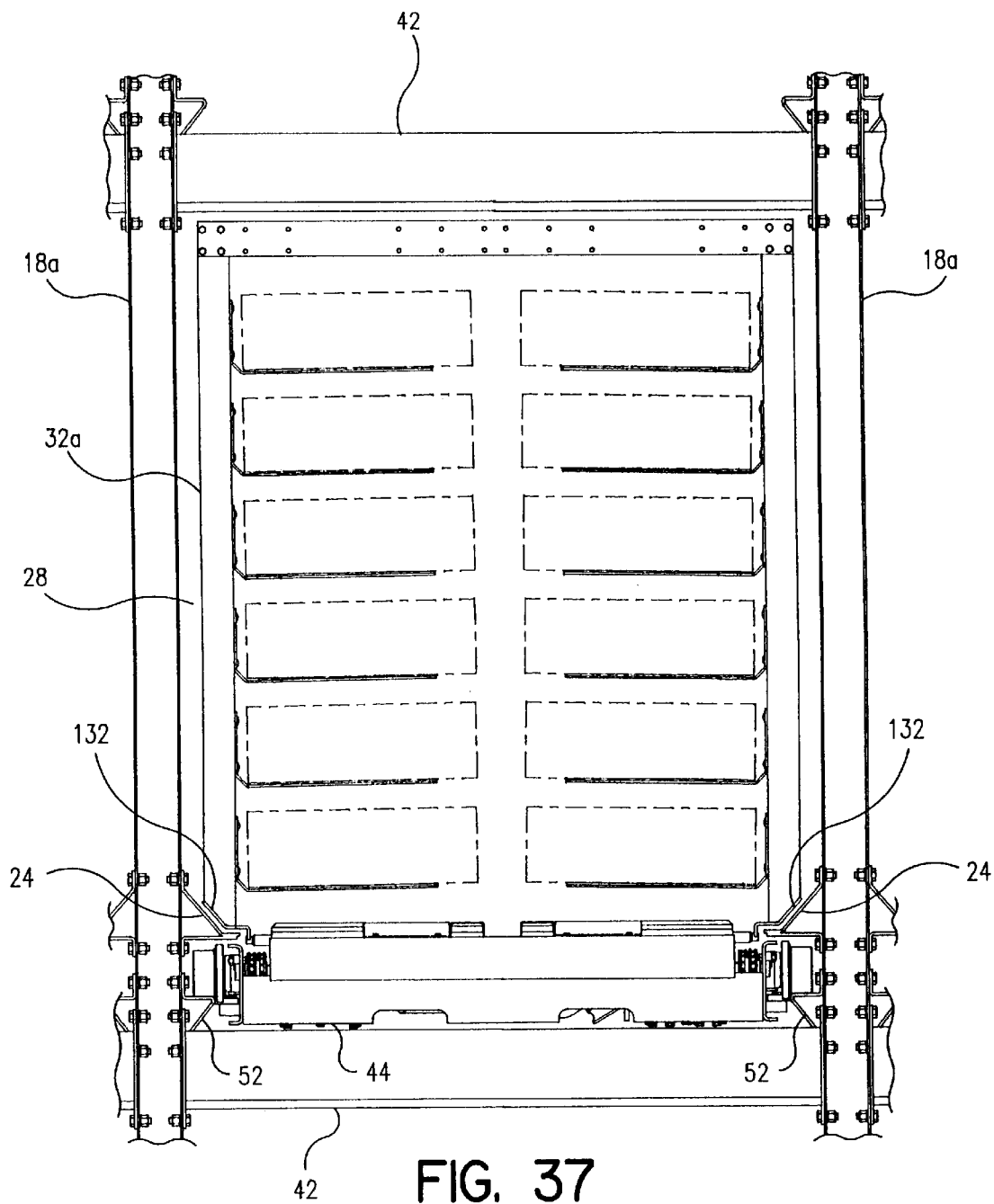
FIG. 37 is a front view of the shuttle car robot transporting the storage magazine shown in FIG. 36 in an empty storage bay.

The stacker crane 36 transports the loaded magazine 32*a* in the storage aisle 20*a* to the tier and cross aisle of an empty storage bay 28 which the inventory control system has designated to receive the storage magazine 32*a*. The shuttle-car robot raises its lift table 410 and lifts the storage magazine from the pallet supports onto the extended lift table lift pins 460. The shuttle car robot leaves the stacker crane and enters the appropriate storage rack 18*a* or 18*b*, traveling on the shuttle rails 52 to the selected storage bay. See FIG. 37. After the shuttle car robot enters the storage bay 28, it stops in the center of the bay and lowers its lift table 410 to transfer the storage magazine 32*a* onto the shelf supports 24 of the storage bay 28. The lift table 410 is lowered to a lower position until the lift pins 460 completely clear the notches 136 on the legs of the storage magazine. The lift pins 460 may be retracted if desired and the lift table returned to its lowest position. The shuttle car robot then returns to the stacker crane.

The inventory control system may direct the deposit of the storage magazine in a designated storage bay located in racks 18*c* or 18*d*. In such instances the storage magazine 32*a* may be temporarily deposited in an intermediate storage bay 28 in storage rack 18*b*. The storage magazine is then transported from the intermediate bay and deposited in the designated storage bay 28 in storage rack 18*c* by a second shuttle car robot 44 from the appropriate transfer car 40. If necessary the process could be repeated with a third shuttle car robot from the stacker crane in aisle 20*a* to deposit the storage magazine in storage rack 18*d*.

The warehouse system includes a large number of storage magazines 32. Each magazine is preferably filled with like cases and stored in one of the bays 28 in the storage racks 18*a–d*. One or more double-deep bays in each tier of racks 18*b* and 18*c* is left open in order to permit transport of storage magazines between the inner transport aisle 22 and the stacker cranes located in the outer transport aisles 20*a*, 20*b*. Likewise, the first tier bays in rack 18*a* adjacent transfer magazines 64 are kept open and the first tier bays in rack 18*d* adjacent transfer magazines 78 are kept open.

Customer orders for mixed cases are made up by moving shuttle car robots 44 carrying mobile transfer magazines 54 along the aisles, either on a transfer car 40 or on a stacker crane and then moving the mobile transfer magazine on the shuttle car robot a sufficient depth into a designated storage bay and transferring a predetermined number of cases from a "pick-from " magazine in the bay to the mobile transfer magazine. The shuttle car robot and mobile transfer magazine continue to move to other bays where additional different cases are transferred to the "pick-to" storage magazine. When loaded, the transfer magazine transfers the cases to a "pick-to " storage magazine either carried on a transfer car or stacker crane.

The shuttle car robot deposits the loaded pick-to storage magazine in a designated storage bay. The robot transports the storage magazine from the transfer car or stacker crane and deposits the storage magazine in the bay. The shuttle car robot may then carry another empty "pick-to" storage magazine from a storage bay to the transfer car or stacker crane to continue loading pick-to storage magazines. The mobile transfer magazine is carried on the shuttle car robot while the shuttle car robot deposits the loaded storage magazine and transports an empty storage magazine to the transfer car or stacker crane.

The "pick-to" storage magazines are moved to the discharge area where the diverse cases from one or more pick-to magazines are sorted and made up into individual customer orders containing a predetermined number of different types and sizes of cases.

Figure 38:
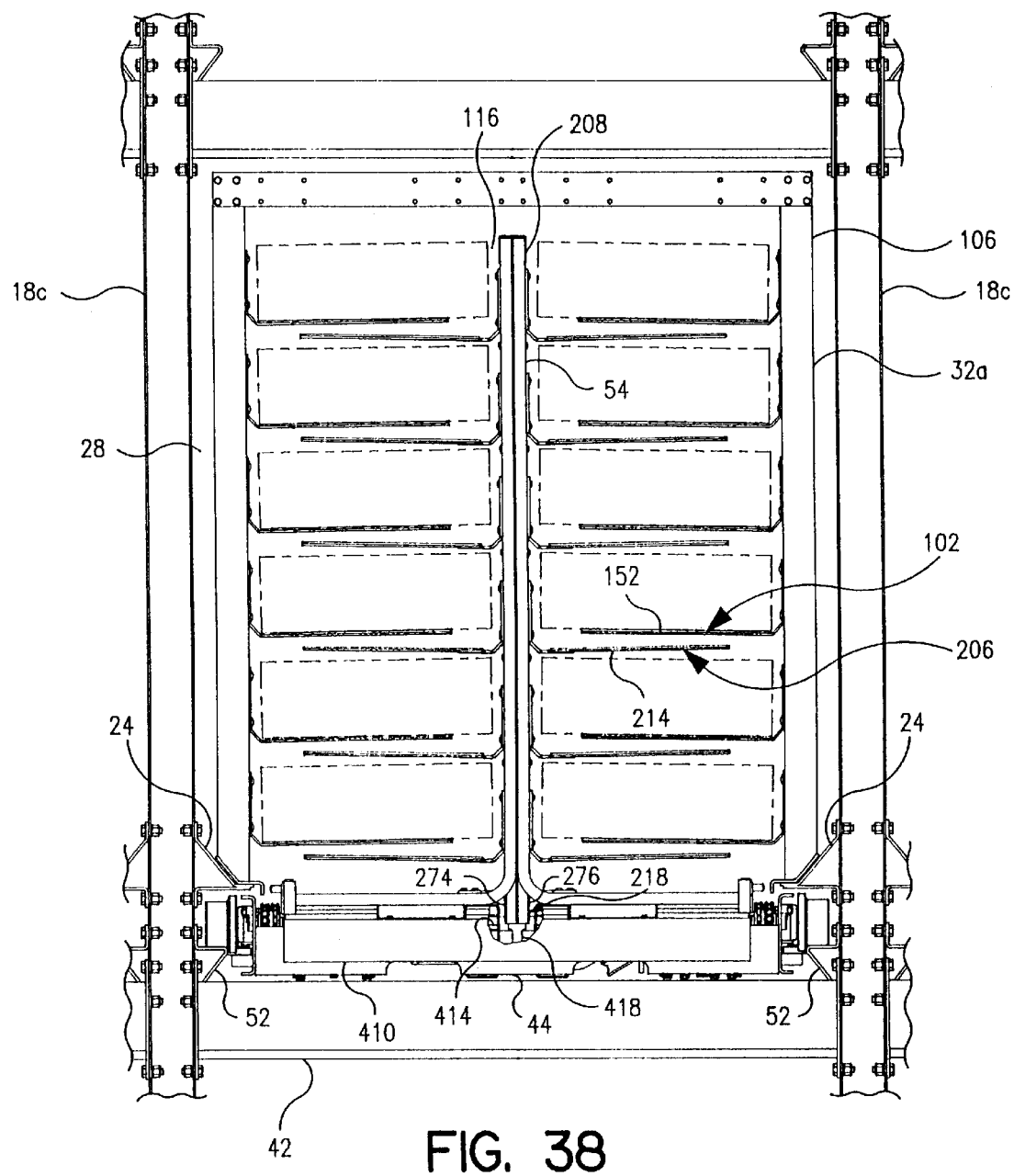
FIG. 38 is a front view of a shuttle car robot and mobile transfer magazine shown in a transfer position beneath a pick-from storage magazine in a storage bay prior to the transfer of a case from the pick-to storage magazine to the mobile transfer magazine and includes a partial sectional view of the shuttle car robot showing the selector pins of the shuttle car robot retracted.
Figure 39:
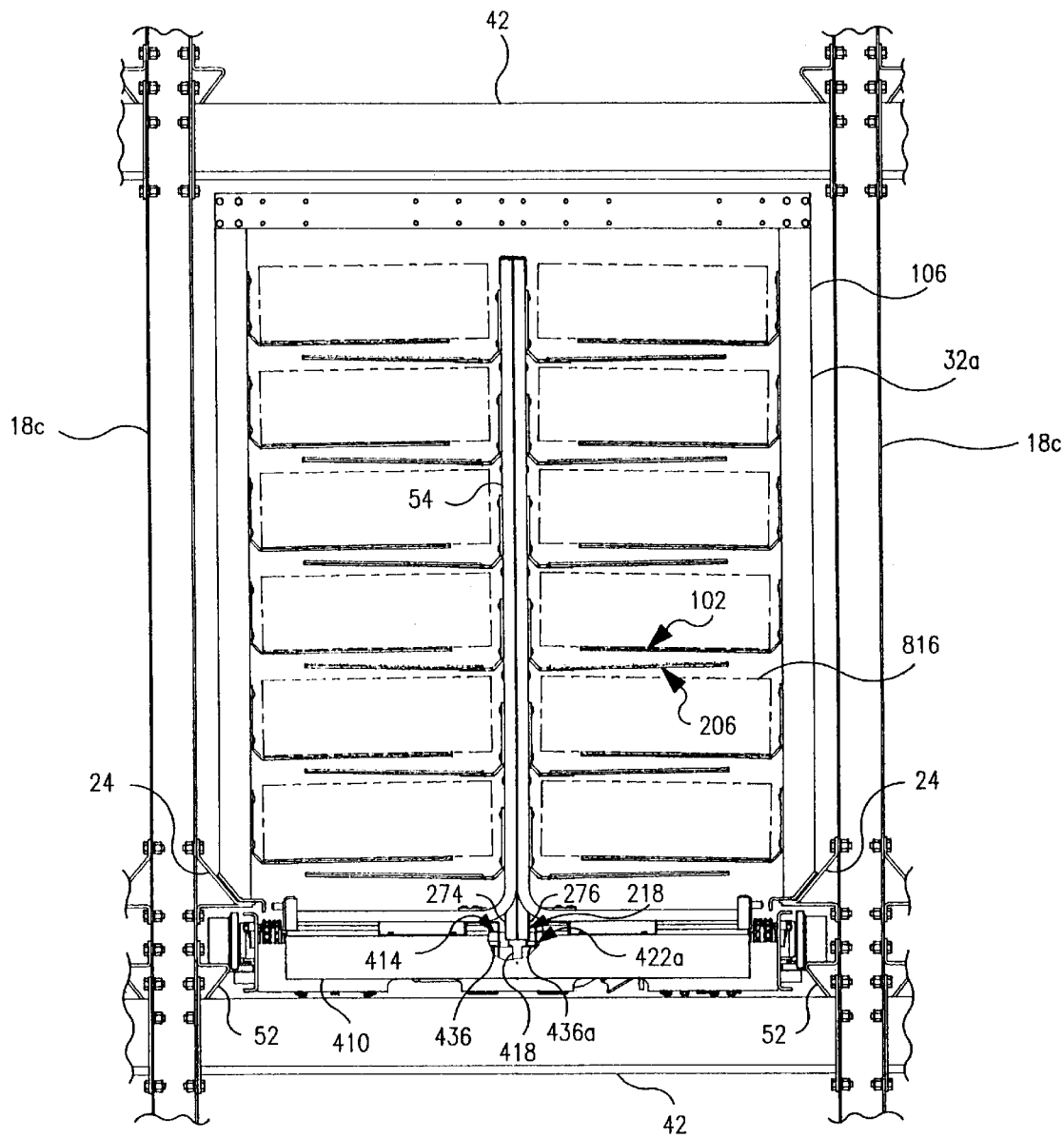
FIG. 39 is similar to FIG. 38 but shows a selector pin of the shuttle car robot extended beneath a push rod of the mobile transfer magazine.
Figure 40:
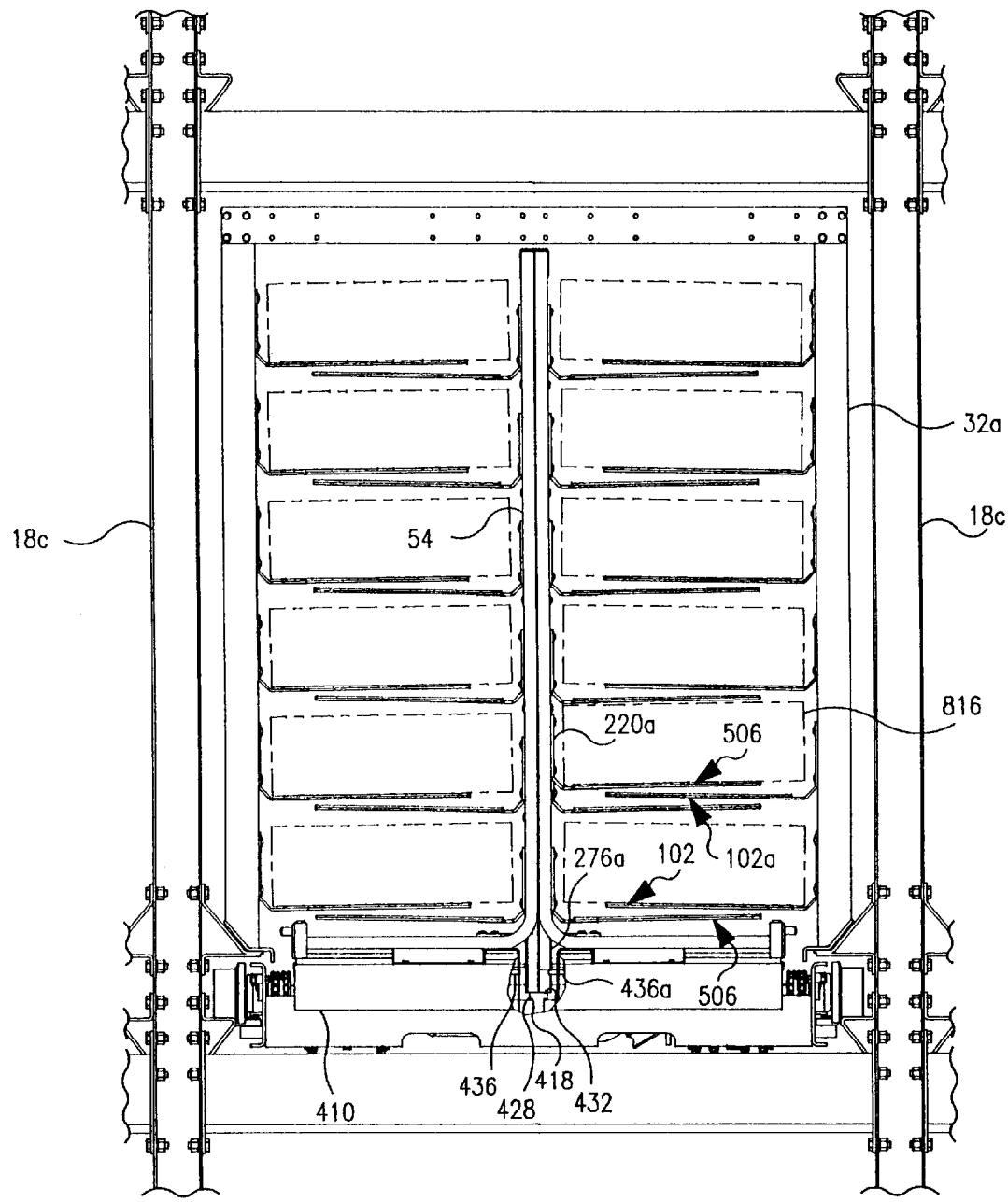
FIG. 40 is similar to FIG. 39 but with the frame and a push rod of the mobile transfer magazine raised to transfer a case from the pick-from storage magazine to the mobile transfer magazine.
Figure 41:
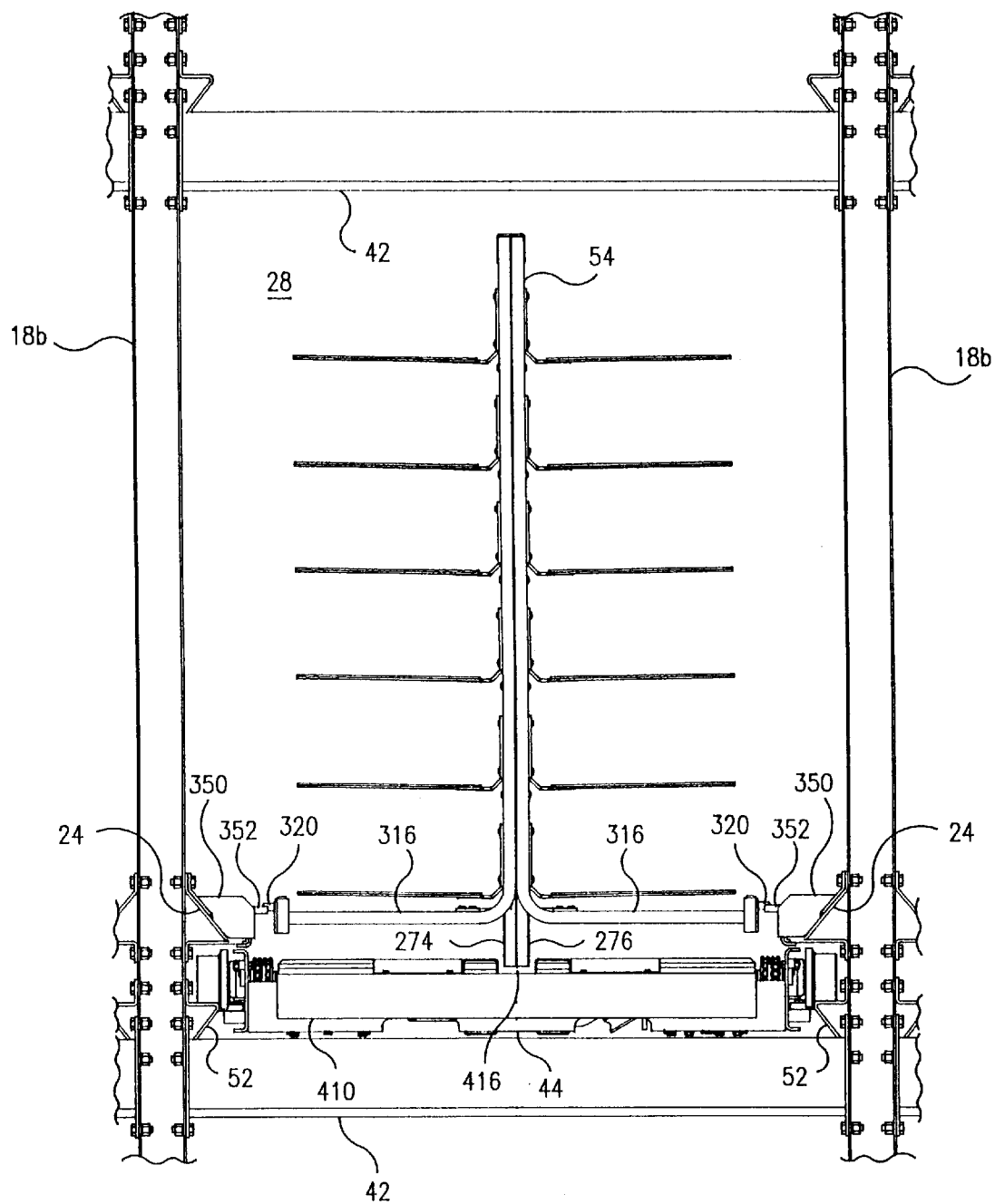
FIG. 41 is a front view of the shuttle car robot shown in FIG. 37 in a storage bay containing a mobile transfer magazine supported on magazine supports.
Figure 42:
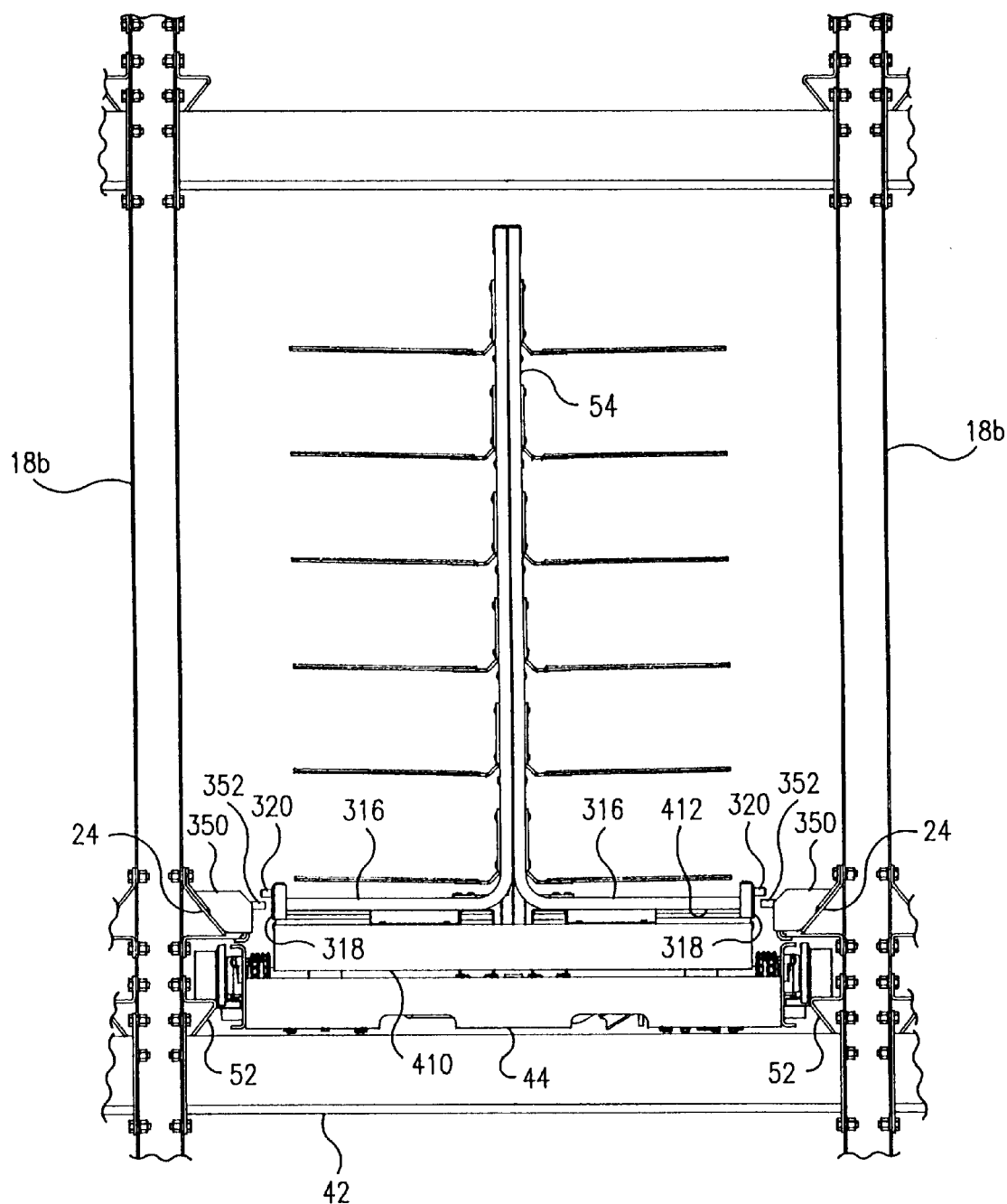
FIG. 42 is similar to FIG. 41 but after the shuttle car robot has lifted the mobile transfer magazine from the magazine supports.
Figure 43:
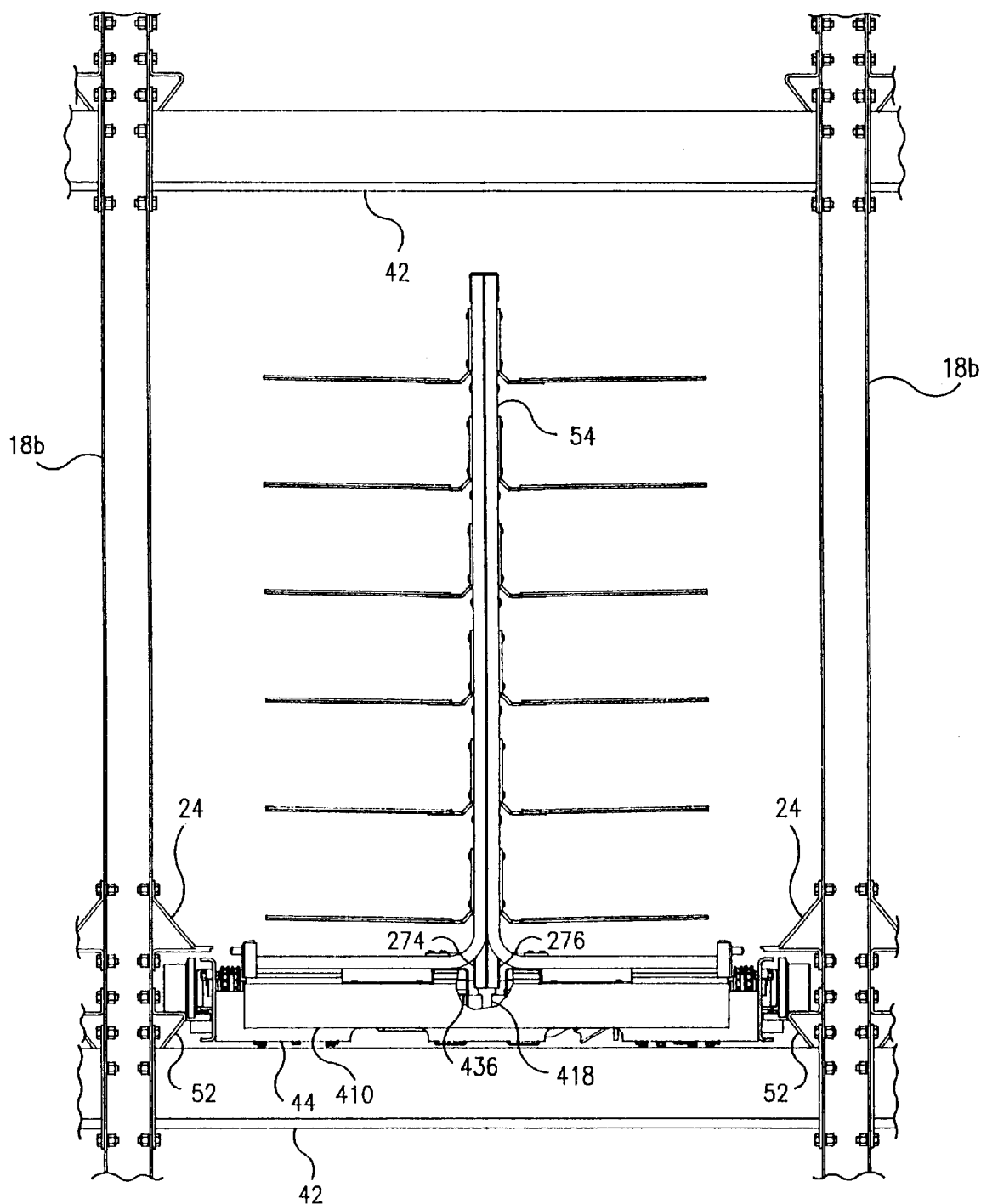
FIG. 43 is similar to FIG. 42 but after the shuttle car robot has lowered the mobile transfer magazine prior to leaving the storage bay, and includes a partial sectional view of the shuttle car robot showing the push rods of the mobile transfer magazine supported on the lift support beam of the shuttle car robot.
Figure 44:
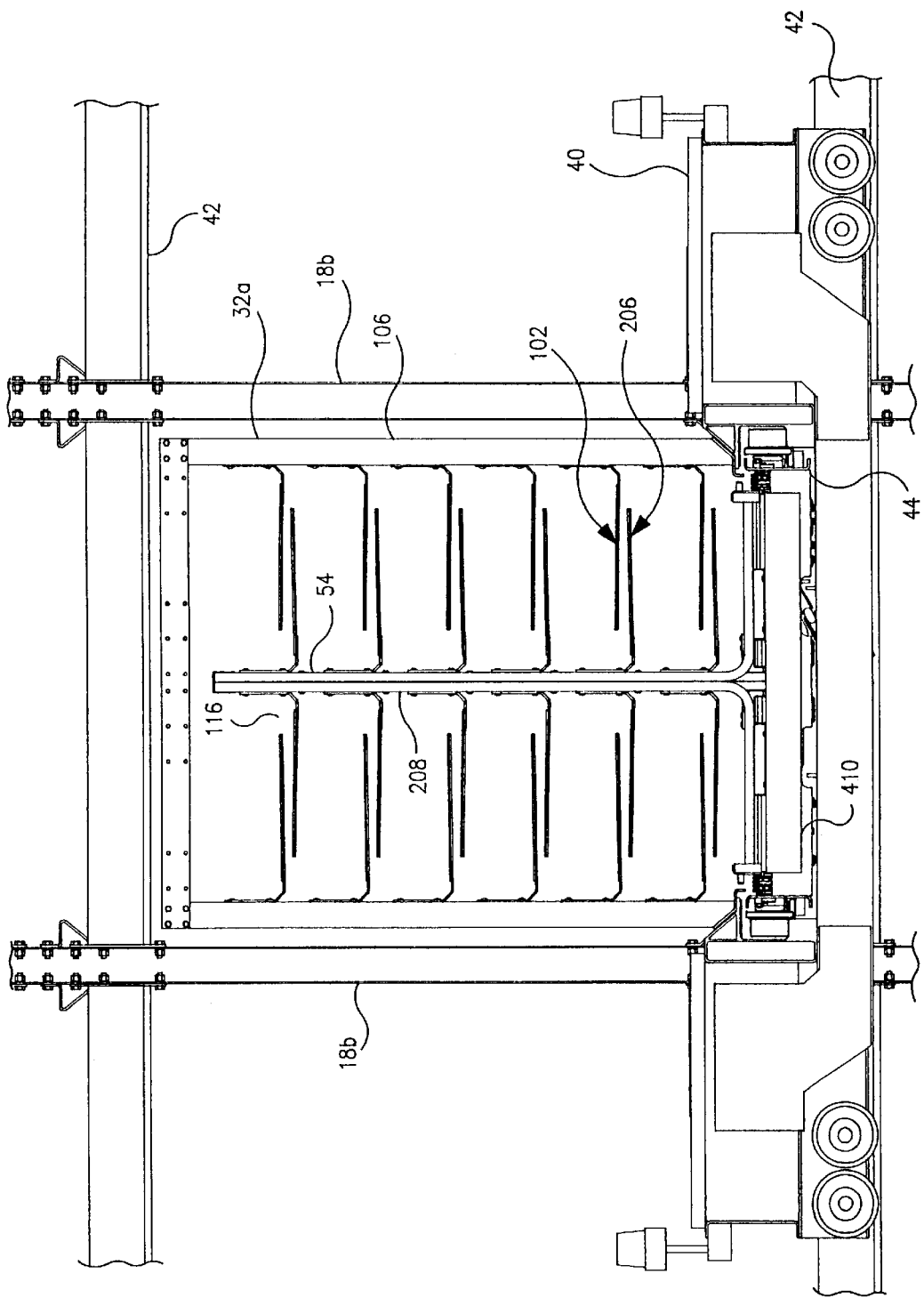
FIG. 44 is a front view of the shuttle car robot and mobile transfer magazine shown in FIG. 43 carried on a transfer car, the transfer car also carrying an empty pick-to storage magazine on its pallet supports.
Figure 45:
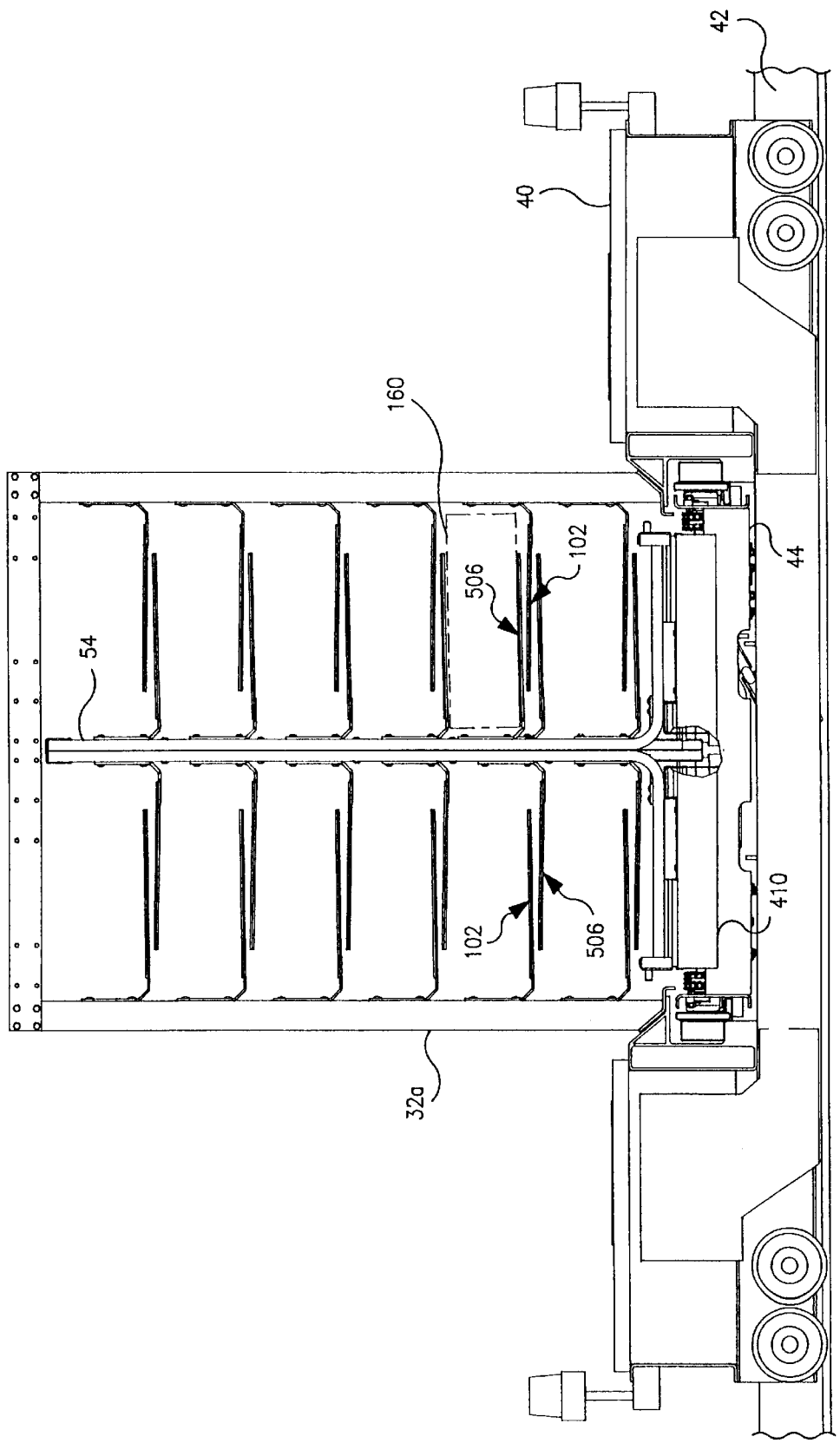
FIG. 45 is a front view of the shuttle car robot and transfer magazine shown in FIG. 44 on the transfer car in a transfer position with the pick-to storage magazine carried on the transfer car prior to the transfer of the case from the mobile transfer magazine to the pick-to storage magazine and includes a partial sectional view of the shuttle car robot showing the extended selector pins.

FIGS. 38–40 illustrate operation of the shuttle car robot selector device 414 in actuating the lift assembly 218 of the mobile transfer magazine 54 carried on the robot 44 to transfer selected cases from a storage magazine. The cases are held on different shelf locations on the comb shelves 102 of the storage magazine and will be transferred to designated comb shelf segments 220 positioned below the shelf locations. The frame 208 of the transfer magazine 54 is supported on the robot lift table 410 with the push rods 274, 276 extending into the lift table recess 416. The selector device 414 actuates selector pins 436 to extend beneath the push rods 274 or 276 attached to the designated comb shelf segments 220. The robot lift drive 484 raises the lift table 410, the frame 208 and the extended pins 436. The extended pins 436 engage the corresponding push rods 274, 276 and lift the push rods and the attached comb shelf segments 220 with the frame 208. The designated comb shelf segments 220 mesh with and pass the shelf locations of comb shelves 102 to transfer the cases to the raised comb shelf segments 220. The other comb shelf segments 220 remain stationary during the transfer and do not intermesh with the comb shelves 102 of the storage magazine.

FIG. 38 illustrates the mobile transfer magazine 54 carried on the shuttle car robot 44 prior to a transfer of cases from the pick-from storage magazine 32*a* in storage bay 28. The robot lift table 410 is in its lowest position. The central frame 208 of the mobile transfer magazine 54 is in the gap 116 between the columns of comb shelves of the pick-from storage magazine 32*a*. The comb shelves 102, 206 of the pick-from storage magazine 32*a* and mobile transfer magazine 54 are parallel one another, with the comb shelf teeth 214 of the mobile transfer magazine 54 below the corresponding comb shelf teeth 152 of the pick-from storage magazine 32*a*. The comb shelf segments 220 of the mobile transfer magazine 54 that will receive cases are located below the corresponding shelf locations on the comb shelves 102 of the pick-from storage magazine 32*a* holding the cases.

The two rows of push rods 274, 276 extend into lift table recess 416 and face opposite rows of retracted selector pins 436. The spacing of the selector pins 436 along each side is such that each selector pin 436 is vertically aligned with a different push rod 274 or 276 and is associated with that push rod. The ends of the push rods 274, 276 are supported on the upper side of lift support beam 418 and are spaced upwardly from their lowest positions. The push rod spacer legs 282 overhang the sides 434 of the support portion 428 and space the push rod mounting legs 284 towards the corresponding selector pins 436. When the selector pins 436 are retracted, the pins are horizontally spaced away from the push rods 274 or 276.

The inventory control system determines which cases are to be transferred from a pick-from storage magazine 32*a* to a pick-to storage magazine 32a. This determination may be made in accordance with a retrieval algorithm. The inventory control system determines which comb shelf segment 220 of the mobile transfer magazine 54 will carry the designated case from the pick-from storage magazine 32a to the pick-to storage magazine 32a and directs the shuttle car robot 44 to transfer the case. The shuttle car robot knows which push rod 274 or 276 each comb shelf segment 220 is attached to and which selector pin 436 is thereby associated with each comb shelf segment 220. The shuttle car robot 44 actuates only those actuators 422 of the selector pins 436 associated with the comb shelf segments 220 that will receive the cases from the pick-from storage magazine 32a. As shown in FIG. 39, an actuator 422a is actuated and has its selector pin 436a extended. The other selector pins 436 remain in their normal retracted position. The extended selector pin 436a extends beneath the push rod 276a attached to the comb shelf segment 220 which will receive the selected case.

After the appropriate selector pins 436a are extended, the lift table 410 is raised by drive 484 to lift the frame 208 of the mobile transfer magazine 54. See FIG. 40. The extended selector pins 436a engage the lower end of the push rod mounting legs 284a and lifts the push rods 276a with the lift table drive. The comb shelf segments 220a connected to the push rods 276a move with the push rods. The lift table 410 is raised sufficiently such that the teeth of the raised comb shelf segments 220a intermesh with and pass the teeth of the storage locations of the pick-from storage magazine comb shelf 102a, transferring case 160 from the storage magazine comb shelf 102a to the raised comb shelf segments 220a of the mobile transfer magazine 54.

While the lift table 410 is being raised, the weight of the other comb shelf segments 220 force them to slide downwardly along the mobile transfer magazine frame 208 towards their lowest position. The ends of the push rods 274, 276 attached to these comb shelf segments 220 remain against the portion support 828 of the lift support beam 818. These comb shelf segments 220 remain stationary with respect to the pick-from storage magazine 54 and do not intermesh with the comb shelves 102 of the pick-from storage magazine 32a as the lift table 410 is raised.

Customer orders for mixed cases are assembled by picking the required numbers of diverse cases from the storage magazines in the storage bays 28. Each storage magazine is typically loaded with like cases, as described previously. The inventory control system tracks the location of each individual case in the storage bays.

Customer orders of mixed cases are made up by transferring different type cases from the pick-from storage magazines in the bays to a mobile transfer magazine 54 operating in an adjacent aisle. The mobile transfer magazine may be carried by a shuttle car robot mounted on a stacker crane in either aisle 20a or 20b or may be carried by a shuttle car robot on a transfer car 40 running along one of the tiers in aisle 22. During makeup of a mixed order each mobile transfer magazine and supporting shuttle car robot is moved adjacent a succession of bays with pick-from storage magazines in the bays holding the cases required to make up the order. With the mobile transfer magazine adjacent a selected bay, the supporting shuttle car robot is moved a sufficient distance into the bay to position the comb shelves on the mobile transfer magazine under the comb shelves on the pick-from storage magazine. The mobile transfer magazine comb shelves are inserted a sufficient distance into the bays so that they are under the outer most case or cases in the storage magazine to be picked. Cases in the storage magazine are picked from the aisle end of the magazine inwardly. The depth of insertion of the mobile transfer magazine into the storage magazine varies depending upon the location of the cases nearest the aisle.

If cases are to be picked from bays on both sides of an aisle, then the first picked cases should be placed on the center of the transfer magazine comb shelves, leaving space for subsequent picking of cases on both ends of the comb shelves. If cases are to be picked from one side of an aisle only, then the mobile transfer magazine should be inserted more deeply into the storage magazine to place first picked cases on the remote ends of the transfer magazine comb shelves.

After insertion of the mobile transfer magazine into the pick-from storage magazine to a depth to locate segments of the transfer magazine comb shelves under cases to be picked from the storage magazine, the selected comb shelf segments of the transfer magazine are raised past the storage magazine comb shelves as described above to pick up the selected cases.

After picking up of the selected cases, the mobile transfer magazine is withdrawn from the pick-from storage magazine, the raised segments are lowered within the pick-to storage magazine as described above and the shuttle car robot is moved to position the transfer magazine at the next storage bay where a selected case or cases is to be picked from the storage magazine in the bay to the mobile transfer magazine.

Because each storage magazine and mobile transfer magazine contains a number of comb shelves with each comb shelf capable of supporting a number of cases, and different numbers of cases may be picked from a storage magazine at any one time, the picking process may not completely fill a transfer magazine comb shelves with cases.

FIGS. 41–45 illustrate a shuttle car robot acquiring a mobile transfer magazine and a selective pick up and transfer of a case from the pick-from storage magazine 32a to a pick-to storage magazine carried on a transfer car 40. The shuttle car robot 44 transports an empty storage magazine 32a from a storage bay 28 onto the pallet supports on the transfer car to serve as a pick-to storage magazine 32a. This is similar to the deposit of a storage magazine in a storage bay described above but performed in reverse order.

The shuttle car robot next acquires an empty mobile transfer magazine 54 from a storage bay. The shuttle car robot 44 leaves the transfer car 40 with its lift table 410 lowered and lift pins 460 retracted and enters the storage bay 28. The magazine supports 350 hold the legs 316 of the mobile transfer magazine 54 above the lowered lift table 410 of the shuttle car robot 44. The comb shelf segments 520 of the mobile transfer magazine 54 are in their lowest positions with the lower ends of the push rods 274, 276 extending below the upper surface of the lift table. The lower end portions of the push rods 274, 276 are in lift table recess 416 when the shuttle car robot stops beneath the storage magazine. The push rods 274, 276 are spaced from and directly above the upper push rod supports of the robot shuttle car lift support beam 418. See FIG. 41.

The lift table 410 is then raised to engage the legs 316 of the mobile transfer magazine 54 and lift the mobile transfer magazine 54 from the magazine supports. See FIG. 42. The lift table 410 fits between the cross members 318, with the insides of the cross members 318 closely facing the sides of the lift table to assure the push rods 274, 276 are centered over the lift support beam 418. The outside upper corners of the outer lift table beams 464 preferably have chamfers along their length to further facilitate the proper positioning of the mobile transfer magazine on the lift table.

The shuttle car robot 44 moves towards the transfer car 40 a short distance so that the support pins 320 of the mobile transfer magazine clear and are to one side of the magazine supports 350. The lift table then lowers to its lowered position, with the support pins 320 passing by the sides of the magazine supports 350.

As the lift table lowers, the lower ends of the push rods 274, 276 engage the upper side 432 of the upper support portion 428 of lift support beam 418 before the lift table 410 reaches its lowest position. The support portion 428 prevents further downward movement of the push rods 274, 276 with the magazine frame 408. The magazine frame 208 continues lowering with the lift table but the now stationary push rods force the comb shelf segments 220 and slide members 246 bolted to them to also remain stationary. The support posts 226, 228 of the magazine frame 208 then slide downwardly along the stationary slide members 246.

When the lift table 410 reaches its lowest position, the comb shelves 206 are spaced above their lowest positions. See FIG. 43. The support pins 320 are now also below the magazine support 350. The shuttle car robot 44 returns to the transfer car 40 carrying the mobile transfer magazine 54 on its lift table 410.

As the shuttle car robot 44 enters the transfer car 40 the mobile transfer magazine 54 enters the pick-to storage magazine 32a. The comb shelves 102, 206 of the pick-to storage magazine 32a and mobile transfer magazine 54 are parallel with one another, with the comb shelf teeth of the mobile transfer magazine 54 below the corresponding comb shelf teeth of the pick-to storage magazine 32a. See FIG. 44. When the shuttle car robot 44 is in its home position, the outer frame 106 of the pick-to storage magazine 32a surrounds the mobile transfer magazine 54 and the central frame 208 of the mobile transfer magazine frame 54 is received in the gap 116 between the columns of comb shelves 102 of the storage magazine 32a.

The transfer car 40 transports the shuttle car robot 44, the mobile transfer magazine 54 and the pick-to storage magazine 32a to the shuttle rails 52 extending to the pick-from storage magazine 32a designated by the inventory control system. The pick-from storage magazine 32a holds cases that are to be transferred to the pick-to storage magazine 32a.

The shuttle car robot 44 and mobile transfer magazine 54 leave the transfer car 40 and proceed to enter the storage bay 28 holding the pick-from storage magazine 32a. As the shuttle car robot enters the storage bay, the mobile transfer magazine 54 enters the pick-from storage magazine 32a. Cases are transferred from the pick-from storage magazine 32a to the transfer magazine 54 as described above. See FIGS. 38–40.

After the cases are transferred to transfer magazine 54, the shuttle car robot 44 withdraws the mobile transfer magazine 54 from the side of the pick-from storage magazine 32a towards the transfer car 40. The mobile transfer magazine 54 carries with it the case selected for transfer. The other cases remain on the pick-from storage magazine 32a. The shuttle car robot 44 returns to the transfer car with the lift table 410 remaining in the raised position and the comb shelf segment 220a carrying case 160 supported on the extended selector pin 436a.

Figure 46:
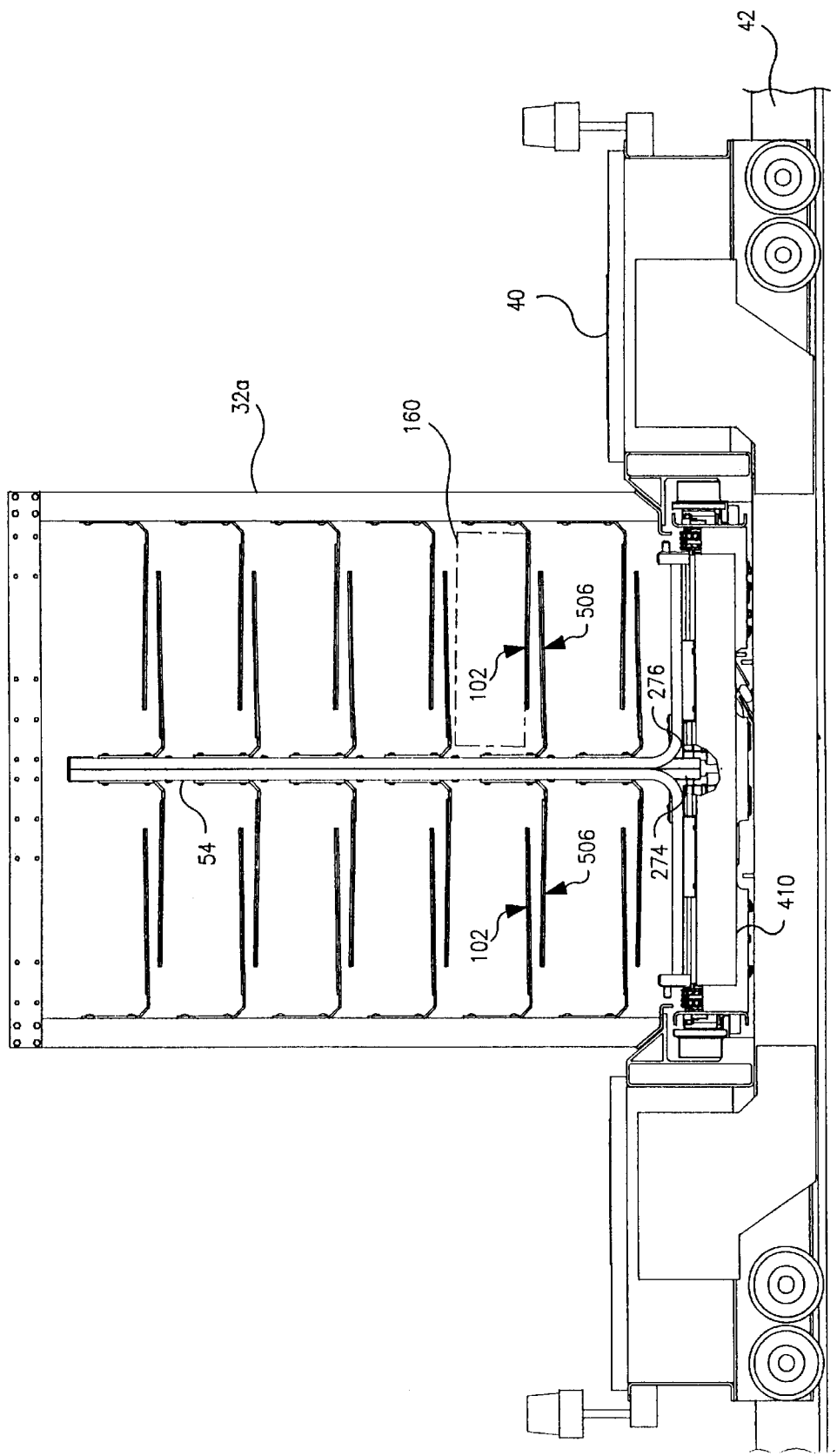
FIG. 46 is similar to FIG. 45 but after the lift table of the shuttle car robot has been lowered to transfer the case from the mobile transfer magazine to the pick-to storage magazine and the extended selector pin retracted.

As the shuttle car robot 44 enters the transfer car 40 the mobile transfer magazine 54 enters the pick-to storage magazine 32a. The teeth of the raised comb shelf segment 220a are positioned above the teeth of the corresponding comb shelf 102b of the pick-to storage magazine 32a. The teeth of the other comb shelf segments 220 of the mobile transfer magazine 54 remain below the teeth of the corresponding comb shelves 102 of the pick-to storage magazine 32a. See FIG. 45. The shuttle car robot 44 stops to position the mobile transfer magazine 54 in its transfer position with respect to the pick-to storage magazine 32a. The corresponding comb shelves 102, 206 of the two magazines 32a, 54 are vertically offset from one another. The comb shelf 220a is above the shelf location on comb shelf 102b that will receive the case 160. The lift table 410 lowers to its lowered position. The mobile transfer magazine frame 208 and comb shelf segment 220a lowers with the lift table, intermeshing with and passing the complementary comb shelf 102b of the pick-to storage magazine 32a and transferring the case to the corresponding shelf location on the pick-to storage magazine comb shelf 102b. See FIG. 46. After the lift table 410 is lowered, the extended selector pins 436a are retracted.

Pick-from storage magazines may be resupplied by transferring cases from the mobile transfer magazines to the pick-from storage magazines. The mobile transfer magazines transfer fresh cases from storage magazines received from the induction area.

When the mobile transfer magazine cannot receive additional cases, the magazine is moved to an empty pick-to storage magazine carried on the stacker crane 36 or a transfer car 40. The cases on the mobile transfer magazine are transferred to the pick-to storage magazine.

After loading of the pick-to storage magazine is completed, the shuttle car robot deposits the loaded pick-to storage magazine in a designated storage bay. Loading of the pick-to storage magazine is completed with the shuttle car robot on a crane or transfer car with the robot lift table 410 lowered and selector pins 436 and lift pins 410 retracted. The shuttle car robot moves the mobile transfer magazine if necessary so that the comb shelves of the two magazines fully overly one another. Lift table 410 is then raised to lift the mobile transfer magazine such that all the cases on the pick-from storage magazine are transferred to the comb shelves of the mobile transfer magazine. The lift pins 410 of the shuttle car robot are below the legs of the pick-from storage magazine and are then extended so that continued raising of the lift table 410 engage the notches 136 of the storage magazine and lifts the storage magazine off the pallet supports of the crane or transfer car. The shuttle car robot leaves the crane or transfer car and moves along rack shuttle rails 52 and enters the designated storage bay 28. The lift table 410 then lowers until the storage magazine rests on the shelf supports 24 in the bay and the lift pins 460 clear the notches 136. The lift pins 460 are then retracted and the lift table 410 is lowered to its lowest position, transferring all the cases from the mobile transfer magazine shelves back to the storage magazine shelves. The shuttle car robot returns to the crane or transfer car with the empty mobile transfer magazine. If desired, the shuttle car robot may retrieve and carry back onto the crane or transfer car an empty storage magazine to serve as a pick-to storage magazine.

After loading of the pick-to storage magazines are completed, the shuttle car robot returns the mobile transfer magazine 54 into the magazine supports in the magazine's dedicated bay. Pick-to storage magazines 32a are each transported to the crane 36 in aisle 20b. The crane then lowers the robot and a loaded storage magazine 32a to the first tier and positions the robot and magazine adjacent an open bay extending toward the discharge area 16. The storage magazine 32a is then moved through the open bay and onto rails 60 in the discharge area 16 for unloading onto a designated fixed transfer magazine 78. The shuttle car robot 44 enters the fixed transfer magazine 78 with its lift table 410 raised and the comb shelf teeth of the pick-to storage magazine 32a above the corresponding comb shelf teeth of the fixed transfer magazine 78.

The shuttle car robot stops with the pick-to storage magazine 32a in its transfer position with the fixed transfer magazine 78. The shuttle car robot 44 lowers its lift table 410 and transfers the cases from the comb shelves 102 of the storage magazine 32a to the corresponding comb shelves 506 of the fixed transfer magazine 78.

Figure 47:
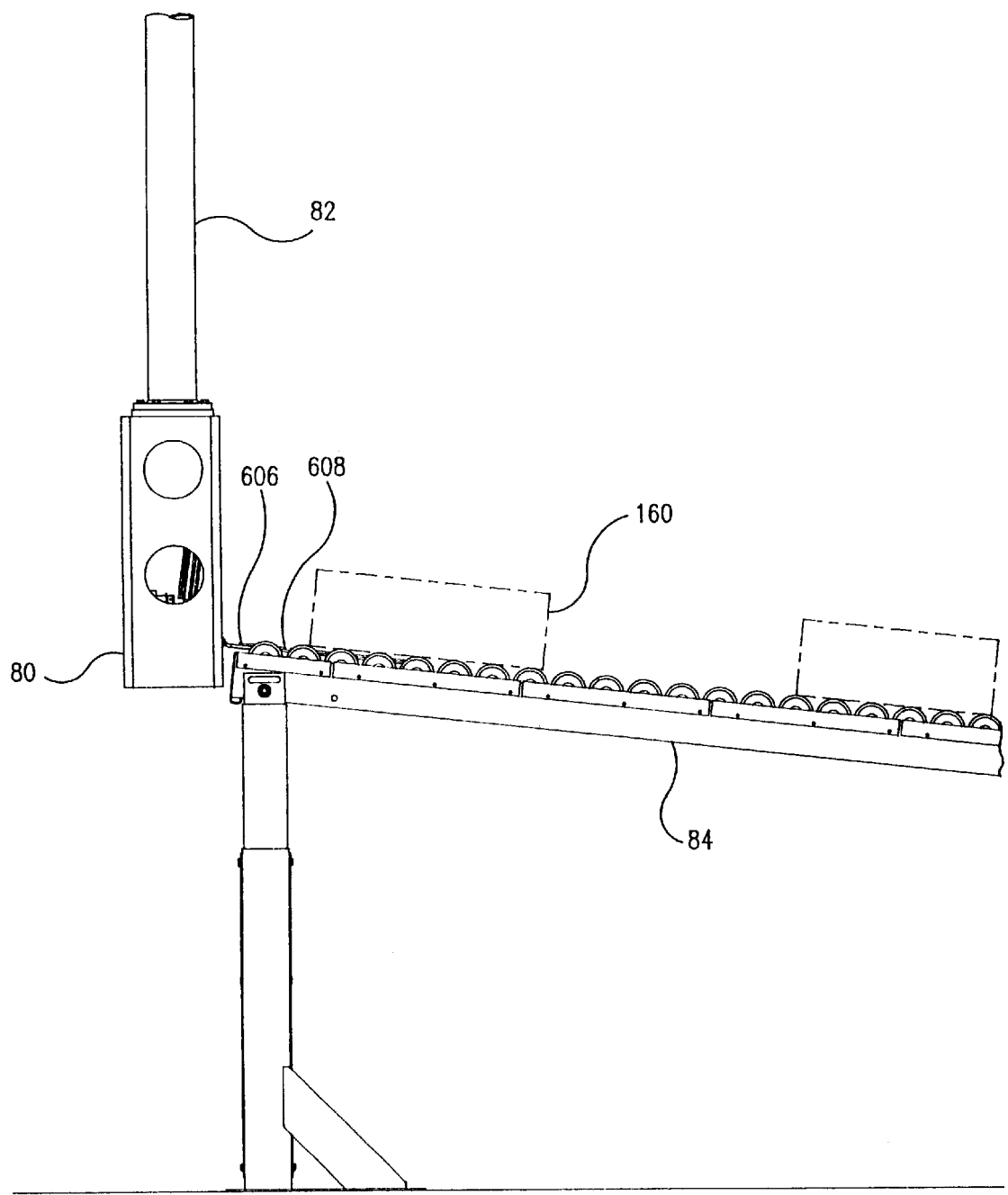
FIG. 47 is a partial side view of an end effector discharging cases onto a gravity roller conveyor in the discharge area of the warehouse shown in FIG. 1.

The cases of an individual order may be distributed among the cases on a number of different fixed transfer magazines 78 or on different comb shelves of one fixed transfer magazine. The inventory control system tracks the location of the cases of the order and directs the end effector 80 to transfer the cases from the fixed transfer magazines to one designated discharge conveyor 84 that will receive and discharge the order. The discharge end effector 80 then transfers cases from each row of the fixed transfer magazine 78 to the designated discharge conveyor 84. The cases held on the end effector comb shelf 606 are positioned above a designated discharge roller conveyor 84 and between the rollers of the conveyor. The end effector comb drive stop members 634 are retracted and the teeth 608 pivot to the discharge position, sliding the cases off the teeth and onto the conveyor. See FIG. 47. If desired, the stop members 634 may be selectively retracted to slide selected cases from the comb shelf so that cases carried by the end effector are delivered to different discharge conveyors.

The disclosed comb shelf teeth are straight. However, the teeth may have different shapes. For instance, the teeth may have a number of bends or may be curved along their length. The shape of the teeth must enable the teeth to support cases on the comb shelf and pass vertically between and through the teeth of a complementary comb shelf to move a case from one comb shelf to the other comb shelf.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A case handling and storage apparatus for a warehouse comprising:
   a storage rack defining a plurality of magazine storage bays;
   a case storage magazine supported in a first magazine storage bay and a case transfer magazine movable into and out of the magazine storage bay between a first position outside of the first bay and a second position in the first bay adjacent to the case storage magazine for case transfer between the magazines;
   each magazine comprising a frame and a pair of horizontal comb shelves on the frame, the frame of each magazine comprising a support surface, the support surface of the case storage magazine engaging the storage rack to support the case storage magazine in the first bay;
   each comb shelf comprising a support member extending along the length of the shelf, a connection mounting the support member to a magazine frame, and a plurality of case-support teeth spaced along the support member and fixed to the support member, the teeth extending outwardly away from the support member to free ends;
   the teeth of each comb shelf of the case transfer magazine located between and to one side of the teeth on an adjacent comb shelf of the case storage magazine when the case transfer magazine is in the second position such that the teeth of adjacent comb shelves are vertically movable past each other;
   the case transfer magazine comprising a drive surface connected to the comb shelves for conjoint vertical movement with the comb shelves, the drive surface and the comb shelves movable between raised and lowered positions when the case transfer magazine is in the second position wherein the teeth of each comb shelf of the case transfer magazine move from the one side to the other side of the teeth of the adjacent comb shelf of the case storage magazine;
   a first drive mechanism to move the case transfer magazine between the first and second positions, the support surface of the case transfer magazine engaging the first drive mechanism to support the case transfer magazine when moving between the first and second positions; and
   a second drive mechanism to move the teeth of the comb shelves of the case transfer magazine vertically for case transfer, the second drive mechanism comprising a vertically movable drive member, the drive member engageable with the drive surface of the case transfer magazine when the case transfer magazine is in the second position to move the drive surface between raised and lowered positions, whereby the teeth of each comb shelf of the case transfer magazine pass through the teeth of an adjacent comb shelf of the case storage magazine to transfer a supported case between adjacent comb shelves.

2. The case handling and storage apparatus of claim 1 wherein:
   the storage rack comprises a pair of first horizontal beams located on opposite sides of the first storage bay and a pair of second horizontal beams located on opposite sides of a second storage bay, each beam having an upwardly facing support surface adjacent the first or second storage bay;
   the support surface of the case storage magazine comprises a pair of spaced apart downwardly facing surfaces, each surface abutting a support surface of a respective first beam whereby the case storage magazine is supported against gravity on the first beams; and
   the support surface of the case transfer magazine comprises a pair of spaced apart downwardly facing surfaces, each surface abutting a support surface of a respective second beam when the case transfer magazine is in the first position whereby the case transfer magazine is supported against gravity in the second bay.

3. The case handling and storage apparatus of claim 1 comprising a transport vehicle for carrying the case transfer magazine between the first and second positions, the vehicle comprising a chassis;
   the first drive mechanism being attached to the chassis and comprising a drive train for moving the transport vehicle; and
   the support surface of the case transfer magazine engaging the chassis when the case transfer magazine is carried by the transport vehicle.

4. The case handling and storage apparatus of claim 3 wherein the storage rack comprises a plurality of horizontal rails extending between the first and second positions, and the drive train engages the rails and drives the transport vehicle along the rails.

5. The case handling and storage apparatus of claim 1 wherein the frame of one of the case storage and case transfer magazines comprises a pair of spaced apart outer support members, one comb shelf of the one magazine mounted on one outer support member and the other comb shelf of the one magazine mounted on the other outer support member;

the frame of the other of the case storage and case transfer magazines comprises a central support member having opposite sides, one comb shelf of the other magazine mounted on one side of the central support member and the other comb shelf of the other magazine mounted on the other side of the central support member; and the central support member is located between the comb shelves of the one magazine when the case storage and case transfer magazines are in the second position.

6. The case handling and storage apparatus of claim 5 wherein the one magazine is the case storage magazine, the comb shelves of the case storage magazine fixedly attached to the outer frame members;

the other magazine is the case transfer magazine, the comb shelf attachments of the case transfer magazine movably mounted to the central support member for vertical movement of the comb shelves along the central support member;

the drive surface of the case transfer magazine comprises a plurality of drive surfaces, each drive surface connected to a respective comb shelf attachment for conjoint movement with the comb shelf attachment, the comb shelf segment movable between raised and lowered positions; and the second drive mechanism comprises a plurality of drive members, each drive member engageable with a respective drive surface when the case transfer magazine is in the second position to raise and lower the comb shelf segments whereby the teeth of each comb shelf segment move from the one side to the other side of the teeth of an adjacent comb shelf of the case storage magazine for case transfer to or from the comb shelf segment.

7. The case handling and storage apparatus of claim 1 wherein each magazine comprises at least one pair of additional horizontal comb shelves, the teeth of each additional comb shelf of the case transfer magazine located between and to one side of the teeth on an adjacent additional comb shelf of the case storage magazine when the case transfer magazine is in the second position such that the teeth of adjacent comb shelves are vertically movable past each other for case transfer between the magazines.

8. The case handling and storage apparatus of claim 1 wherein the comb shelf connections of the case transfer magazine movably mount the support members to the frame of the case transfer magazine for vertical movement along the frame, the support members each being movable along the frame independently of one another whereby the comb shelves of the case transfer magazine are each independently movable between raised and lowered positions;

the drive surface of the case transfer magazine comprises a plurality of drive surfaces, each drive surface connected to a respective comb shelf support member for conjoint movement with the support member; and the drive member of the second drive mechanism comprises a plurality of drive members, each drive member vertically movable independently of the other drive members, each drive member engageable with a respective drive surface whereby each comb shelf of the case transfer magazine can be selectively driven between raised and lowered positions for case transfer to or from the comb shelf.

9. The case handling and storage apparatus of claim 8, wherein the case transfer magazine comprises a plurality of vertical push rods, each push rod connected to a respective support member for conjoint vertical movement with the support member and extending from the support member to a free end, the drive surfaces located on the free ends of the push rods.

10. The case handling and storage apparatus of claim 8 wherein each support member of the case transfer magazine comprises a plurality of support segments spaced along the length of the comb shelf, a plurality of comb shelf teeth attached to each comb shelf segment to define a comb shelf segment for supporting a case;

each comb shelf connection of the case transfer magazine comprises a plurality of connection segments spaced along the length of the comb shelf, each connection segment movably mounting a respective support member segment for vertical movement along the frame whereby each comb shelf segment is movable between raised and lowered positions;

each support member segment is movable along the frame of the case transfer magazine independently of one another to raise or lower the comb shelf segments of the case transfer magazine independently of one another; and the drive surfaces of the case transfer magazine are each connected to a respective support member segment for conjoint movement with the support member segment whereby each comb shelf segment of the case transfer magazine can be selectively driven between raised and lowered positions for case transfer to or from the comb shelf segment.

11. The case handling and storage apparatus of claim 10 wherein the case transfer magazine comprises a plurality of elongate push rods, each push rod connected to a respective support member segment for conjoint vertical movement with the support member segment and extending vertically from the support member segment to a free end below the frame of the case transfer magazine;

each of the drive surfaces of the case transfer magazine is a downwardly facing surface on the free end of a respective push rod;

the drive member of the second drive mechanism comprises a plurality of drive members located below the push rods;

the second drive mechanism comprises a plurality of actuators, each actuator connected to a respective drive member for moving the drive member horizontally between extended and retracted positions; and each drive member is vertically aligned with a respective drive surface when the drive member is in the extended position such that the drive surface is in the path of vertical movement of the drive member, and the drive surface is out of the path of vertical movement of the drive member when the drive member is in the retracted position.

12. A case transfer apparatus for transferring cases to or from a case storage unit having a comb shelf comprising a plurality of spaced apart case support teeth, the case transfer apparatus comprising:

a frame;

an elongate, horizontal comb shelf extending across the frame for supporting a plurality of cases, the comb shelf including a plurality of comb shelf segments spaced along the length of the comb shelf, each comb shelf segment for supporting a case of the plurality of cases and comprising a support member, an operative connection movably mounting the support member to the frame for vertical movement on the frame, and a plurality of case-support teeth fixed to the support member and spaced apart along the support member, the teeth extending outwardly from the frame to free ends located away from the support member;

a plurality of actuation members, each actuation member connected to a comb shelf support member wherein movement of an actuation member moves a comb shelf segment vertically for case transfer; and each support member being independently movable by the actuation member connected to such support member whereby only the teeth of the support members moved by actuation members pass between teeth of the comb shelf of the storage unit and participate in case transfer to or from the comb shelf of the case storage unit.

13. The case handling apparatus of claim 12, wherein:

each actuation member comprises a drive surface to receive a force moving the actuation member vertically;

the case handling apparatus further comprises a drive mechanism to move the actuation members for case transfer, the drive mechanism comprising a plurality of vertically movable drive members, each drive member engageable with the drive surface of a respective actuation member to drive the actuation member vertically to transfer a supported case to or from the comb shelf of the storage unit.

14. The case handling apparatus of claim 13, wherein each actuation member comprises an elongate push rod extending transversely to the comb shelf to a free end, the drive surface of the actuation member on the free end.

15. The case handling apparatus of claim 14 wherein the actuation members extend downwardly to free ends located below the comb shelf, each drive member located beneath the drive surface associated with such drive member.

16. The case handling apparatus of claim 15 comprising:

a transport vehicle for moving the frame to and from the storage unit, the vehicle comprising a chassis, the drive mechanism attached to and movable with the chassis;

the chassis comprising an upwardly facing support surface;

the frame comprising a downwardly facing support surface; and the frame support surface engaging the chassis support surface whereby the frame is carried above the chassis.

17. The case handling apparatus of claim 16 wherein:

the drive mechanism comprises a lift table, a first drive to move the lift table above the chassis, and a plurality of second drives, each drive member driven by a respective second drive between extended and retracted positions;

the second drives are attached to the lift table for conjoint movement with the lift table wherein each drive member moves with the lift table along a vertical path; and the drive surface associated with the drive member is in the path of the drive member when the drive member is in the extended position and the drive member is out of the path of the drive member when the drive member is in the retracted position.

18. The case handling apparatus of claim 12 wherein the comb shelf represents a first comb shelf and further comprising:

a second elongate, horizontal comb shelf on the frame for supporting a plurality of cases;

the second comb shelf extending across the frame and including a plurality of comb shelf segments spaced along the length of the comb shelf, each comb shelf segment for supporting a case of the plurality of cases and comprising a support member, an operative connection movably mounting the support member to the frame for vertical movement on the frame, and a plurality of case-support teeth fixed to the support member and spaced apart along the support member, the teeth extending outwardly from the frame to free ends located away from the support member;

a plurality of additional actuation members, each additional actuation member connected to a comb shelf support member of the second shelf wherein vertical movement of an additional actuation member moves a comb shelf segment of the second comb shelf vertically for case transfer; and each support member of the second comb shelf being independently movable by the additional actuation member connected to such support member whereby only the support members of the second comb shelf moved by additional actuation members participate in case transfer to or from the second comb shelf.

19. The case handling apparatus of claim 18 wherein the first and second comb shelves are vertically spaced from one another, the comb shelf segments of the first comb shelf overlying corresponding comb shelf segments of the second comb shelf; and each actuation member and additional actuation member faces a comb shelf support member of the first comb shelf and a comb shelf support member of the corresponding second comb shelf.

20. The case handling apparatus of claim 18 wherein the first and second comb shelves are horizontally spaced from one another and the actuation members and additional actuation members are between the first and second comb shelf support members.

21. A case handling apparatus comprising:

a frame;

a normally horizontal comb shelf on the frame, the comb shelf being elongate and having opposed sides, said comb shelf including a plurality of teeth spaced apart along the comb shelf, said teeth extending across the comb shelf and having free ends on one side of the comb shelf;

a hinge on the other side of the comb shelf, the hinge connecting one tooth to the frame for rotation about a horizontal axis, the one tooth rotatable in a range of motion from a first position to a second position angularly displaced from the first position; and a drive connected between the frame and the hinge to drive the one tooth to selectable positions between the first and second positions, the drive connected to the hinge throughout the range of motion of the one tooth.

22. The case handling apparatus of claim 21 wherein the first position of the tooth represents an extended position of the tooth and the second position represents a retracted position of the tooth, the tooth being substantially horizontal for supporting the case on the tooth when in the extended position and substantially vertical when in the retracted position for not participating in case transfer to or from the comb shelf.

23. The case handling apparatus of claim 21 wherein the first position of the tooth represents an extended position of the tooth and the second position represents a retracted position of the tooth, the tooth being substantial horizontal when in the extended position and the tooth sloping downwardly from the hinge to its own free end when in the discharge position for gravity discharge of a case supported on the tooth.

24. The case handling apparatus of claim 23 wherein the drive comprises a stop member movable between first and second positions, the stop member located in the path of the hinge to resist rotation of the tooth from the extended position to the discharge position when in the first position and the stop member out of the path of the hinge when in the second position.

25. The case handling apparatus of claim 24 wherein the hinge comprises a first portion connected to the first tooth and a second portion connecting a second tooth to the frame for rotation about the horizontal axis, the second hinge portion rotatable about the axis independently of the first hinge; and the case handling apparatus comprises a second drive connected between the frame and the second hinge portion to drive the second tooth to selectable positions about the axis independently of the position of the first tooth.

26. A method of transferring cases between case handling magazines, each case handling magazine having a plurality of spaced apart horizontal comb shelves, each comb shelf having a plurality of spaced apart case-support teeth, the method comprising the steps of:

loading a first case on a first comb shelf of a first magazine and loading a second case on a second comb shelf of the first magazine;

positioning the first magazine in a transfer relationship with a second magazine with the comb shelves of both magazines extending parallel to each other and each comb shelf of the first magazine adjacent to and above a corresponding comb shelf of the second magazine;

moving the first comb shelf of the first magazine vertically downward relative to the adjacent comb shelf of the second magazine to pass the teeth of the first comb shelf of the first magazine between the teeth of the adjacent comb shelf of the second magazine and position the first comb shelf of the first magazine below the adjacent comb shelf of the second magazine to transfer the first case from the first comb shelf of the first magazine to the adjacent comb shelf of the second magazine;

maintaining the second comb shelf of the first magazine above the adjacent comb shelf of the second magazine while moving the first comb shelf to retain the second case on the first magazine while transferring the first case; and separating the magazines.

27. The method of claim 26 wherein the first comb shelf of the first magazine comprises a plurality of comb shelf segments, each comb shelf segment comprising a plurality of the first comb shelf teeth, the first case on a first comb shelf segment, the method comprising the steps of:

loading a third case on a second comb shelf segment of the first magazine; and the moving step comprising the steps of:

moving the first comb shelf segment of the first magazine relatively downward relative to the adjacent comb shelf of the second magazine to pass the teeth of the first comb shelf segment between the teeth of the adjacent comb shelf of the second magazine and position the first comb shelf segment of the first magazine below the adjacent comb shelf of the second magazine to transfer the first case from the first comb shelf segment of the first magazine to the adjacent comb shelf of the second magazine; and maintaining the second comb shelf segment of the first magazine above the adjacent comb shelf of the second magazine while moving the first comb shelf segment to retain the third case on the first magazine while transferring the first case.

28. The method of claim 27 wherein the case handling apparatus comprises a transport vehicle, the method comprising the steps of:

placing one of the first and second magazines on the transport vehicle away from the other magazine;

transporting the one magazine to the other magazine with the transport vehicle to position the magazines adjacent each other in the transfer relationship; and taking the one magazine off of the transport vehicle.

29. The method of claim 28 wherein the transport vehicle includes a lift table, the method comprising the step of raising or lowering the lift table to move the first comb shelf of the first magazine vertically downward relative to the adjacent comb shelf of the second magazine.

* * * * *